United States Patent
Matsunaga

(10) Patent No.: US 9,375,640 B2
(45) Date of Patent: Jun. 28, 2016

(54) INFORMATION PROCESSING SYSTEM, COMPUTER-READABLE STORAGE MEDIUM, AND INFORMATION PROCESSING METHOD

(75) Inventor: Hiroshi Matsunaga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 356 days.

(21) Appl. No.: 13/271,510

(22) Filed: Oct. 12, 2011

(65) Prior Publication Data

US 2012/0231881 A1 Sep. 13, 2012

(30) Foreign Application Priority Data

Mar. 8, 2011 (JP) ................................. 2011-050039

(51) Int. Cl.
*A63F 13/00* (2014.01)
*A63F 13/20* (2014.01)

(52) U.S. Cl.
CPC ......... *A63F 13/06* (2013.01); *A63F 2300/1056* (2013.01); *A63F 2300/1068* (2013.01); *A63F 2300/1075* (2013.01); *A63F 2300/301* (2013.01); *A63F 2300/403* (2013.01); *A63F 2300/6045* (2013.01); *A63F 2300/6669* (2013.01)

(58) Field of Classification Search
USPC .......................................... 463/30, 31, 36, 39
See application file for complete search history.

(56) References Cited

U.S. PATENT DOCUMENTS

| | | | |
|---|---|---|---|
| 5,838,909 A * | 11/1998 | Roy et al. ...................... | 709/209 |
| 5,853,324 A | 12/1998 | Kami et al. | |
| 6,201,554 B1 | 3/2001 | Lands | |
| 6,225,977 B1 * | 5/2001 | Li ................................. | 345/156 |
| 6,290,600 B1 | 9/2001 | Glasson | |
| 6,416,410 B1 * | 7/2002 | Abou-Samra et al. .......... | 463/31 |
| 6,450,886 B1 | 9/2002 | Oishi et al. | |
| 6,483,540 B1 | 11/2002 | Akasawa et al. | |
| 6,500,070 B1 | 12/2002 | Tomizawa et al. | |
| 6,540,614 B1 | 4/2003 | Nishino et al. | |
| 6,712,703 B2 | 3/2004 | Miyamoto et al. | |
| 6,762,746 B2 | 7/2004 | Fukuda | |
| 6,908,388 B2 | 6/2005 | Shimizu et al. | |
| 6,966,837 B1 | 11/2005 | Best | |
| 7,326,117 B1 | 2/2008 | Best | |

(Continued)

FOREIGN PATENT DOCUMENTS

| | | |
|---|---|---|
| EP | 1 726 342 A2 | 11/2006 |
| EP | 2 218 485 | 8/2010 |

(Continued)

OTHER PUBLICATIONS

Office Action in U.S. Appl. No. 13/362,255 dated Apr. 10, 2014.

(Continued)

*Primary Examiner* — Paul A D'Agostino
*Assistant Examiner* — Brandon Gray
(74) *Attorney, Agent, or Firm* — Nixon & Vanderhye P.C.

(57) ABSTRACT

A load applied to a first input device is sequentially detected, and a first display image to be displayed on a portable display device is sequentially generated based on load data. The portable display device obtains image data representing the first display image, and sequentially displays the first display image represented by the obtained image data. In this exemplary embodiment, when a user performs an operation based on his/her action and thereby a process based on the user's action is performed, the user is allowed to view the result of the process in a favorable situation.

26 Claims, 23 Drawing Sheets

(56) References Cited

U.S. PATENT DOCUMENTS

| | | |
|---|---|---|
| 7,588,498 B2 | 9/2009 | Iizuka et al. |
| 2002/0006827 A1 | 1/2002 | Ogata et al. |
| 2002/0022518 A1 | 2/2002 | Okuda et al. |
| 2002/0140666 A1 | 10/2002 | Bradski |
| 2002/0165028 A1* | 11/2002 | Miyamoto et al. ............ 463/46 |
| 2003/0134665 A1 | 7/2003 | Kato et al. |
| 2003/0216176 A1 | 11/2003 | Shimizu et al. |
| 2003/0220142 A1 | 11/2003 | Siegel |
| 2004/0046736 A1 | 3/2004 | Pryor et al. |
| 2004/0092309 A1 | 5/2004 | Suzuki |
| 2004/0219980 A1 | 11/2004 | Bassett et al. |
| 2004/0229687 A1 | 11/2004 | Miyamoto et al. |
| 2005/0014543 A1 | 1/2005 | Itoi et al. |
| 2005/0119053 A1 | 6/2005 | Suzuki et al. |
| 2005/0130738 A1 | 6/2005 | Miyamoto et al. |
| 2005/0187015 A1 | 8/2005 | Suzuki et al. |
| 2005/0255900 A1 | 11/2005 | Takahashi et al. |
| 2006/0017692 A1 | 1/2006 | Wehrenberg et al. |
| 2006/0040740 A1 | 2/2006 | DiDato |
| 2006/0046848 A1 | 3/2006 | Abe et al. |
| 2006/0262120 A1* | 11/2006 | Rosenberg .................... 345/473 |
| 2006/0262210 A1 | 11/2006 | Smith et al. |
| 2006/0266200 A1* | 11/2006 | Goodwin ....................... 84/611 |
| 2007/0007143 A1 | 1/2007 | Hayashi et al. |
| 2007/0008298 A1 | 1/2007 | Ohta |
| 2007/0015577 A1 | 1/2007 | Hsu |
| 2007/0018968 A1 | 1/2007 | Iwamoto et al. |
| 2007/0072662 A1 | 3/2007 | Templeman |
| 2007/0073196 A1 | 3/2007 | Tanaka et al. |
| 2007/0208528 A1 | 9/2007 | Seo et al. |
| 2007/0265085 A1 | 11/2007 | Miyamoto et al. |
| 2008/0009332 A1 | 1/2008 | Kake |
| 2008/0042973 A1 | 2/2008 | Zhao et al. |
| 2008/0062198 A1 | 3/2008 | Takahashi et al. |
| 2008/0070686 A1 | 3/2008 | Satsukawa et al. |
| 2008/0096654 A1 | 4/2008 | Mondesir et al. |
| 2008/0096657 A1 | 4/2008 | Benoist |
| 2008/0102951 A1 | 5/2008 | Eto et al. |
| 2008/0216974 A1 | 9/2008 | Pitcher et al. |
| 2008/0254821 A1 | 10/2008 | Kusuda et al. |
| 2008/0261696 A1 | 10/2008 | Yamazaki et al. |
| 2008/0268956 A1 | 10/2008 | Suzuki |
| 2008/0274813 A1 | 11/2008 | Sato |
| 2008/0318681 A1 | 12/2008 | Rofougaran et al. |
| 2009/0002391 A1 | 1/2009 | Williamson et al. |
| 2009/0069096 A1 | 3/2009 | Nishimoto |
| 2009/0070093 A1 | 3/2009 | Nakanishi et al. |
| 2009/0093305 A1 | 4/2009 | Okamoto et al. |
| 2009/0156308 A1* | 6/2009 | Hsu ................................ 463/39 |
| 2009/0187371 A1 | 7/2009 | Ohta |
| 2009/0244064 A1 | 10/2009 | Inokuchi et al. |
| 2009/0298585 A1 | 12/2009 | Cannon et al. |
| 2009/0303204 A1 | 12/2009 | Nasiri et al. |
| 2010/0045666 A1 | 2/2010 | Kornmann et al. |
| 2010/0045667 A1 | 2/2010 | Kornmann et al. |
| 2010/0048357 A1 | 2/2010 | Nakagawa et al. |
| 2010/0053322 A1 | 3/2010 | Marti et al. |
| 2010/0058254 A1 | 3/2010 | Narita |
| 2010/0081505 A1* | 4/2010 | Alten et al. .................... 463/36 |
| 2010/0087248 A1 | 4/2010 | Takahashi |
| 2010/0137063 A1 | 6/2010 | Shirakawa et al. |
| 2010/0169110 A1 | 7/2010 | Sawano et al. |
| 2010/0178988 A1 | 7/2010 | Izuno et al. |
| 2010/0188937 A1 | 7/2010 | Watanabe |
| 2010/0214216 A1 | 8/2010 | Nasiri et al. |
| 2010/0245236 A1 | 9/2010 | Takayama |
| 2010/0245685 A1 | 9/2010 | Onodera et al. |
| 2010/0279770 A1 | 11/2010 | Ikeda |
| 2010/0283723 A1 | 11/2010 | Konishi |
| 2010/0285882 A1 | 11/2010 | Hsu |
| 2010/0292006 A1* | 11/2010 | Terrell et al. .................. 463/36 |
| 2010/0302238 A1 | 12/2010 | Yonemori et al. |
| 2010/0304857 A1 | 12/2010 | Suzuki et al. |
| 2011/0039618 A1 | 2/2011 | Ichiyanagi et al. |
| 2011/0054359 A1 | 3/2011 | Sazonov et al. |
| 2011/0070953 A1 | 3/2011 | Konishi |
| 2011/0077088 A1 | 3/2011 | Hayashi et al. |
| 2011/0092289 A1 | 4/2011 | Dagman et al. |
| 2011/0159960 A1 | 6/2011 | Ueshima et al. |
| 2011/0169928 A1 | 7/2011 | Gassel et al. |
| 2011/0172013 A1 | 7/2011 | Shirasaka et al. |
| 2011/0244956 A1 | 10/2011 | Sakakibara et al. |
| 2011/0244957 A1 | 10/2011 | Nishimura et al. |
| 2011/0250964 A1 | 10/2011 | Kulas |
| 2011/0250965 A1 | 10/2011 | Kulas et al. |
| 2011/0281650 A1 | 11/2011 | Yamazaki et al. |
| 2011/0300930 A1 | 12/2011 | Hsu |
| 2011/0306425 A1 | 12/2011 | Rivard et al. |
| 2012/0014558 A1 | 1/2012 | Stafford et al. |
| 2012/0017236 A1 | 1/2012 | Stafford et al. |
| 2012/0079080 A1 | 3/2012 | Pishevar |
| 2012/0086630 A1 | 4/2012 | Zhu et al. |
| 2012/0086631 A1 | 4/2012 | Osman et al. |
| 2012/0115596 A1 | 5/2012 | Otani |
| 2012/0115609 A1 | 5/2012 | Sugiyama et al. |
| 2013/0017876 A1 | 1/2013 | Koumbourlis |
| 2013/0038532 A1 | 2/2013 | Okura et al. |

FOREIGN PATENT DOCUMENTS

| | | |
|---|---|---|
| EP | 2 497 545 A2 | 9/2012 |
| EP | 2 497 545 A3 | 10/2012 |
| EP | 2015854 | 11/2013 |
| GB | 2 442 259 | 4/2008 |
| GB | 2 442 259 A | 4/2008 |
| JP | H07-36612 A | 2/1995 |
| JP | H9-091110 | 4/1997 |
| JP | H09-294260 | 11/1997 |
| JP | H11-90043 A | 4/1999 |
| JP | 2000-316143 | 11/2000 |
| JP | 2000-325653 | 11/2000 |
| JP | 2001-34247 A | 2/2001 |
| JP | 2002-298160 | 10/2002 |
| JP | 2002-325963 | 11/2002 |
| JP | 2003-61940 | 3/2003 |
| JP | 2003-512142 | 4/2003 |
| JP | 2003-325974 A | 11/2003 |
| JP | 2003-334379 | 11/2003 |
| JP | 2004-030408 | 1/2004 |
| JP | 2004-159781 | 6/2004 |
| JP | 2004-329744 | 11/2004 |
| JP | 2005-103154 | 4/2005 |
| JP | 2005-137921 | 6/2005 |
| JP | 2005-230263 | 9/2005 |
| JP | 2006-31307 | 2/2006 |
| JP | 2006-39635 | 2/2006 |
| JP | 2007-301048 | 11/2007 |
| JP | 2008-15679 | 1/2008 |
| JP | 2008-264195 | 11/2008 |
| JP | 2008-264402 | 11/2008 |
| JP | 2009-172010 | 8/2009 |
| JP | 2009-237680 | 10/2009 |
| JP | 2009-536058 | 10/2009 |
| JP | 2010-055511 | 3/2010 |
| JP | 2010-233705 | 10/2010 |
| JP | 2010-259611 | 11/2010 |
| JP | 2010-273839 | 12/2010 |
| JP | 2011-015752 | 1/2011 |
| JP | 2011-19810 | 2/2011 |
| JP | 2011-019817 | 2/2011 |
| JP | 2011-53838 | 3/2011 |
| JP | 2011-056049 | 3/2011 |
| WO | WO 00/67864 | 11/2000 |
| WO | WO 01/30470 A1 | 5/2001 |
| WO | WO 2004/103244 | 2/2004 |
| WO | 2010/060211 | 6/2010 |
| WO | 2011/004629 | 1/2011 |

OTHER PUBLICATIONS

Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.

(56) References Cited

OTHER PUBLICATIONS

Sep. 4, 2012 European Search Report for EP 11187473.1, 7 pages.
Sep. 7, 2012 European Search Report for EP 12156629.3, 7 pages.
Apr. 10, 2013 Office Action from U.S. Appl. No. 13/277,561.
Office Action dated Jul. 18, 2013 in U.S. Appl. No. 13/362,255.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
Aug. 30, 2013 Office Action in U.S. Appl. No. 13/401,054, 71 pages.
European Search Report for European Application 12156630.1 dated Oct. 1, 2013.
Final Office Action (36 pages) dated Jul. 2, 2014 issued in co-pending U.S. Appl. No. 13/283,032.
Office Action in U.S. Appl. No. 13/283,032 dated Dec. 5, 2013.
U.S. Office Action dated Jun. 27, 2014 issued in co-pending U.S. Appl. No. 13/283,072.
Office Action dated Aug. 20, 2014 issued in U.S. Appl. No. 13/343,913.
Office Action in co-pending U.S. Appl. No. 13/287,320 dated Oct. 3, 2014.
Office Action in co-pending U.S. Appl. No. 13/283,072 dated Oct. 10, 2014.
Office Action in corresponding Japanese Patent Application No. 2011-225538 mailed May 21, 2015.
Office Action in corresponding U.S. Appl. No. 13/352,091 dated May 1, 2015.
Office Action dated Dec. 10, 2014 in corresponding U.S. Appl. No. 13/283,032.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo DREAM, Kabushiki Kaisha Anbitto, Mar. 1, 2011, vol. 203 p. 11.
European Search Report for EP11194630.7 dated Feb. 16, 2015.
Office Action in corresponding U.S. Appl. No. 13/287,320 dated Feb. 27, 2015.
Office Action in corresponding U.S. Appl. No. 13/343,913 dated Mar. 4, 2015.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
Japanese Notice of Reasons for Refusal dated Mar. 16, 2015 in corresponding JP Application No. 2011-118902.
Office Action of U.S. Appl. No. 13/333,045 dated Feb. 20, 2014.
"Minna no Ennichi," Shukan Famitsu, vol. 27, No. 10, Enterbrain Inc., Feb. 23, 2012, pp. 32-33.
"Close-up!," Mobile Software Palm OS, Mobile Press, vol. 5, No. 1, Japan—Gijutsu-Hyohron Co., Ltd., Feb. 24, 2005, p. 213.
"iPhone 3G Perfect Guide," Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644.
Office Action dated Sep. 1, 2015 issued in corresponding JP Patent Application No. 2011-118901 and English Translation.
Office Action dated Sep. 1, 2015 issued in corresponding JP Patent Application No. 2011-115402 and English Translation.
Office Action dated Sep. 1, 2015 issued in corresponding JP Patent Application No. 2011-115404 and English Translation.
Office Action dated Jun. 30, 2015 in corresponding U.S. Appl. No. 13/287,320.
European Search Report EP Application No. 12 15 0272.8 dated Oct. 28, 2014.
European Search Report EP Application No. 12 15 3067.9 dated Oct. 29, 2014.
Office Action dated Jan. 20, 2016, issued in corresponding U.S. Appl. No. 13/287,320, filed Nov. 2, 2011.
"Virtual Camera System." Wikipedia. Wikimedia Foundation, Feb. 25, 2011. Web. Jan. 7, 2016. <https://en.wikipedia.org/w/index.php?title=Virtual_camera_system&oldid=415917860>.
Extended European Search Report for corresponding European Application No. 14166174.4 dated Jan. 14, 2016.
Office Action in related U.S. Appl. No. 13/283,032 dated Dec. 30, 2015.
Notice of Allowance in related U.S. Appl. No. 13/343,913 dated Jan. 11, 2016.
Notice of Allowance in corresponding U.S. Appl. No. 13/352,091 dated Feb. 18, 2016.

* cited by examiner

F I G. 3
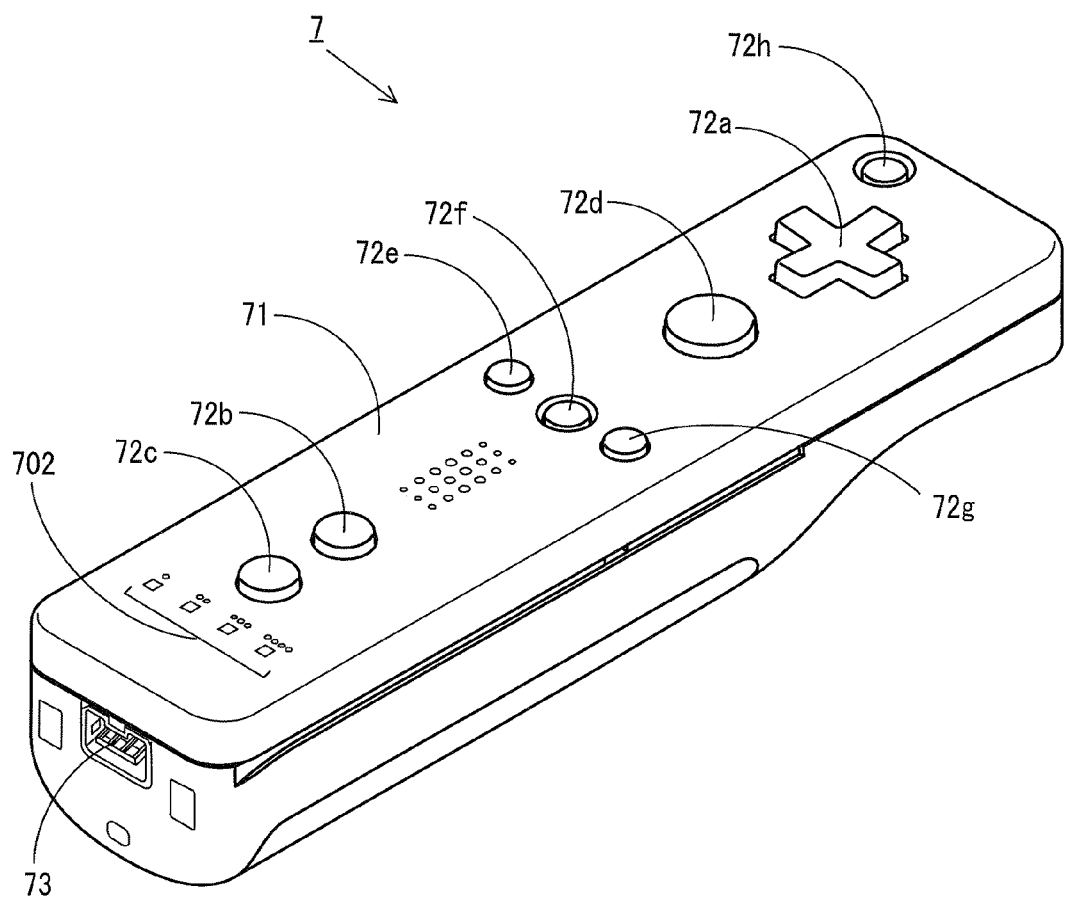

F I G. 5
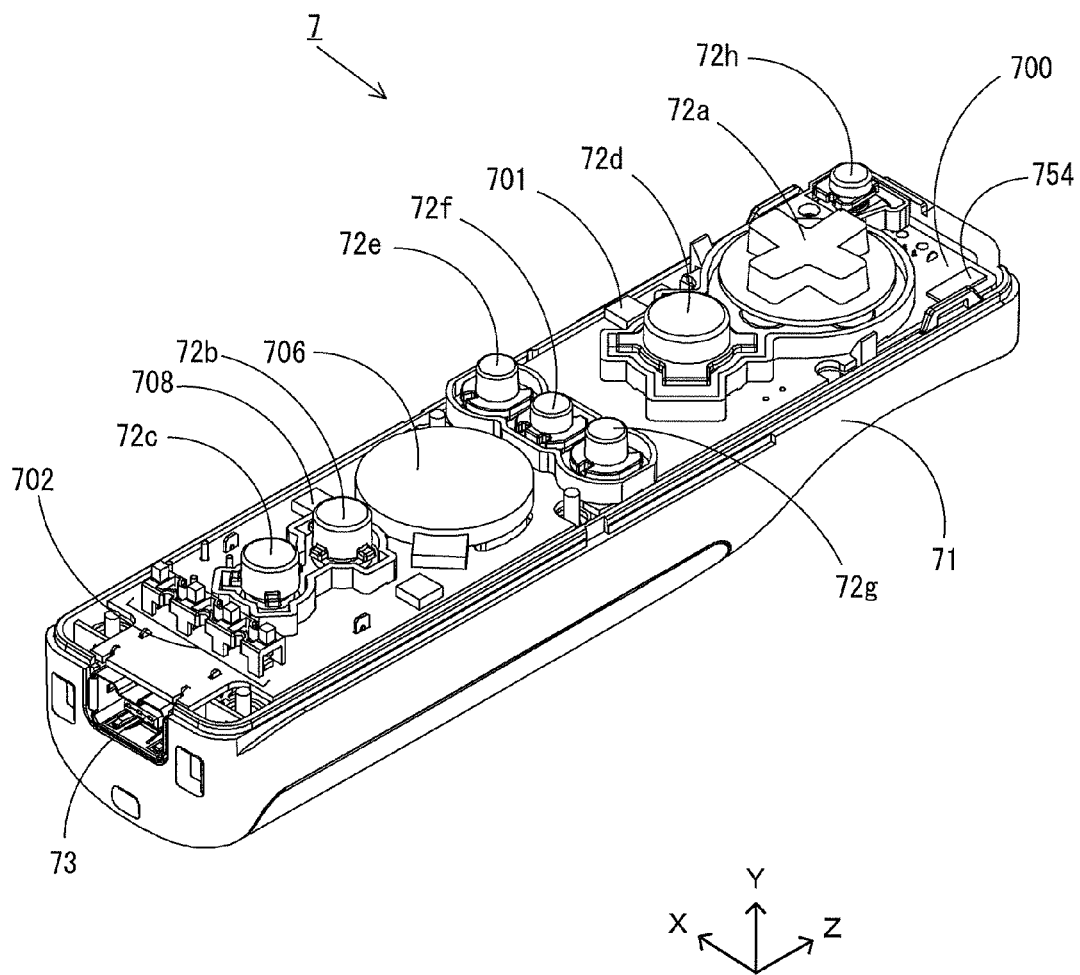

F I G. 9
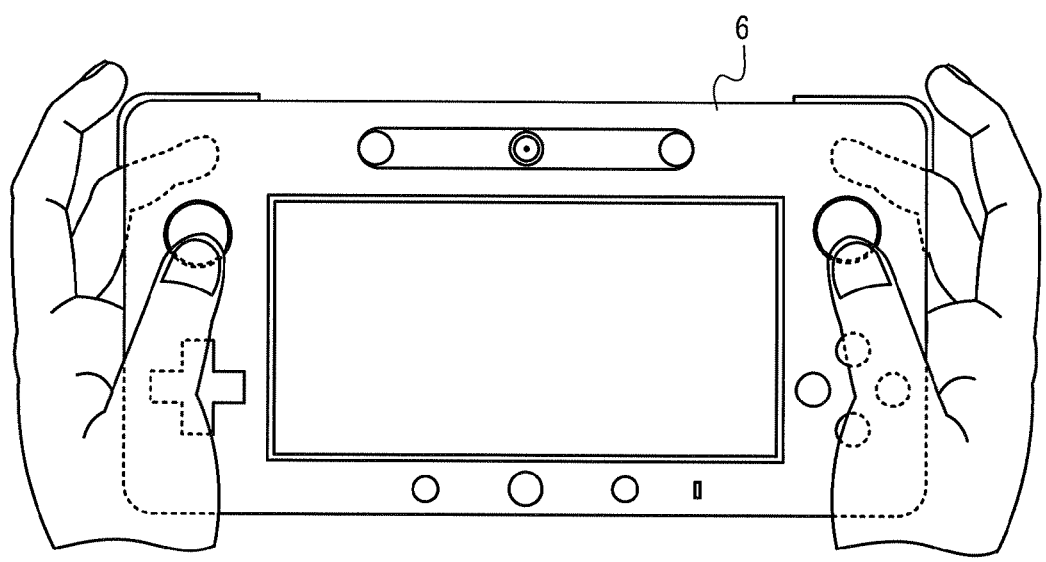

F I G. 1 3
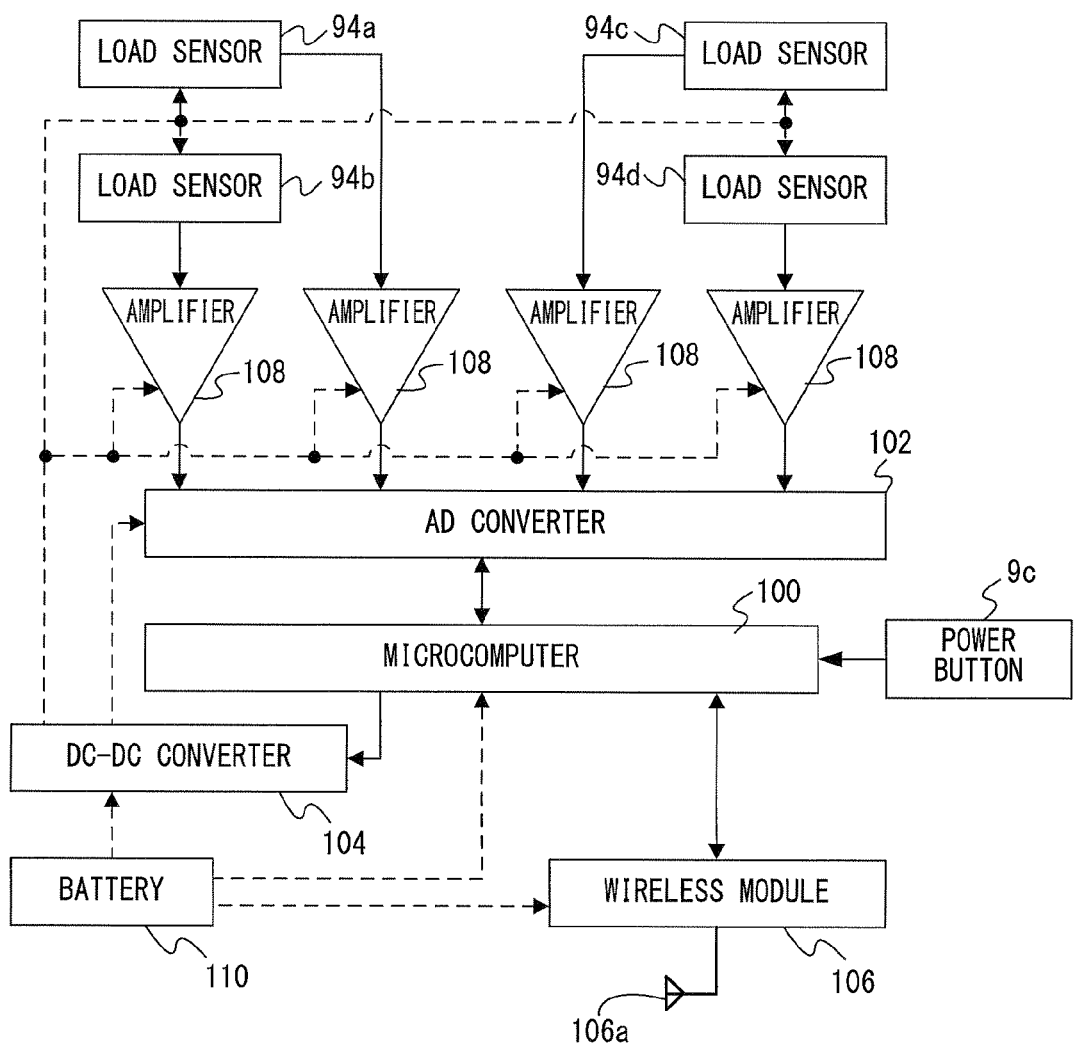

Po
61

2
Po
Lp

F I G. 1 6
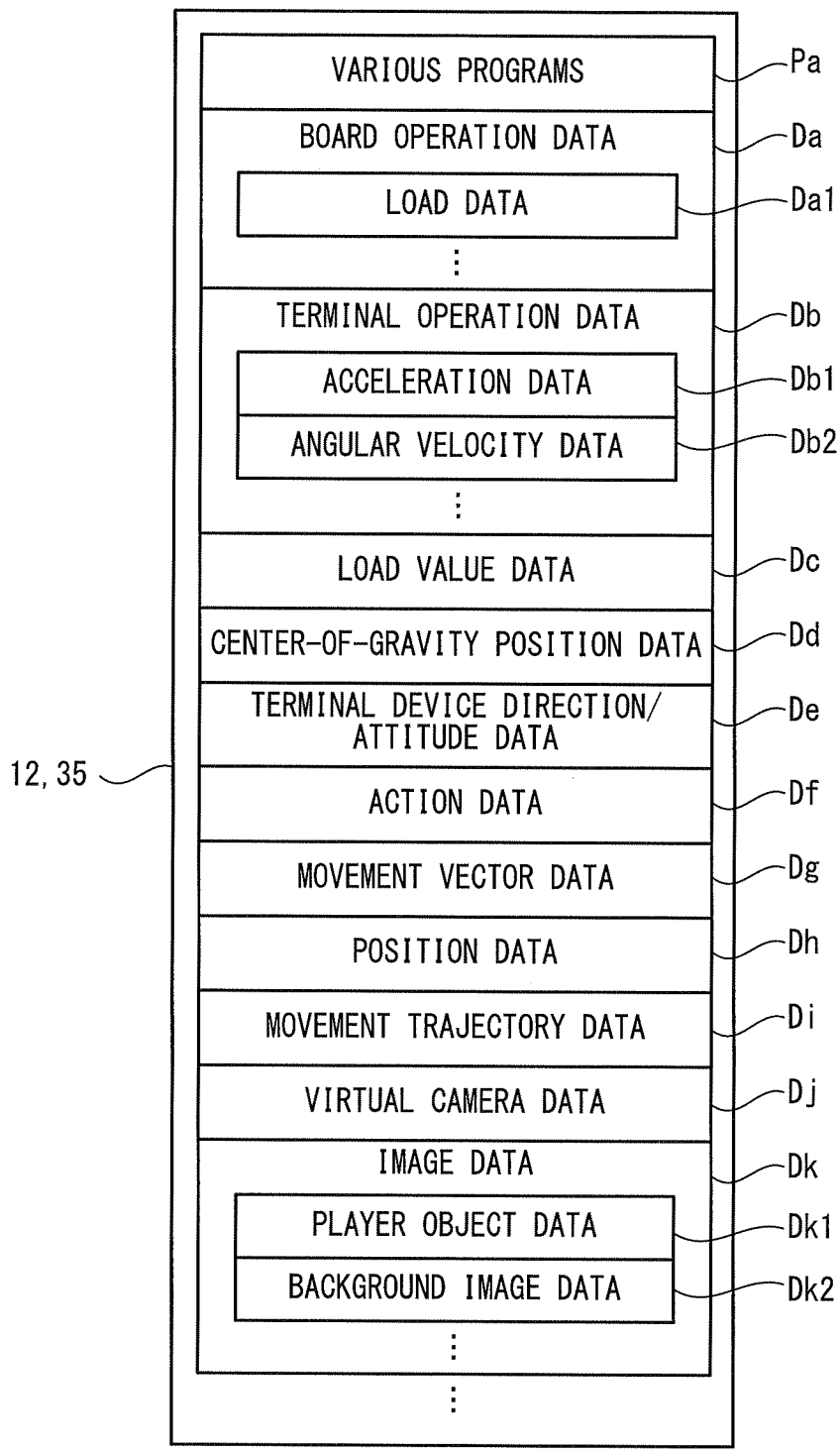

F I G. 2 4

| GAME TITLE | TERMINAL DEVICE 6 | | CONTROLLER 7 | BOARD TYPE CONTROLLER 9 | MONITOR 2 |
|---|---|---|---|---|---|
| | DISPLAY IMAGE | OPERATION CONTROL | OPERATION CONTROL | OPERATION CONTROL | DISPLAY IMAGE |
| DIVING (1st EXEMPLARY GAME) | IMAGE VIEWED AT CLOSE RANGE FROM BEHIND PLAYER OBJECT | MOVEMENT DIRECTION IS CONTROLLED ACCORDING TO ATTITUDE | — | ACTION, AND MOVEMENT SPEED ARE CONTROLLED ACCORDING TO LOAD CHANGE | IMAGE IN WHICH PLAYER OBJECT IS VIEWED FROM A DISTANCE BY BIRD'S-EYE VIEWING |
| REGATTA (2nd EXEMPLARY GAME) | IMAGE VIEWED AT CLOSE RANGE FROM BEHIND PLAYER OBJECT | — | ANGLE OF OARS (MOVEMENT SPEED) IS CONTROLLED ACCORDING TO ATTITUDE | ACTION, AND MOVEMENT SPEED ARE CONTROLLED ACCORDING TO LOAD CHANGE | IMAGE IN WHICH PLAYER OBJECT IS LATERALLY VIEWED FROM A DISTANCE |
| WATER PISTOL (3rd EXEMPLARY GAME) | IMAGE FROM VIEWPOINT OF PLAYER OBJECT | DIRECTION IS CONTROLLED ACCORDING TO ATTITUDE CONTAMINATION IS REMOVED BY TOUCH OPERATION | — | AMOUNT OF WATER IS CONTROLLED ACCORDING TO LOAD CHANGE | IMAGE VIEWED FROM ABOVE AND BEHIND PLAYER OBJECT |
| TANK (4th EXEMPLARY GAME) | IMAGE VIEWED AT CLOSE RANGE FROM BEHIND TANK | DIRECTION IS CONTROLLED ACCORDING TO ATTITUDE FIRING IS CONTROLLED ACCORDING TO BUTTON | — | FORWARD/BACKWARD MOVEMENT IS CONTROLLED ACCORDING TO CENTER-OF-GRAVITY POSITION | ENTIRE IMAGE IN WHICH TANK IS VIEWED AT A DISTANCE |
| PUZZLE (5th EXEMPLARY GAME) | IMAGE OF PUZZLE PIECES ARRANGED ON VIRTUAL FLOOR BENEATH USER | USER POSITION ON VIRTUAL FLOOR IS OBTAINED ACCORDING TO ATTITUDE AND MOVEMENT PUZZLE PIECE IS CHOSEN BY TOUCH OPERATION | — | WHEN LOAD IS APPLIED, USER POSITION IS SET TO REFERENCE POSITION ON VIRTUAL FLOOR | IMAGE SHOWING ENTIRETY OF PUZZLE |
| SEWING MACHINE (6th EXEMPLARY GAME) | IMAGE SHOWING PART OF CLOTH TO BE STITCHED | CLOTH IS ROTATED ACCORDING TO ATTITUDE CLOTH POSITION IS CHANGED BY TOUCH OPERATION | — | WHEN LOAD IS APPLIED, STITCHING ACTION IS PERFORMED | IMAGE SHOWING ENTIRETY OF CLOTH |
| MOLE (7th EXEMPLARY GAME) | IMAGE OF UNDERGROUND | — | — | ACTION, AND MOVEMENT SPEED ARE CONTROLLED ACCORDING TO LOAD CHANGE MOVEMENT DIRECTION IS CONTROLLED ACCORDING TO CENTER-OF-GRAVITY POSITION | IMAGE OF GROUND |
| UNICYCLE (8th EXEMPLARY GAME) | IMAGE IN WHICH UNICYCLE IS VIEWED FROM A DISTANCE BY BIRD'S-EYE VIEWING | — | — | ACTION, AND MOVEMENT SPEED ARE CONTROLLED ACCORDING TO LOAD CHANGE MOVEMENT DIRECTION IS CONTROLLED ACCORDING TO CENTER-OF-GRAVITY POSITION | IMAGE VIEWED AT CLOSE RANGE FROM BEHIND UNICYCLE |
| TRAMPOLINE (9th EXEMPLARY GAME) | IMAGE IN WHICH PLAYER IS VIEWED FROM ABOVE BY BIRD'S EYE VIEWING | — | POSITION OF PLAYER'S ARM IS CONTROLLED ACCORDING TO ATTITUDE | ACTION, AND JUMP HEIGHT ARE CONTROLLED ACCORDING TO LOAD CHANGE MOVEMENT DIRECTION IS CONTROLLED ACCORDING TO CENTER-OF-GRAVITY POSITION | IMAGE IN WHICH PLAYER IS LATERALLY VIEWED FROM A DISTANCE |
| POGO STICK (10th EXEMPLARY GAME) | IMAGE IN WHICH PLAYER IS VIEWED FROM DIRECTION ACCORDING TO ATTITUDE | MOVEMENT DIRECTION IS CONTROLLED ACCORDING TO ATTITUDE | — | ACTION, AND MOVEMENT SPEED ARE CONTROLLED ACCORDING TO LOAD CHANGE MOVEMENT DIRECTION IS CONTROLLED ACCORDING TO CENTER-OF-GRAVITY POSITION | ENTIRE IMAGE IN WHICH PLAYER IS VIEWED FROM A DISTANCE |

INFORMATION PROCESSING SYSTEM, COMPUTER-READABLE STORAGE MEDIUM, AND INFORMATION PROCESSING METHOD

CROSS REFERENCE TO RELATED APPLICATION

The disclosure of Japanese Patent Application No. 2011-050039, filed on Mar. 8, 2011, is incorporated herein by reference.

FIELD

The exemplary embodiments relate to information processing systems, computer-readable storage media, and information processing methods. More particularly, the exemplary embodiments relate to information processing systems, computer-readable storage media, and information processing methods, which enable, for example, processing based on an action of a user.

BACKGROUND AND SUMMARY

Conventionally, there are known game systems that allow a user to play a game based on a load of the user. For example, a conventional game system includes a board type controller having a load sensor. In the game system, a load value is detected by the load sensor when the user stands on the board type controller, and the detected load value is transmitted as operation data to a game apparatus. In the game apparatus that has received the operation data, a game process is executed based on the load value represented by the operation data transmitted from the board type controller, and the content of the game process is displayed on a monitor connected to the game apparatus.

In the conventional game system, however, the result of the game process based on the load value represented by the operation data is displayed on the monitor connected to the game apparatus. It is premised that an existing television receiver or the like is used as the monitor, and generally a stationary display is used. On the other hand, when the user performs an operation on the board type controller, the operation is often based on an action of the user, or the user often cannot perform the operation in front of the stationary monitor. However, since the monitor is stationary installed, the user is not allowed to view the result of the game process which is displayed in a preferable position in accordance with the user' action or in a position suitable for the user's operation position.

Accordingly, an object of the exemplary embodiments is to provide an information processing system, a computer-readable storage medium, and an information processing method, which allow, when a process is performed in accordance with an operation based on an action of a user, the user to view the result of the process in a favorable situation.

The exemplary embodiments have the following configurations to achieve the above-mentioned object.

An example of a configuration of an information processing system according to one embodiment includes a first input device, a portable display device, and an information processing apparatus for processing data supplied from the first input device. The first input device includes load detection means, and load data output means. The load detection means sequentially detects a load applied to the first input device. The load data output means sequentially outputs load data based on the load to the information processing apparatus.

The information processing apparatus includes operation data obtaining means, display image generation means, and image data output means. The operation data obtaining means sequentially obtains the load data outputted from the first input device. The display image generation means sequentially generates a first display image to be displayed on the portable display device, based on at least the load data obtained by the operation data obtaining means. The image data output means sequentially outputs, to the portable display device, image data representing the first display image generated by the display image generation means. The portable display device includes image data obtaining means, and display means. The image data obtaining means sequentially obtains the image data outputted from the information processing apparatus. The display means sequentially displays the first display image represented by the image data obtained by the image data obtaining means.

The information processing apparatus may be an apparatus for executing a game process and generating an image based on the game process, or may be a versatile apparatus such as a general personal computer. The portable display device may have a size small enough to be carried by a user. Typically, the portable display device may be a display device which allows the user, holding the portable display device with both hands, to view an image displayed thereon. The portable display device may include other components than the data obtaining means and the display means, like a terminal device of an exemplary embodiment described later, or may not include other components. The first input device may be any device capable of detecting a load applied thereto. For example, the first input device may be a device capable of detecting a load applied to a platform thereof when a user puts at least a part of his/her body on the platform (e.g., the user may stand on the platform with his/her bottoms of both feet contacting the upper surface of the platform, or the user may put his/her one foot on the upper surface of the platform, or the user may put another part (e.g., a hand) of his/her body on the upper surface of the platform).

According to the above configuration, when the user performs an operation based on his/her action by using the first input device and thereby a process based on the user's action is performed, the user is allowed to view the result of the process on the portable display device. Therefore, when the user holds the portable display device or places the portable display device in a favorable position when the user performs an action, the user is allowed to view the result of the process in a favorable situation for the user.

The portable display device may further include first operation data generation means, and first operation data output means. The first operation data generation means sequentially generates first operation data representing a user operation performed by using the portable display device. The first operation data output means sequentially outputs the first operation data to the information processing apparatus. In this case, the operation data obtaining means may sequentially obtain the first operation data outputted from the portable display device. The display image generation means may sequentially generate the first display image based on the load data and the first operation data which are obtained by the operation data obtaining means.

The first operation data generation means may generate data in accordance with that the user performs an operation using the portable display device. The first operation data generation means may generate data in accordance with that the portable display device body is moved, or may generate data in accordance with that an input section provided on the portable display device is operated. For example, the first operation data generation means may be at least one component selected from a group consisting of a touch panel, an analog stick, operation buttons, a magnetic sensor, an acceleration sensor, a gyro sensor, and a camera, which are provided on a terminal device of a later-described embodiment.

According to the above configuration, since a user's operation using the portable display device as well as the first input device is realized, the user is allowed to perform an operation based on his/her action by using the first input device, and allowed to view an image displayed on the portable display device while performing an operation by using the portable display device. Accordingly, the user is allowed to perform an operation in a novel operation environment, and allowed to view the result of the process in a favorable situation for the user in accordance with the operation environment.

The display image generation means may sequentially generate, based on at least the load data, a second display image to be displayed on another display device connected to the information processing apparatus. The image data output means may sequentially output, to the portable display device, the image data representing the first display image generated by the display image generation means, and may sequentially output, to the other display device, image data representing the second display image generated by the display image generation means.

The display device is a display device connected to the information processing apparatus, such as a monitor 2 of a later-described embodiment. Any type of display device may be used so long as it is separated from the portable display device, and is capable of displaying the second display image generated by the information processing apparatus. For example, the display device may be integrated with (in one housing) the information processing apparatus.

According to the above configuration, when the user performs an operation based on his/her action by using the first input device and thereby a process based on the user's operation is executed, the result of the process is displayed on another display device connected to the information processing apparatus as well as on the portable display device. Accordingly, the user is allowed to selectively use the images displayed on the two display devices in accordance with the operation state or his/her preference, and allowed to view the image suitable for the user's operation. Further, the image displayed on the other display device connected to the information processing apparatus may be viewed by a person other than the user, thereby providing favorable viewing environment when a plurality of persons view the result of the process.

The display image generation means may sequentially generate, as the second display image, an image different from the first display image, based on at least the load data.

According to the above configuration, an image different from the image displayed on the portable display device is displayed on the other display device connected to the information processing apparatus. Therefore, images, which are generated based on at least the load data in accordance with the purposes of use, can be respectively displayed on the display devices favorable for the user.

The display image generation means may generate, as the first display image, an image showing a first region in a virtual world, and may generate, as the second display image, an image showing a second region in the virtual world, which is different from the first region, based on at least the load data.

According to the above configuration, an image of a virtual world, which is identical to but different in display range from the virtual world displayed on the portable display device, is displayed on the other display device connected to the information processing apparatus. Therefore, when the state of the virtual world is presented to the user, images favorable for the user's operation can be displayed on the respective display devices.

The display image generation means may generate, as the first display image, an image showing a state of a virtual world viewed from a first viewpoint, and may generate, as the second display image, an image showing a state of the virtual world viewed from a second viewpoint different from the first viewpoint, based on at least the load data.

According to the above configuration, an image of a virtual world, which is identical to but is different in viewpoint from the virtual world displayed on the portable display device, is displayed on the other display device connected to the information processing apparatus. Therefore, when the state of the virtual world is presented to the user, images favorable for the user's operation can be displayed on the respective display devices.

The first operation data generation means may sequentially generate, as the first operation data, data in accordance with a movement of the portable display device.

According to the above configuration, the user is allowed to perform an operation by moving the portable display device.

The portable display device may further include a touch panel provided on a display screen of the display means. In this case, the first operation data generation means may sequentially generate, as the first operation data, data representing a position at which the touch panel is touched.

According to the above configuration, the user is allowed to perform an operation by touching the display screen of the portable display device on which the result of the process is displayed.

The information processing system may further include a second input device which is capable of being held by a user. The second input device includes second operation data generation means, and second operation data output means. The second operation data generation means sequentially generates second operation data representing a user operation performed by using the second input device. The second operation data output means sequentially outputs the second operation data to the information processing apparatus. In this case, the operation data obtaining means may sequentially obtain the second operation data outputted from the second input device. The display image generation means may sequentially generate the first display image, based on the load data and the second operation data which are obtained by the operation data obtaining means.

According to the above configuration, the user is allowed to perform an operation by using the second input device as well as the first input device. The user performing an operation by using the first input device and the second input device is allowed to perform the operation while viewing at least an image displayed on the portable display device. Therefore, the user is also allowed to perform the operation with the portable display device being placed in a position suitable for the user's operation.

The second operation data generation means may sequentially generate, as the second operation data, data in accordance with a movement of the second input device.

According to the above configuration, the user is allowed to perform an operation by moving the second input device.

The image data output means may wirelessly transmit the image data representing the first display image to the portable display device. The image data obtaining means may sequentially obtain the image data by receiving the image data wirelessly transmitted from the information processing apparatus.

According to the above configuration, since the portable display device and the information processing apparatus are wirelessly connected, the user is allowed to freely move the portable display device.

The information processing apparatus may further include compressed image generation means. The compressed image generation means sequentially compresses the image data representing the first display image generated by the display image generation means, to generate compressed image data. In this case, the image data output means may sequentially output the compressed image data generated by the compressed image generation means to the portable display device. The image data obtaining means may sequentially obtain the compressed image data outputted from the information processing apparatus. The portable display device may further include display image decompression means. The display image decompression means sequentially decompresses the compressed image data to obtain image data representing the first display image. The display means may sequentially display the first display image represented by the image data which has been obtained by the image data obtaining means and decompressed by the display image decompression means.

According to the above configuration, the first display image is compressed and then transmitted from the information processing apparatus to the portable display device. Therefore, the first display image can be transmitted at a high speed, resulting in a reduction in delay from when the first display image is generated to when the first display image is displayed on the portable display device.

A plurality of load detection means may be provided at different positions on the first input device. The load data output means may sequentially output, to the information processing apparatus, a plurality of load data based on loads detected by the respective load detection means.

Since the above configuration enables a process based on the position of a load applied to the first input device, a user's action can be determined precisely.

The operation data obtaining means may sequentially obtain the plurality of load data outputted from the load data output means. The information processing apparatus may further include center-of-gravity position calculation means. The center-of-gravity position calculation means calculates a center-of-gravity position of a load applied to the first input device, based on the loads represented by the plurality of load data. The display image generation means may sequentially generate the first display image based on the center-of-gravity position calculated by the center-of-gravity position calculation means.

Since the above configuration enables a process based on the center-of-gravity position of a load applied to the first input device, a user's action can be determined precisely.

The information processing apparatus may further include game processing means. The game processing means performs a predetermined game process based on at least the load data obtained by the operation data obtaining means. In this case, the display image generation means may sequentially generate the first display image based on the predetermined game process.

The above configuration enables a game process based on an operation using the first input device, and allows the user to view the result of the game process on the portable display device.

The information processing apparatus may further include player object action setting means. The player object action setting means sets an action of a player object arranged in a virtual world, based on the load data and the first operation data. The display image generation means may sequentially generate, as the first display image, an image of a region of the virtual world, which region includes at least the player object, or an image of the virtual world based on the viewpoint of the player object.

According to the above configuration, the user is allowed to move the player object in the virtual world in accordance with a load applied to the first input device while moving the player object in the virtual world by operating the portable display device. Therefore, various operation controls are realized by combining the operations of the respective devices. Further, the player object whose action is controlled by operating the portable display device is displayed on the portable display device which also serves as operation means, or the virtual world viewed from the player object whose action is controlled by operating the portable display device is displayed on the portable display device which also serves as operation means. Therefore, it is possible to give the user a sense of presence, as if the user moves the player object.

Another example of a configuration of an information processing system according to one embodiment includes a first input device, and a portable display device. The first input device includes load detection means, and load data output means. The load detection means sequentially detects a load applied to the first input device. The load data output means sequentially outputs load data based on the load, to the portable display device. The portable display device includes operation data obtaining means, display image generation means, and display means. The operation data obtaining means sequentially obtains the load data outputted from the first input device. The display image generation means sequentially generates a first display image to be displayed on the portable display device, based on the load data obtained by the operation data obtaining means. The display means sequentially displays the first display image generated by the display image generation means.

According to the above configuration, when the user performs an operation based on his/her action by using the first input device and thereby a process based on the user's action is performed, the user is allowed to view the result of the process on the portable display device. Therefore, when the user holds the portable display device or places the portable display device in a favorable position when the user performs an action, the user is allowed to view the result of the process in a favorable situation for the user. Further, since the display image generation means is included in the portable display device, an information processing system can be constructed by the first input device and the portable display device.

The exemplary embodiment may be implemented in the form of a computer-readable storage medium having stored therein an information processing program which causes a computer to act as at least a part of the above-mentioned components, or in the form of an information processing method including actions performed by at least a part of the above-mentioned components.

According to the exemplary embodiment, when the user performs an operation based on his/her action by using the first input device and thereby a process based on the user's action is performed, the user is allowed to view the result of the process on the portable display device. Therefore, when the user holds the portable display device or places the portable display device in a favorable position when the user performs an action, the user is allowed to view the result of the process in a favorable situation for the user.

These and other objects, features, aspects and advantages of the exemplary embodiments will become more apparent from the following detailed description when taken in conjunction with the accompanying drawings.

BRIEF DESCRIPTION OF THE DRAWINGS

FIG. 3 is a perspective view showing a non-limiting example of a controller 7 shown in FIG. 1, as viewed from the top rear side thereof;

FIG. 5 is a perspective view showing a non-limiting example of the controller 7 shown in FIG. 3, in a state where an upper housing thereof is removed;

FIG. 9 is a diagram showing a non-limiting example of a state where a user holds the terminal device 6;

FIG. 13 is a block diagram showing a non-limiting example of an electric configuration of the board type controller 9 shown in FIG. 11;

FIG. 16 is a diagram showing a non-limiting example of main data and programs stored in a main memory of the game apparatus body 5 shown in FIG. 1;

FIG. 24 is a table showing non-limiting examples of display images and operation controls of first to tenth exemplary games.

DETAILED DESCRIPTION OF NON-LIMITING EXAMPLE EMBODIMENTS

Figure 1:
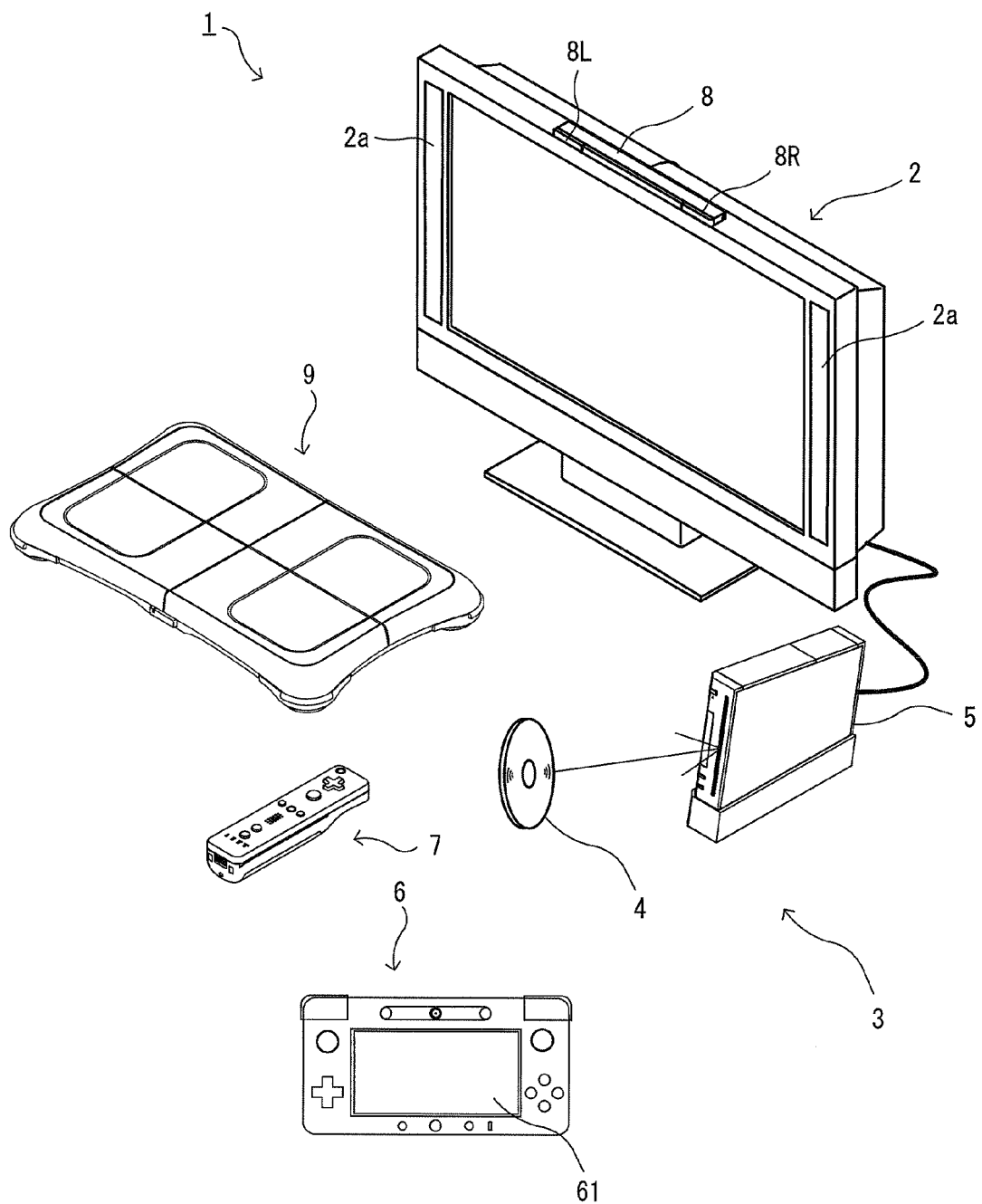
FIG. 1 is an external view showing a non-limiting example of a game system 1 according to an embodiment.
Figure 2:
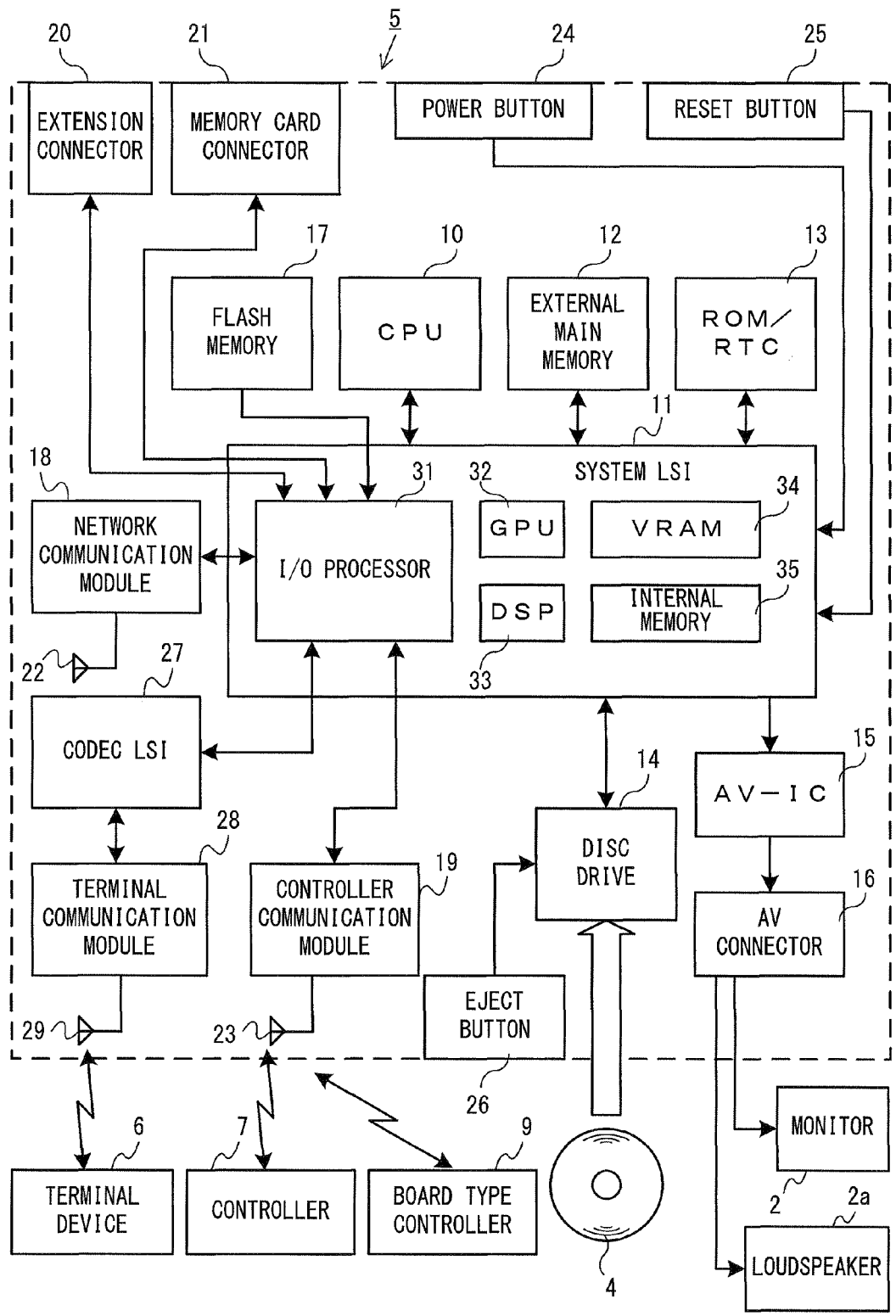
FIG. 2 is a functional block diagram showing a non-limiting example of a game apparatus body 5 shown in FIG. 1.

With reference to FIG. 1, an information processing apparatus for executing an information processing program according to an exemplary embodiment and an information processing system including the information processing apparatus will be described. Hereinafter, in order to provide a specific description, a stationary game apparatus body 5 is used as an example of the information processing apparatus, and a game system including the game apparatus body 5 will be described. FIG. 1 is an external view showing an example of the game system 1 including the stationary game apparatus body 5. FIG. 2 is a block diagram illustrating an example of the game apparatus body 5. Hereinafter, the game system 1 will be described.

As shown in FIG. 1, the game system 1 includes a household television receiver (hereinafter, referred to as a monitor) 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disc 4 having stored therein a program (e.g., a game program); the game apparatus body 5 having a computer for executing the program stored in the optical disc 4 to display a game screen on the monitor 2; a terminal device 6; a controller 7 for providing the game apparatus body 5 with operation information required for operating, for example, objects displayed on the display screen; and a board type controller 9. The game system 1 executes a game process on the game apparatus body 5 in accordance with a game operation using at least one of the terminal device 6, the controller 7, and the board type controller 9, and displays a game image obtained by the game process on the monitor 2 and/or the terminal device 6. The game apparatus body 5 is wirelessly connected to the terminal device 6, the controller 7, and the board type controller 9 so as to enable wireless communication therebetween. For example, the wireless communication is executed according to the Bluetooth (registered trademark) standard or the IEEE802.11n standard. However, the wireless communication may be executed in accordance with other standards such as standards for infrared communication.

The optical disc 4, typifying an information storage medium used for the game apparatus body 5 in an exchangeable manner, is detachably inserted in the game apparatus body 5. The optical disc 4 has stored therein an information processing program (typically, a game program) to be executed by the game apparatus body 5. The game apparatus body 5 has, on a front surface thereof, an insertion opening for the optical disc 4. The game apparatus body 5 reads and executes the information processing program stored in the optical disc 4 inserted into the insertion opening to execute the game process.

The monitor 2 is connected to the game apparatus body 5 via a connection cord. The monitor 2 displays a game image obtained by the game process executed by the game apparatus body 5. The monitor 2 includes the loudspeakers 2a. The loudspeakers 2a each output a game sound obtained as a result of the game process. In another embodiment, the game apparatus body 5 and a stationary display unit may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disc 4, and displays a result thereof as a game image on the monitor 2 and/or the terminal device 6. The game program or the like to be executed may be previously stored in the flash memory 17 as well as in the optical disc 4. Further, the game apparatus body 5 may reproduce a state of a game played in the past, by using the saved data stored in the flash memory 17, and display an image of the game state on the monitor 2 and/or the terminal device 6. A user of the game apparatus 3 can enjoy the game progress by operating at least one of the terminal device 6, the controller 7, and the board type controller 9 while viewing the game image displayed on the monitor 2 and/or the terminal device 6.

The controller 7 and the board type controller 9 each wirelessly transmit transmission data such as operation information, by using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section 74 for taking an image viewed from the controller 7. As exemplary imaging targets of the imaging information calculation section 74, two LED modules (hereinafter, referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in any position. Although FIG. 1 shows a case where the marker 8 is placed on the monitor 2, the location and direction of the marker 8 may be optionally selected. Further, the controller 7 is capable of receiving, at a communication section 75, transmission data wirelessly transmitted from the controller communication module 19 of the game apparatus body 5, to generate a sound or vibration based on the transmission data.

In another embodiment, the controller 7 and/or the board type controller 9 may be connected to the game apparatus body 5 via a cable. Further, in the exemplary embodiment, the game system 1 includes a controller 7 and a board type controller 9. However, the game apparatus body 5 is communicable with a plurality of controllers 7 and a plurality of board type controllers 9. Therefore, a plurality of players can play a game by using a predetermined number of controllers 7 and board type controller 9 simultaneously. The structures of the controller 7 and the board type controller 9 will be described later in detail.

The terminal device 6 is a portable device that is small enough to be held by a user, and the user is allowed to move the terminal device 6 with hands, or place the terminal device 6 at any location. Although a specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 (a terminal communication module 28 (see FIG. 2)) are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment the LCD 61 is used as a display device, the terminal device 6 may include any other display device, such as a display device utilizing EL (Electro Luminescence), for example. Further, the terminal device 6 transmits, to the game apparatus body 5 having the terminal communication module 28, operation data representing the content of an operation performed on the terminal device 6.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

The CPU 10, serving as a game processor, executes a program stored in the optical disc 4 to perform a process. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission between the respective components connected thereto, generation of an image to be displayed, and acquisition of data from an external apparatus. An internal structure of the system LSI 11 will be described later. The external main memory 12, which is a volatile memory, stores programs loaded from the optical disc 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) required for the GPU 32 to execute the graphics command. When an image is generated, the GPU 32 generates image data by using the data stored in the VRAM 3. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 33, serving as an audio processor, generates sound data by using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal device 6 may be generated. Hereinafter, the game sound to be output from the monitor 2 may be referred to as a "monitor game sound", and the game sound to be output from the terminal device 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board type controller 9. That is, the I/O processor 31 receives, via the antenna 23 and the controller communication module 19, operation data or the like transmitted from the controller 7 and/or the board type controller 9, and stores (temporarily) the data in a buffer region of the internal main memory 35 or the external main memory 12. Similarly to the external main memory 12, the internal main memory 35 may store a program loaded from the optical disc 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal device 6. When transmitting a game image (terminal game image) to the terminal device 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via the antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 10), and an instruction to control image taking of a camera (a camera 66 shown in FIG. 10). The I/O processor 31 transmits the control data to the terminal device 6 in response to an instruction from the CPU 10. In the exemplary embodiment, the codec LSI 27 does not perform a data compression process on the control data. In another embodiment, however, the codec LSI 27 may perform a compression process on the control data. The above-described data transmitted from the game apparatus body 5 to the terminal device 6 may be encrypted according to need, or may not be encrypted.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a similar compression process to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are output to the I/O processor 31. On the other hand, since the operation data transmitted from the terminal device 6 is smaller in amount than the image data and sound data, the operation data need not be compressed. The operation data may be encrypted according to need, or may not be encrypted. Accordingly, the operation data, which has been received by the terminal communication module 28, is output to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disc 4 is inserted, an eject button 26 for ejecting the optical disc 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned, the game apparatus body can be made communicable with the terminal device 6.

Figure 4:
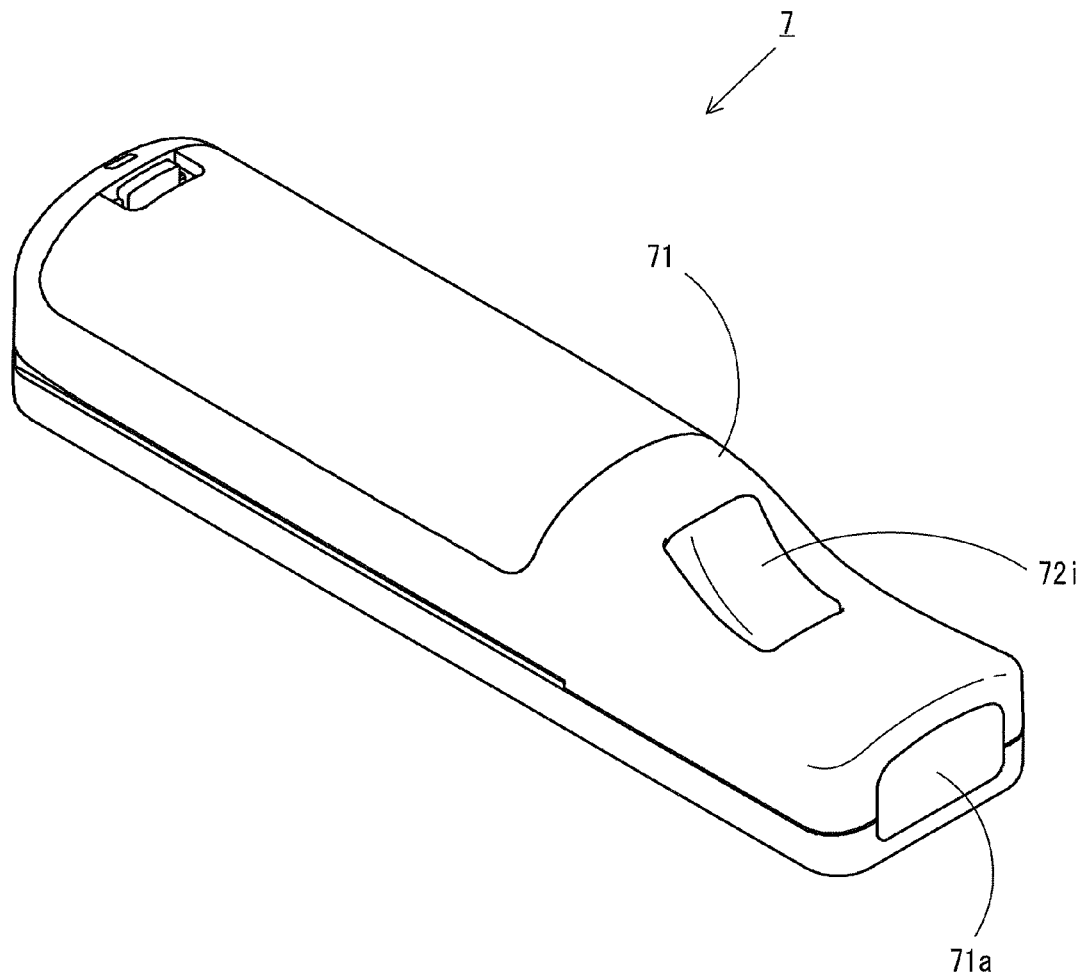
FIG. 4 is a perspective view showing a non-limiting example of the controller 7 shown in FIG. 3, as viewed from the bottom front side thereof.

With reference to FIGS. 3 and 4, the controller 7 will be described. FIG. 3 is a perspective view of the controller 7 as viewed from the top rear side thereof. FIG. 4 is a perspective view of the controller 7 as viewed from the bottom front side thereof.

As shown in FIGS. 3 and 4, the controller 7 includes a housing 71 which is formed by, for example, plastic molding, and has a plurality of operation sections 72 in the housing 71. The housing 71 has a substantially parallelepiped shape extending in a longitudinal direction from front to rear. The overall size of the housing 71 is small enough to be held by one hand of an adult or even a child. A user is allowed to perform a game operation by pressing any of the operation sections 72 (operation buttons) provided on the controller 7, and moving the controller 7 so as to change the position and attitude (tilt) thereof.

The housing 71 has a plurality of operation buttons. As shown in FIG. 3, on the top surface of the housing 71, a cross button 72a, a first button 72b, a second button 72c, an A button 72d, a minus button 72e, a home button 72f, a plus button 72g, and a power button 72h are provided. In the exemplary embodiment, the top surface of the housing 31 on which the buttons 72a to 72h are provided may be referred to as a "button surface". On the other hand, as shown in FIG. 4, a recessed portion is formed on a bottom surface of the housing 71, and a B button 72i is provided on a rear slope surface of the recessed portion. The operation buttons 72a to 72i are assigned, according to need, with functions in accordance with the information processing program executed by the game apparatus body 5. Further, the power button 72h remote-controls the power of the game apparatus body 5 to be on or off. The home button 72f and the power button 72h each has the top surface thereof buried in the top surface of the housing 71. Thus, the home button 72f and the power button 72h are prevented from being inadvertently pressed by the user.

On a rear surface of the housing 71, a connector 73 is provided. The connector 73 is used for connecting the controller 7 to another device (e.g., another sensor unit or controller). On both sides of the connector 73 at the rear surface of the housing 71, latch holes are provided so as to prevent easy removal of another device described above.

In the rear portion of the top surface of the housing 71, a plurality of (four in FIG. 3) LEDs 702 are provided. A controller type (number) is assigned to the controller 7 so as to distinguish the controller 7 from other controllers. The LEDs 702 are used for informing the user of the controller type which is currently set for the controller 7, or informing the user of the remaining battery level of the controller 5, for example. Specifically, when a game operation is performed by using the controller 7, one of the plurality of LEDs 702 is lit up in accordance with the controller type.

The controller 7 has an imaging information calculation section 74 (FIG. 6), and a light incident surface 71a of the imaging information calculation section 74 is provided on the front surface of the housing 71 as shown in FIG. 4. The light incident surface 71a is made of a material which transmits at least infrared light outputted from the marker section 65 and the marker 8.

On the top surface of the housing 71, sound holes for releasing sound from a loudspeaker 706 (see FIG. 5) embedded in the controller 7 to the outside are formed between the first button 72b and the home button 72d.

Figure 6:
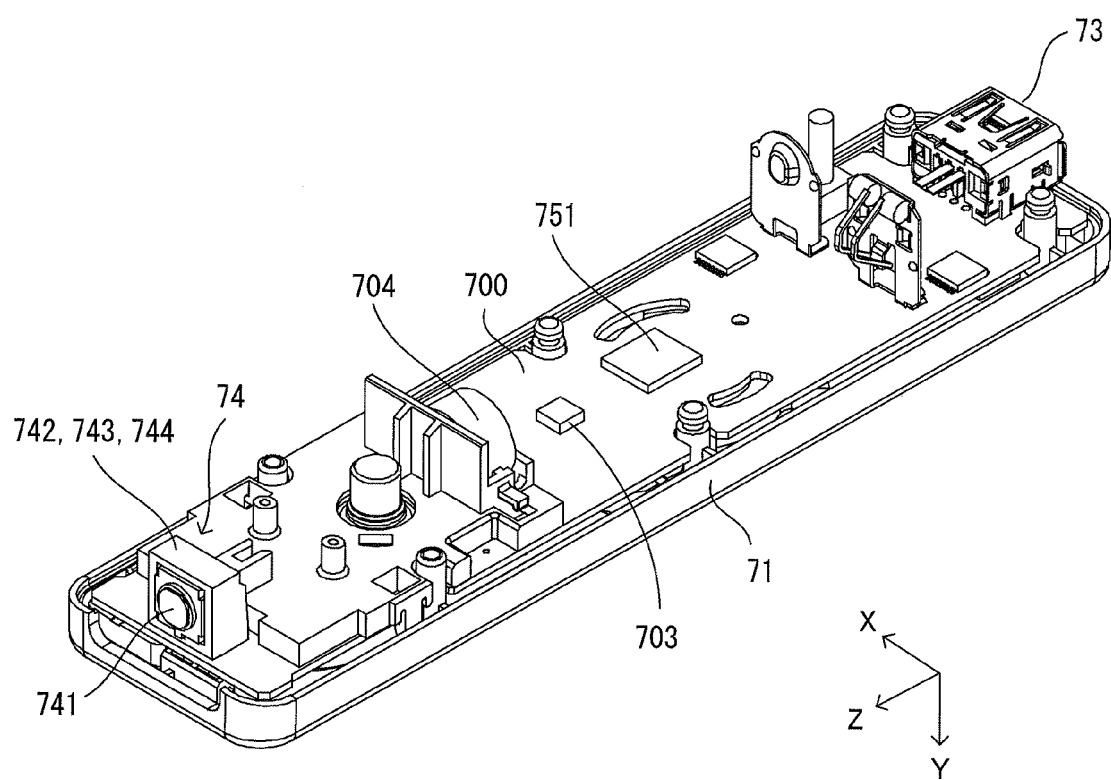
FIG. 6 is a perspective view showing a non-limiting example of the controller 7 shown in FIG. 4, in a state where a lower housing thereof is removed.

Next, an internal structure of the controller 7 will be described with reference to FIGS. 5 and 6. FIGS. 5 and 6 show an internal structure of the controller 7. FIG. 5 is a perspective view illustrating an example of a state in which an upper case (a part of the housing 71) of the controller 7 is removed. FIG. 6 is a perspective view illustrating an example of a state in which a lower case (a part of the housing 71) of the controller 7 is removed. FIG. 6 is a perspective view showing a reverse side of a substrate 700 shown in FIG. 5.

As shown in FIG. 5, a substrate 700 is fixed inside the housing 71. On a top main surface of the substrate 700, the operation buttons 72a to 72h, the LEDs 702, an acceleration sensor 701, an antenna 54, a loudspeaker 706 and the like are provided. These elements are connected to a microcomputer 751 (see FIG. 6) by wirings (not shown) formed on the substrate 700 and the like. In the exemplary embodiment, the acceleration sensor 701 is provided in a position offset from the center of the controller 7 with respect to the X-axis direction. Therefore, when the controller 7 is rotated around the Z-axis, the motion of the controller 7 can be easily calculated. In addition, the acceleration sensor 701 is provided forward from the center of the controller 7 with respect to the longitudinal direction (Z-axis direction). The wireless module 753 (see FIG. 6) and the antenna 754 allow the controller 7 to act as a wireless controller.

On the other hand, as shown in FIG. 6, at a front edge of a bottom main surface of the substrate 700, the imaging information calculation section 74 is provided. The imaging information calculation section 74 includes an infrared filer 741, a lens 742, an image pickup element 743, and an image processing circuit 744, arranged in this order when viewed from the front surface of the controller 7. These components 741 to 744 are fixed to the bottom main surface of the substrate 700.

On the bottom main surface of the substrate 700, the microcomputer 751 and a vibrator 704 are provided. The vibrator 704 is, for example, a vibration motor or a solenoid. The vibrator 704 is connected to the microcomputer 751 by wirings formed on the substrate 700 or the like. The controller 7 is vibrated by an actuation of the vibrator 704 in accordance with an instruction from the microcomputer 751. The vibration is transmitted to the user's hand holding the controller 7, and thus a so-called vibration-responsive game is realized. In the exemplary embodiment, the vibrator 704 is provided slightly forward with respect to the center of the housing 71. That is, the vibrator 704 is located in a position shifted from the center of the controller 7 toward the end thereof. Thus, the vibration of the vibrator 704 allows a large vibration of the entire controller 7. The connector 73 is attached to a rear edge of the main bottom surface of the substrate 700. The controller 7 includes a quartz oscillator for generating a reference clock of the microcomputer 751, an amplifier for outputting a sound signal to the loudspeaker 706, and the like, in addition to the components shown in FIGS. 5 and 6.

The shape of the controller 7, the shapes of the operation buttons, the numbers and the setting positions of the acceleration sensor and the vibrator, and the like, which are shown in FIGS. 3 to 6, are merely examples. The exemplary embodiment can be realized even if these shapes, numbers, setting positions and the like are different from those described above. Further, although in the exemplary embodiment the imaging direction of the image pickup means is the Z-axis positive direction, the imaging direction is not limited thereto. That is, the position of the imaging information calculation section 74 (the light incident surface 71a of the imaging information calculation section 74) of the controller 7 need not be on the front surface of the housing 71. The imaging information calculation section 74 may be provided on any other surface of the housing 71 as long as external light can be introduced into the housing 71 through the imaging information calculation section 74.

Figure 7:
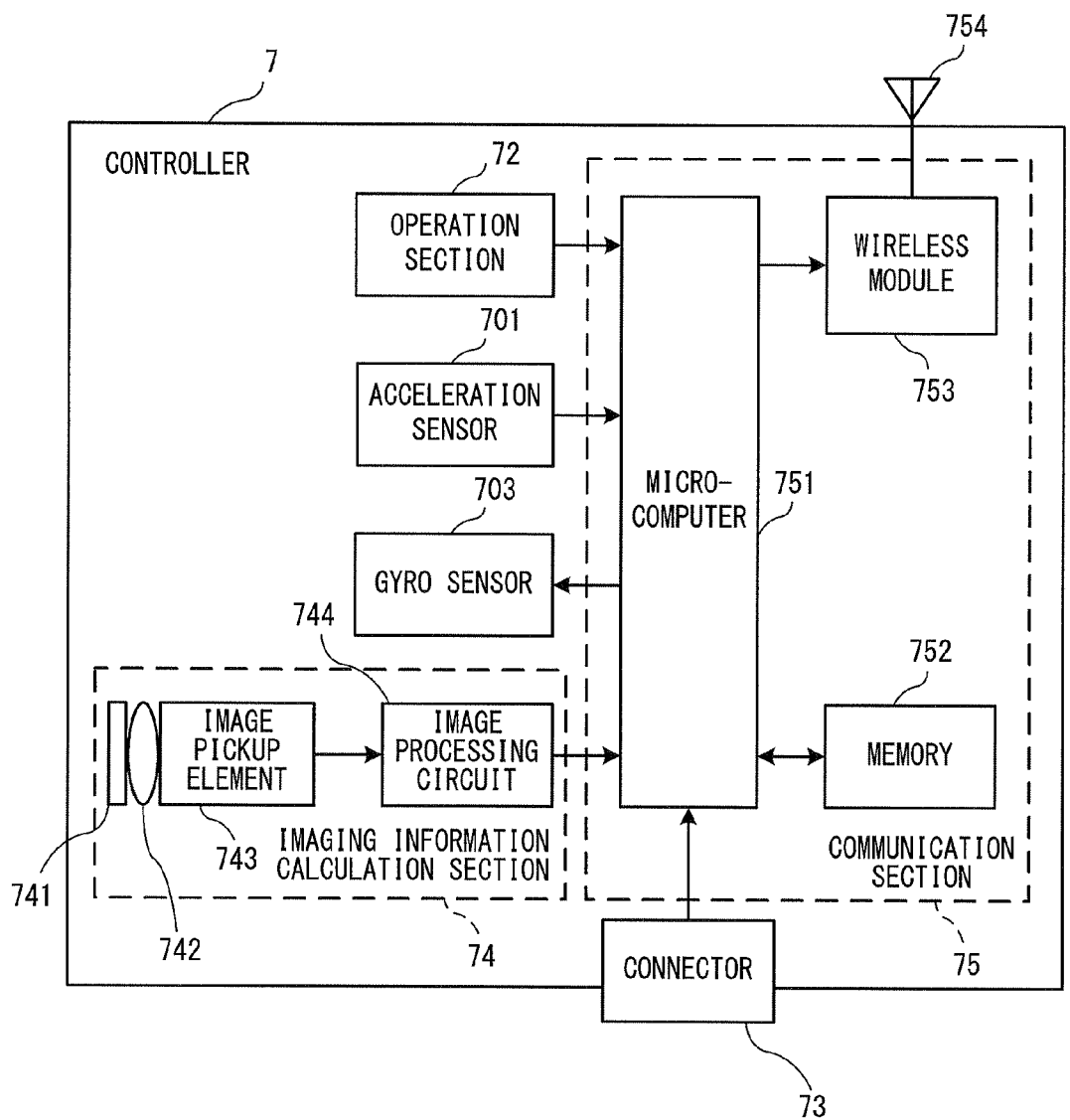
FIG. 7 is a block diagram showing a non-limiting example of a structure of the controller 7 shown in FIG. 3.

FIG. 7 is a block diagram illustrating an example of a structure of the controller 7. The controller 7 includes an operation section 72 (the respective operation buttons 72a to 72i), the imaging information calculation section 74, a communication section 75, the acceleration sensor 701, a gyro sensor 703, and the like. The controller 7 transmits, as operation data, data representing a content of operation performed on the controller 7 itself, to the game apparatus body 5. In the following description, the operation data transmitted by the controller 7 may be referred to as "controller operation data", operation data transmitted by the terminal device 6 may be referred to as "terminal operation data", and operation data transmitted by the board type controller 9 may be referred to as "board operation data".

The operation section 72 includes the operation buttons 72a to 72i described above, and outputs, to the microcomputer 51 of the communication section 75, operation button data representing an input state to any of the operation buttons 72a to 72i (i.e., whether or not any of the operation buttons 72a to 72i is pressed).

The imaging information calculation section 74 is a system for analyzing image data of an image taken by the image pickup means to identify an area having a high luminance in the image, and calculating the position of the center of gravity, the size, and the like of the area. The imaging information calculation section 74 has, for example, a maximum sampling period of about 200 frames/sec., and therefore can trace and analyze even a relatively fast motion of the controller 5.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 so as to be incident on the image pickup element 743. The image pickup element 743 is a solid-state imaging device such as a CMOS sensor or a CCD sensor, and receives the infrared light collected by the lens 742 and outputs an image signal. The marker section 65 of the terminal device 6 and the marker 8, which are the targets to be imaged, are each composed of a marker for outputting infrared light. Therefore, the infrared filter 741 enables the image pickup element 743 to receive only the infrared light which has passed through the infrared filter 741 and generate image data. Thus, the image pickup element 743 can accurately take an image of the imaging target (the marker section 65 and/or the marker 8). Hereinafter, an image taken by the image pickup element 743 is referred to as a taken image. The image data generated by the image pickup element 743 is processed by the image processing circuit 744. The image processing circuit 744 calculates a position of the imaging target in the taken image. The image processing circuit 744 outputs data representing a coordinate point of the calculated position, to the microcomputer 751 of the communication section 75. The data representing the coordinate point is transmitted as operation data to the game apparatus body 5 by the microcomputer 751. Hereinafter, the coordinate point is referred to as a "marker coordinate point". The marker coordinate point varies depending on the direction (angle of tilt) or the position of the controller 7, and therefore the game apparatus body 5 can calculate the direction and the position of the controller 7 by using the marker coordinate point.

In another embodiment, the controller 7 need not have the image processing circuit 744. In this case, the controller 7 may transmit the taken image as it is to the game apparatus body 5. At this time, the game apparatus body 5 may have a circuit or a program, having the same function as the image processing circuit 744, for calculating the marker coordinate point.

The acceleration sensor 701 detects an acceleration (including gravitational acceleration) of the controller 7, that is, detects a force (including gravity) applied to the controller 7. The acceleration sensor 701 detects a value of an acceleration (linear acceleration) in a direction of a straight line along the sensing axis direction, among accelerations applied to a detection section of the acceleration sensor 701. For example, a multiaxial acceleration sensor having two or more axes detects accelerations of components along the respective axes, as accelerations applied to the detection section of the acceleration sensor. The acceleration sensor 701 is, for example, an electrostatic capacitance type MEMS (Micro Electro Mechanical System) acceleration sensor. However, another type of acceleration sensor may be used.

In the exemplary embodiment, the acceleration sensor 701 detects linear accelerations in three axis directions with respect to the controller 7, i.e., an up-down direction (Y-axis direction shown in FIG. 3), a left-right direction (the X-axis direction shown in FIG. 3), and a forward-backward direction (the Z-axis direction shown in FIG. 3). Since the acceleration sensor 701 detects accelerations for the straight line directions along the three axes, an output from the acceleration sensor 701 represents the values of the linear accelerations for the three axes. In other words, the detected acceleration is represented as a three-dimensional vector in an XYZ-coordinate system (controller coordinate system) defined relative to the controller 7.

Data (acceleration data) representing an acceleration detected by the acceleration sensor 701 is output to the communication section 75. The acceleration detected by the acceleration sensor 701 varies depending on the direction (angle of tilt) or movement of the controller 7, and therefore, the game apparatus body 5 can calculate the direction and movement of the controller 7 by using the acceleration data. For example, the game apparatus body 5 can calculate an attitude, an angle of tilt and the like of the controller 7 based on the obtained acceleration data.

When a computer such as a processor (for example, the CPU 10) of the game apparatus body 5 or a processor (for example, the microcomputer 751) of the controller 7 performs a process based on an acceleration signal outputted from the acceleration sensor 701 (as well as an acceleration sensor 603 described later), additional information relating to the controller 5 can be inferred or calculated (determined), as one skilled in the art will readily understand from the description herein. For example, suppose a case where the computer performs a process on the assumption that the controller 7 including the accelerate sensor 701 is in a static state (that is, a case where a process is performed on the assumption that an acceleration detected by the acceleration sensor 701 is only the gravitational acceleration). When the controller 7 is actually in the static state, it is possible to determine whether and to what extent the controller 7 tilts with respect to the direction of gravity, based on the detected acceleration. Specifically, even in a case where the acceleration sensor 701 is capable of detecting only an acceleration in a single-axis direction, if a state where the detection axis is toward the vertically downward direction represents a reference, whether or not the controller 7 tilts with respect to the reference can be determined based on whether or not 1 G (gravitational acceleration) is applied, and further, the extent to which the controller 7 tilts with respect to the reference can be determined based on the magnitude of the gravitational acceleration. On the other hand, in the case of the multiaxial acceleration sensor 701, it is possible to accurately determine to what extent the controller 7 tilts with respect to the gravitational direction by performing processing on the acceleration signals corresponding to the respective axes. In this case, the processor may calculate an angle of tilt of the controller 7 based on the output from the acceleration sensor 701, or calculate a direction of tilt of the controller 7 without calculating the angle of tilt. Thus, when the acceleration sensor 701 is used in combination with the processor, an angle of tilt or an attitude of the controller 7 can be determined.

On the other hand, in a case where it is assumed that the controller 7 is in a dynamic state (a state where the controller 7 is being moved), the acceleration sensor 701 detects an acceleration based on the movement of the controller 7 in addition to the gravitational acceleration. Therefore, a direction in which the controller 7 moves can be determined by eliminating the gravitational acceleration component from the detected acceleration through a predetermined process. Even when it is assumed that the controller 7 is in the dynamic state, a tilt of the controller 7 with respect to the direction of gravity can be determined by eliminating the acceleration component based on the movement of the acceleration sensor 701 from the detected acceleration through a predetermined process. In another embodiment, the acceleration sensor 701 may include an embedded processor or another type of dedicated processor for performing, before outputting to the microcomputer 751 an acceleration signal detected by the acceleration detection means incorporated therein, any desired processing on the acceleration signal. For example, when the acceleration sensor 701 is intended to detect static acceleration (for example, gravitational acceleration), the embedded or dedicated processor may convert the acceleration signal to a corresponding angle of tilt (or another parameter).

The gyro sensor 703 detects angular velocities around three axes (XYZ axes in the exemplary embodiment), respectively. In the exemplary embodiment, the directions of rotations around the X-axis, the Y-axis, and the Z-axis with respect to the imaging direction (the Z-axis positive direction) of the controller 7 are referred to as a pitch direction, a yaw direction, and a roll direction, respectively. The number of gyro sensors to be used and a combination thereof may be optionally selected so long as the angular velocities around the three axes can be detected. For example, the gyro sensor 703 may be a three-axis gyro sensor, or a two-axis gyro sensor and a one-axis gyro sensor may be combined to detect the angular velocities around the three axes. Data representing the angular velocities detected by the gyro sensor 703 is output to the communication section 75. The gyro sensor 703 may be a gyro sensor for detecting an angular velocity around on axis or angular velocities around two axes.

The communication section 75 includes the microcomputer 751, a memory 752, the wireless module 753 and the antenna 754. The microcomputer 751 controls the wireless module 753 for wirelessly transmitting data acquired by the microcomputer 751 to the game apparatus body 5, while using, in the process, the memory 752 as a storage region.

The data outputted from the operation section 72, the imaging information calculation section 74, the acceleration sensor 701 and the gyro sensor 703 to the microcomputer 751 are temporarily stored in the memory 752. These data are transmitted as the operation data (controller operation data) to the game apparatus body 5. That is, at a timing of the data transmission to the controller communication module 19 of the game apparatus body 5, the microcomputer 751 outputs the operation data stored in the memory 752 to the wireless module 753. The wireless module 753 modulates the operation data to a carrier wave of a predetermined frequency by using, for example, the Bluetooth technology, and radiates the low power radio wave signal from the antenna 754. That is, the operation data is modulated to the low power radio wave signal by the wireless module 753 and transmitted from the controller 7. The controller communication module 19 of the game apparatus body 5 receives the low power radio wave signal. The game apparatus body 5 performs demodulation or decoding on the received low power radio wave signal to obtain the operation data from the controller 7. Based on the operation data obtained from the controller 7, the CPU 10 of the game apparatus body 5 performs a game process. The wireless transmission from the communication section 75 to the controller communication module 19 is sequentially performed at predetermined time intervals. Since a game process is generally performed at a cycle of 1/60 sec. (corresponding to one frame time), data transmission may be performed at a cycle of a shorter time period. The communication section 75 of the controller 7 outputs, to the controller communication module 19 of the game apparatus body 5, the operation data at intervals of 1/200 seconds, for example.

As described above, the controller 7 is capable of transmitting, as operation data representing operations to the controller 7, the marker coordinate data, the acceleration data, the angular velocity data, and the operation button data. Further, the game apparatus body 5 is capable of executing a game process by using the operation data as a game input. Accordingly, the controller 7 allows a user to perform a game operation of moving the controller 7 itself as well as a conventional typical game operation of pressing the respective operation buttons. For example, the user is allowed to perform an operation of tilting the controller 7 at a desired angle of tilt, an operation of designating a desired position on the screen by the controller 7, and an operation of moving the controller 7 itself.

Further, in the exemplary embodiment, the controller 7 does not have display means for displaying a game image. However, the controller 7 may have display means for displaying an image or the like representing, for example, a remaining battery level.

Figure 8:
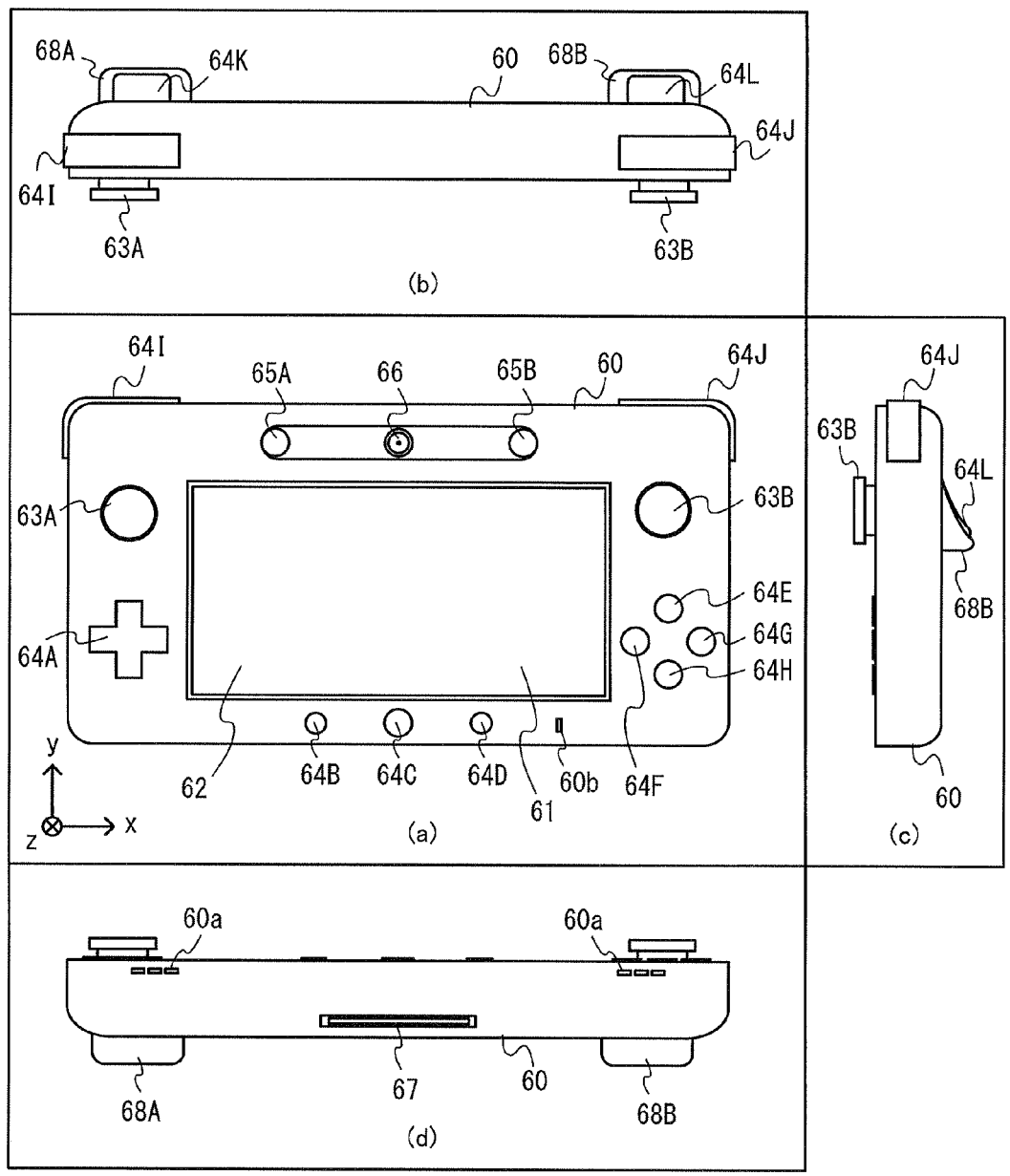
FIG. 8 is a diagram showing a non-limiting example of an external structure of a terminal device 6 shown in FIG. 1.
Figure 10:
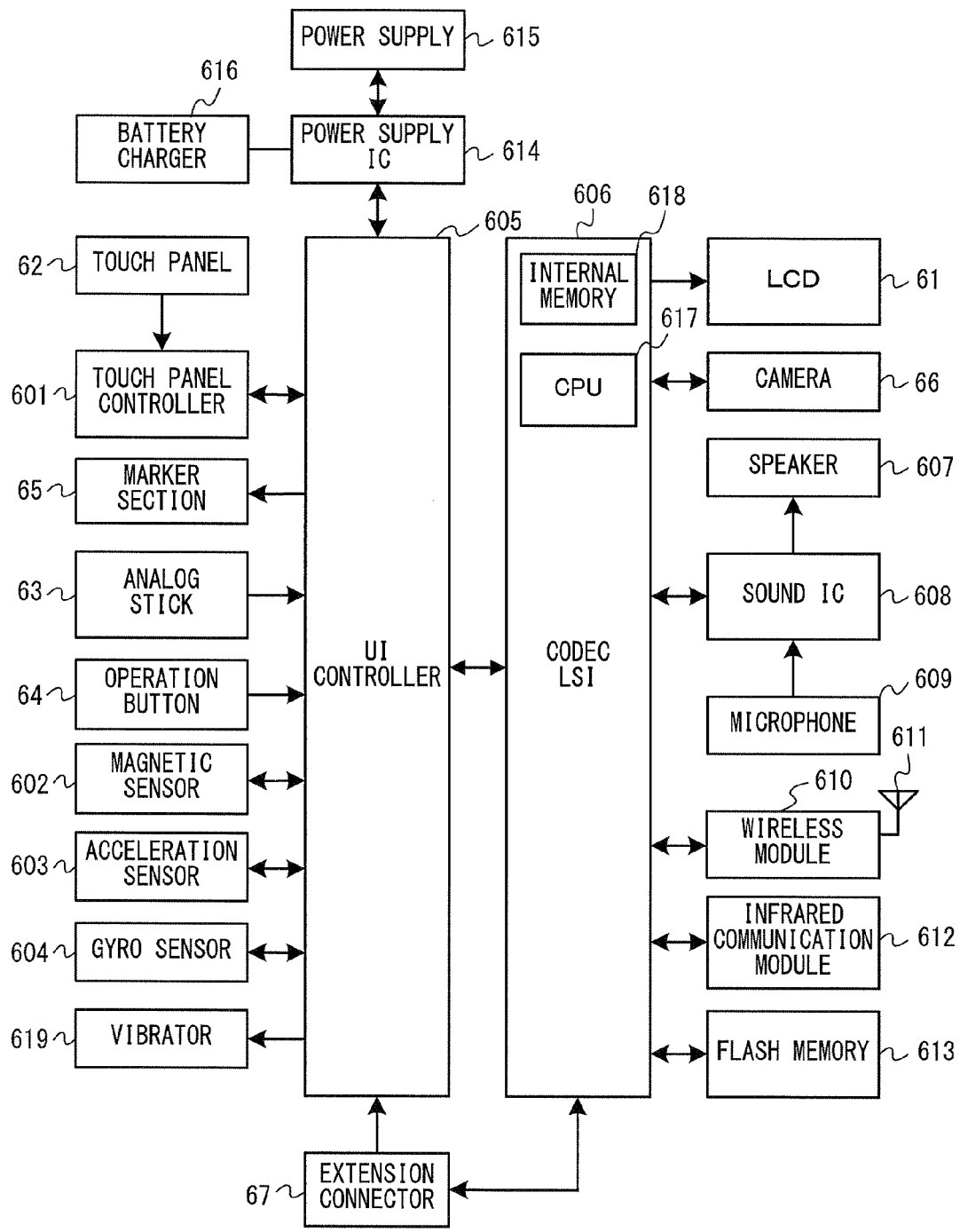
FIG. 10 is a block diagram showing a non-limiting example of an internal structure of the terminal device 6 shown in FIG. 8.

Next, a structure of the terminal device 6 will be described with reference to FIGS. 8 to 10. FIG. 8 is a diagram illustrating an example of an external structure of the terminal device 6. More specifically, (a) of FIG. 8 is a front view of the terminal device 6, (b) of FIG. 8 is a top view, (c) of FIG. 8 is a right side view, and (d) of FIG. 8 is a bottom view. FIG. 9 shows an example of a state in which a user holds the terminal device 6 with both hands.

As shown in FIG. 8, the terminal device 6 includes a housing 60 which generally has a horizontally long plate-like rectangular shape. The housing 60 is small enough to be held by the user. Therefore, the user is allowed to move the terminal device 6 with hands, and change the location of the terminal device 6.

The terminal device 6 includes an LCD 61 on a front surface of the housing 60. The LCD 61 is provided near the center of the front surface of the housing 60. Therefore, as shown in FIG. 9, the user, holding the housing 60 at portions to the right and left of the LCD 61, is allowed to move the terminal device 6 while viewing a screen of the LCD 61. FIG. 9 shows an example in which the user holds the terminal device 6 horizontally (i.e., with the longer sides of the terminal device 6 being oriented horizontally) by holding the housing 60 at portions to the right and left of the LCD 61. However, the user may hold the terminal device 6 vertically (i.e., with the longer sides of the terminal device 6 being oriented vertically).

As shown in (a) of FIG. 8, the terminal device 6 includes, as operation means, a touch panel 62 on the screen of the LCD 61. In the exemplary embodiment, the touch panel 62 is, but is not limited to, a resistive film type touch panel. However, a touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Although an input onto the touch panel 62 is usually performed by using a touch pen, in addition to the touch pen, a finger of the user may be used for performing an input onto the touch panel 62. The housing 60 may have an opening for accommodating the touch pen used for performing an operation to the touch panel 62. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 8, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction by using the analog stick 63A or 63B with either the left or right hand. Further, as shown in FIG. 9, the analog sticks 63A and 63B are positioned so as to be operated by the user holding the right and left portions of the terminal device 6. Therefore, the user is allowed to easily operate the analog sticks 63A and 63B when the user holds and moves the terminal device 6.

The operation buttons 64A to 64L are each operation means for performing a predetermined input. As described below, the operation buttons 64A to 64L are positioned so as to be operated by the user holding the right and left portions of the terminal device 6 (see FIG. 9). Accordingly, the user is allowed to easily operate the operation means when the user holds and moves the terminal device 6.

As shown in (a) of FIG. 8, among the operation buttons 64A to 64L, the cross button (direction input button) 64A and the operation buttons 64B to 64H are provided on the front surface of the housing 60. The operation buttons 64A to 64H are positioned so as to be operated by a thumb of the user (see FIG. 9).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B to 64D are provided beneath the LCD 61. The three operation buttons 64B to 64D are positioned so as to be operated by the right and left hands of the user. The four operation buttons 64E to 64H are provided to the right of the LCD 61 and beneath the right analog stick 63B. That is, the four operation buttons 64E to 64H are positioned so as to be operated by the right hand of the user. Further, the four operation buttons 64E, 64H, 64F, and 64G are positioned upward, downward, leftward, and rightward, respectively, with respect to a center position of the four operation buttons. Accordingly, the terminal device 6 may cause the four operation buttons 64E to 64H to function as buttons which allow the user to designate an upward, a downward, a leftward, or a rightward direction.

As shown in (a), (b), and (c) of FIG. 8, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 9).

As shown in (b) and (c) of FIG. 8, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 9). Further, as shown in (c) of FIG. 8, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. Since it is supposed that the middle finger of the user moves vertically when the user holds the terminal device 6, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal device 6 shown in FIG. 8, the second L button 64K and the second R button 64L are provided on the rear surface of the housing 60. Therefore, if the terminal device 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal device 6 is placed on a floor with the screen of the LCD 61 facing upward, the three or more leg parts contact the floor. Thus, the terminal device 6 can be placed with the screen of the LCD 61 being horizontal. Such a horizontal placement of the terminal device 6 may be achieved by providing detachable leg parts on the rear surface of the housing 60.

The respective operation buttons 64A to 64L are assigned functions, according to need, in accordance with a game program. For example, the cross button 64A may be used for direction designation operation, selection operation, and the like, and the operation buttons 64E to 64H may be used for determination operation, cancellation operation, and the like.

The terminal device 6 includes a power button (not shown) for turning on/off the power of the terminal device 6. The terminal device 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 10).

As shown in (a) of FIG. 8, the terminal device 6 includes a marker section (a marker section 65 shown in FIG. 10) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal device 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal device 6. For example, the camera 66 is capable of taking an image of the user playing a game while viewing the LCD 61.

The terminal device 6 has a microphone (a microphone 609 shown in FIG. 10) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal device 6.

The terminal device 6 has loudspeakers (loudspeakers 607 shown in FIG. 10) as sound output means. As shown in (d) of FIG. 8, speaker holes 60a are provided in the lower side surface of the housing 60. A sound is output through the speaker holes 60a from the loudspeakers 607. In the exemplary embodiment, the terminal device 6 has two loudspeakers, and the speaker holes 60a are provided at positions corresponding to a left loudspeaker and a right loudspeaker, respectively.

The terminal device 6 includes an extension connector 67 for connecting another device to the terminal device 6. In the exemplary embodiment, as shown in (d) of FIG. 8, the extension connector 67 is provided in the lower side surface of the housing 60. Any device may be connected to the extension connection 67. For example, a controller (a gun-shaped controller or the like) used for a specific game or an input device such as a keyboard may be connected to the extension connector 67. If another device need not be connected, the extension connector 67 need not be provided.

In the terminal device 6 shown in FIG. 8, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 10. FIG. 10 is a block diagram illustrating an example of an internal structure of the terminal device 6. As shown in FIG. 10, the terminal device 6 includes, in addition to the components shown in FIG. 8, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable. Charging of the terminal device 6 may be performed by setting the terminal device 6 on a cradle (not shown) having a charging function.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and an amount of the sliding (tilting). The operation button 64 outputs, to the UI controller 605, operation button data representing an input state of each of the operation buttons 64A to 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal device 6 because the orientation data changes when the terminal device 6 moves.

The acceleration sensor 603 is provided inside the housing 60. The acceleration sensor 603 detects the magnitudes of linear accelerations along three axial directions (xyz axial directions shown in (a) of FIG. 8), respectively. Specifically, in the acceleration sensor 603, the long side direction of the housing 60 is defined as the x-axial direction, the short side direction of the housing 60 is defined as the y-axial direction, and the direction orthogonal to the front surface of the housing 60 is defined as the z-axial direction, thereby detecting the magnitudes of the linear accelerations in the respective axial directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. However, in another embodiment, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities around the three axes (the above-described xyz axes), respectively. Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities around three axes are detected. The gyro sensor 604 may be constituted by a two-axis gyro sensor and a one-axis gyro sensor, like the gyro sensor 703. Alternatively, the gyro sensor 604 may be a gyro sensor for detecting the angular velocity around one axis or two axes.

The vibrator 619 is, for example, a vibration motor or a solenoid. The vibrator 619 is connected to the UI controller 605. The terminal device 6 is vibrated by actuating the vibrator 619 in accordance with a control instruction outputted from the UI controller 605 to the vibrator 619. The vibration of the terminal device 6 is transmitted to the user's hand holding the terminal device 6. Thus, a so-called vibration-feedback game is realized.

The UI controller 605 outputs, to the codec LSI 606, the operation data including the touch position data, the stick data, the operation button data, the orientation data, the acceleration data, and the angular velocity data, which have been received from the respective components. If another device is connected to the terminal device 6 through the extension connector 67, data representing operation to the other device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal device 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard. The data transmitted from the wireless module 610 may be encrypted according to need, or may not be encrypted As described above, the transmission data transmitted from the terminal device 6 to the game apparatus body 5 includes the operation data (terminal operation data), the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5. Since the marker section 65 is constituted by infrared LEDs, the marker section 65 is controlled by simply turning on/off the supply of power thereto.

As described above, the terminal device 6 includes the operation means such as the touch panel 62, the analog sticks 63, and the operation buttons 64. In another embodiment, however, the terminal device 6 may include other operation means instead of or in addition to these operation means.

The terminal device 6 includes the magnetic sensor 602, the acceleration sensor 603, and the gyro sensor 604 as sensors for calculating the movement (including the position and the attitude, or a change in the position or the attitude) of the terminal device 6. In another embodiment, however, the terminal device 6 may include one or two of these sensors. In still another embodiment, the terminal device 6 may include other sensors instead of or in addition to these sensors.

The terminal device 6 includes the camera 66 and the microphone 609. In another embodiment, however, the terminal device 6 may not include the camera 66 and the microphone 609, or may include either of the cameral 66 and the microphone 609.

The terminal device 6 includes the marker section 65 as a component for calculating the positional relation between the terminal device 6 and the controller 7 (such as the position and/or the attitude of the terminal device 6 as viewed from the controller 7). In another embodiment, however, the terminal device 6 may not include the marker section 65. In still another embodiment, the terminal device 6 may include other means as a component for calculating the above-mentioned positional relation. For example, the controller 7 may include a marker section, and the terminal device 6 may include an image pickup element. In this case, the marker 8 may include an image pickup element instead of an infrared LED.

Figure 11:
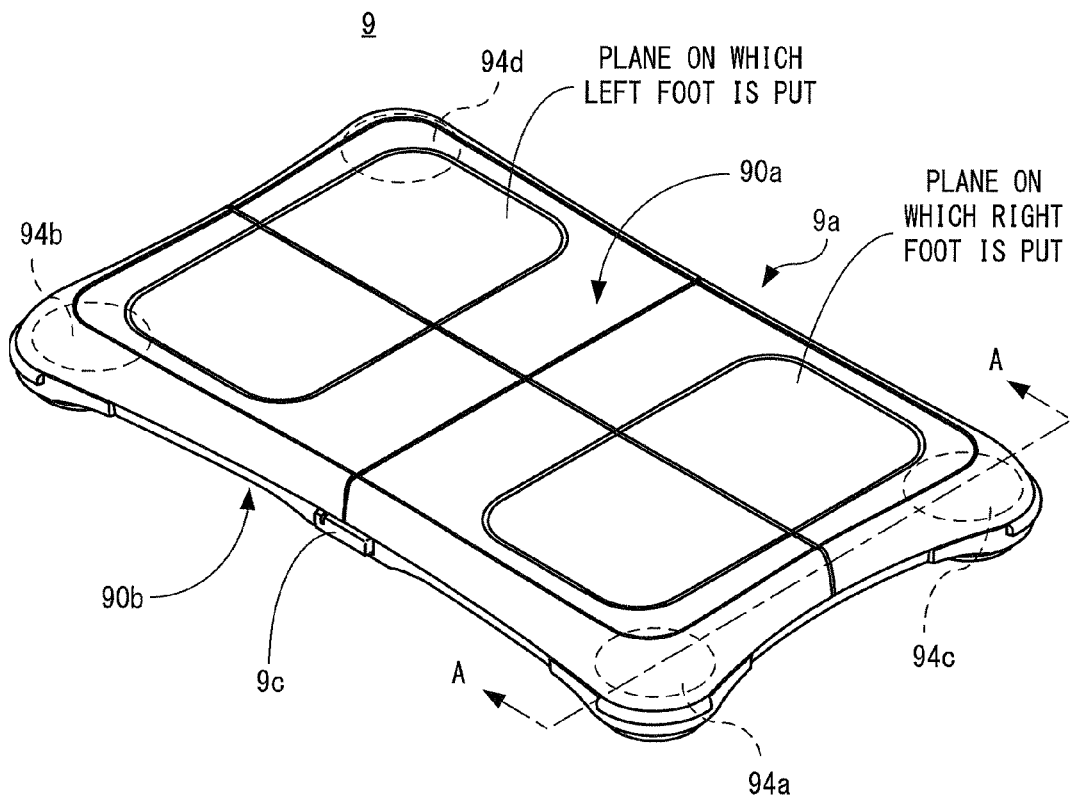
FIG. 11 is a perspective view showing a non-limiting example of a board type controller 9 shown in FIG. 1.

Next, a structure of the board type controller 9 will be described with reference to FIGS. 11 to 13. FIG. 11 is a perspective view illustrating an example of an external appearance of the board type controller 9 shown in FIG. 1. As shown in FIG. 11, the board type controller 9 includes a platform 9a on which a user stands (on which the user puts his/her feet), and at least four load sensors 94a to 94d for detecting a load applied to the platform 9a. Each of the load sensors 94a to 94d is embedded in the platform 9a (see FIG. 12), and the positions where the load sensors 94a to 94d are provided are indicated by dotted lines in FIG. 11. In the following description, the four load sensors 94a to 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of his/her feet contacting thereto. Specifically, the upper surface of the platform 9a has a plane (a back-left region enclosed with a double line in FIG. 11) on which the user's left foot is put, and a plane (a front-right region enclosed with a double line in FIG. 11) on which the user's right foot is put. The platform 9a has, at four corners thereof, side surfaces each partially projecting outward in a cylindrical shape.

In the platform 9a, the four load sensors 94a to 94d are arranged at predetermined intervals. In the exemplary embodiment, the four load sensors 94a to 94d are arranged on the periphery of the platform 9a, more specifically, at the four corners of the platform 9a, respectively. The intervals of the load sensors 94a to 94d are appropriately set such that the load sensors 94a to 94d can accurately detect the intention of a game operation which is expressed by a manner of applying a load onto the platform 9a by the user.

Figure 12:
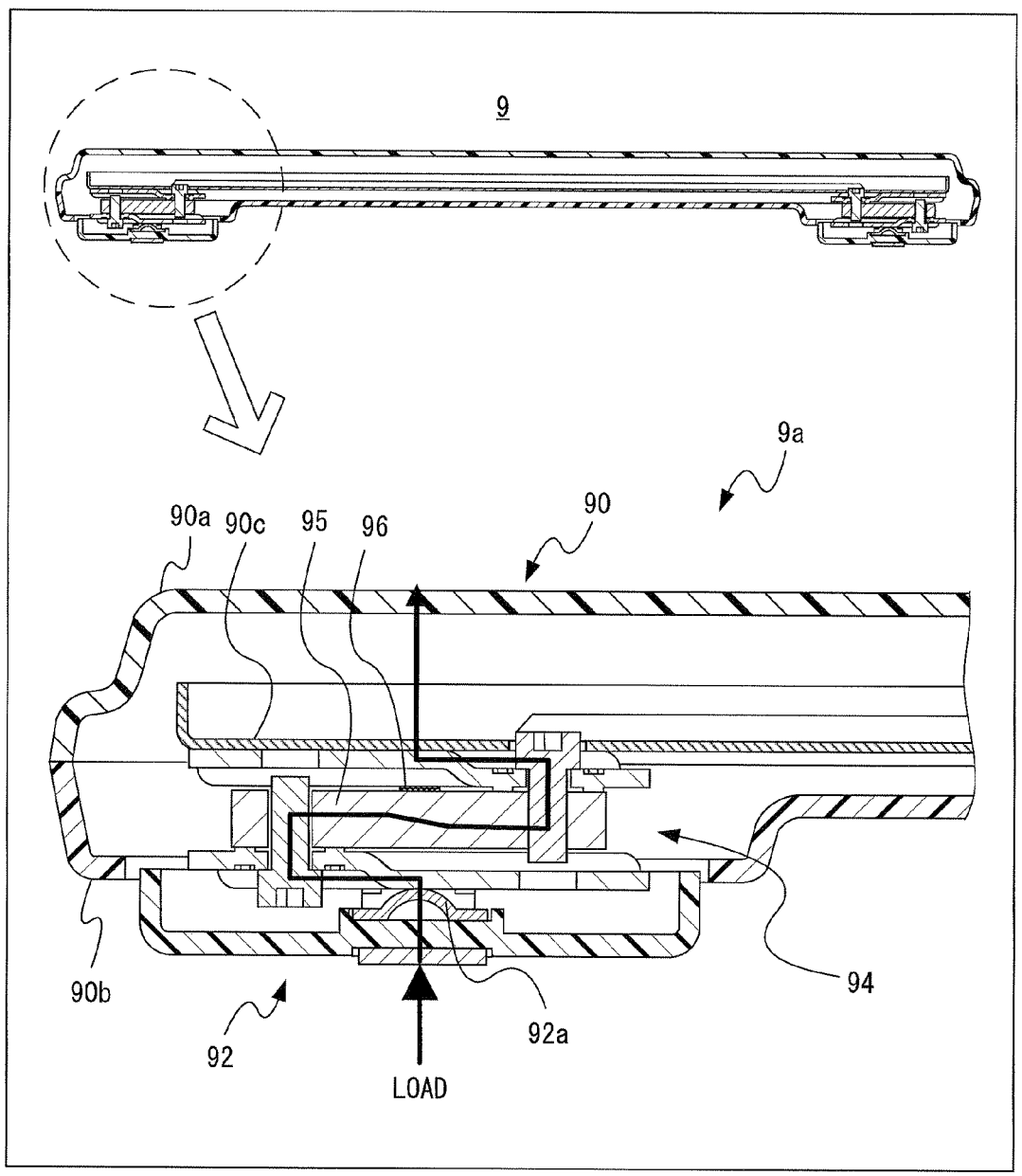
FIG. 12 is a diagram showing a non-limiting example of a cross-sectional view of the board type controller 9 taken along a line A-A in FIG. 11, and a non-limiting example of an enlarged view of a corner portion in which a load sensor 94 is provided.

FIG. 12 shows an example of a cross-sectional view of the board type controller 9, taken along a line A-A in FIG. 11, and an example of an enlarged view of a corner part where a load sensor 94 is arranged. In FIG. 12, the platform 9a includes a support plate 90 on which the user stands, and legs 92. The load sensors 94a to 94d are provided in positions where the legs 92 are provided. In the exemplary embodiment, since the four legs 92 are provided at the four corners, the four load sensors 94a to 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a to 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a to 94d. As indicated by arrows in FIG. 12, a reaction from a floor, which is generated by the input load, is transferred from the legs 92 through the spherical parts 92a, the load sensors 94a to 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body.95 Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 11, the board type controller 9 further includes a power button 9c. When the power button 9c is operated (e.g., when the power button 9c is pressed) in the state where the board type controller 9 is not activated, power is supplied to each of circuit components (see FIG. 13) of the board type controller 9. However, there are cases in which the board type controller 9 is powered on in accordance with an instruction from the game apparatus body 5 and thereby supply of power to the circuit components is started. The board type controller 9 may be automatically powered off when a state where the user does not stand thereon continues for a predetermined period of time (e.g., 30 sec) or more. Further, when the power button 9c is again operated in the state where the board type controller 9 is in the active state, the board type controller 9 may be powered off to stop supply of power to the circuit components.

FIG. 13 is a block diagram showing an example of an electrical configuration of the board type controller 9. In FIG. 13, flows of signals and data are indicated by solid arrows, and supply of power is indicated by dotted arrows.

As shown in FIG. 13, the board type controller 9 includes a microcomputer 100 for controlling the operation thereof. The microcomputer 100 includes a CPU, a ROM, a RAM, and the like, which are not shown. The CPU controls the operation of the board type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a to 94b are connected to the AD converter 102 via amplifiers 108, respectively.

Further, the board type controller 9 includes a battery 110 for supplying power to the circuit components. In another embodiment, an AC adapter may be connected to the board type controller 9 instead of the battery 110 so that commercial power is supplied to the circuit components. In this case, instead of the DC-DC converter 104, a power circuit, which converts alternating current into direct current and lowers and rectifies a direct-current voltage, may be provided in the board type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9c is turned on and whether or not a command that instructs power-on is transmitted from the game apparatus body 5. On the other hand, power is supplied from the battery 110 through the DC-DC converter 104 to the load sensors 94a to 94d, the AD converter 102, and the amplifiers 108. The DC-DC converter 104 converts a voltage value of direct current supplied from the battery 110 into a different voltage value, and supplies the resultant direct current to the load sensors 94a to 94d, the AD converter 102, and the amplifiers 108.

Supply of power to the load sensors 94a to 94d, the A/D converter 102 and the amplifiers 108 may be performed according to need by the microcomputer 100 that controls the DC-DC converter 104. Specifically, when the microcomputer 100 determines that it is necessary to operate the load sensors 94a to 94d to detect a load, the microcomputer 100 may control the DC-DC converter 104 to supply power to the load sensors 94a to 94d, the A/D converter 102 and the amplifiers 108.

When power is supplied to the load sensors 94a to 94d, the load sensors 94a to 94d each output a signal indicating a load inputted thereto. These signals are amplified by the respective amplifiers 108, and converted from analog signals into digital data by the A/D converter 102. The digital data is input to the microcomputer 100. The detected values of the load sensors 94a to 94d are given identification information of the load sensors 94a to 94d, so that the load sensors 94a to 94d can be identified from the corresponding detected values. Thus, the microcomputer 100 can obtain the data representing the detected load values of the four load sensors 94a to 94d at the same time.

On the other hand, when the microcomputer 100 determines that it is not necessary to operate the load sensors 94a to 94d, i.e., when it is not the time for load detection, the microcomputer 100 controls the DC-DC converter 104 to stop supply of power to the load sensors 94a to 94d, the A/D converter 102, and the amplifiers 108. Thus, the board type controller 9 can operate the load sensors 94a to 94d to detect a load or a distance only when it is required, resulting in a reduction in power consumption for load detection.

Load detection is typically required when the game apparatus body 5 (FIG. 1) needs to obtain load data. For example, when game apparatus body 5 requires load information, the game apparatus body 5 transmits an information acquisition command to the board type controller 9. When the microcomputer 100 receives the information acquisition command from the game apparatus body 5, the microcomputer 100 controls the DC-DC converter 104 to supply power to the load sensors 94a to 94d and the like, thereby detecting a load. On the other hand, when the microcomputer 100 does not receive a load acquisition command from the game apparatus body 5, the microcomputer 100 controls the DC-DC converter 104 to stop supply of power to the load sensors 94a to 94d and the like.

The microcomputer 100 may control the DC-DC converter 104 based on a determination that load detection timing occurs at predetermined intervals. When such periodic load detection is performed, information regarding the constant time period may be supplied and stored from the game apparatus body 5 to the microcomputer 100 of the board type controller 9 when the game is started, or it may be preinstalled in the microcomputer 100.

The data representing the detected values from the load sensors 94a to 94d are transmitted as board operation data (input data) for the board type controller 9 from the microcomputer 100 via the radio module 106 and an antenna 106b to the game apparatus body 5. For example, when the microcomputer 100 has performed load detection according to a command from the game apparatus body 5, the microcomputer 100 transmits the detected value data of the load sensors 94a to 94d to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection timings up to the next transmission timing may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board type controller 9 through the controller communication module 19 and the like. Thus, the board type controller 9 is allowed to receive the command from the game apparatus body 5 through the wireless module 106 and the antenna 106a. Further, the board type controller 9 is allowed to transmit the board operation data including the load detection values (or load calculation values) of the load sensors 94a to 94d to the game apparatus body 5.

For example, in a game which is executed based on a simple sum of four load values detected by the four load sensors 94a to 94d, the user is allowed to stand at any position with respect to the four load sensors 94a to 94d of the board type controller 9. That is, the user is allowed to stand on the platform 9a at any position and in any direction to play a game. In some kinds of games, however, the direction of a load value detected by each of the four load sensors 94 viewed from the user needs to be identified. That is, a positional relation between the four load sensors 94 of the board type controller 9 and the user needs to be recognized. In this case, for example, the positional relation between the four load sensors 94 and the user may be previously defined, and the user may be supposed to stand on the platform 9a in a manner which allows the predetermined positional relation. Typically, a positional relation in which two of the load sensors 94a to 94d are present in front of, behind, to the right of, and to the left of the user standing in the center of the platform 9a, i.e., a positional relation in which the user stands in the center of the platform 9a of the board type controller 9, is defined. In this case, the platform 9a of the board type controller 9 is rectangular in shape as viewed from the top, and the power button 9c is provided at one side (long side) of the rectangle. Therefore, it is previously ruled that the user, using the power button 9c as a guide, stands on the platform 9a such that the long side at which the power button 9c is provided is located in a predetermined direction (front, rear, left or right). In this case, each of the load values detected by the load sensors 94a to 94d is a load value of a predetermined direction (front right, front left, rear right, or rear left) as viewed from the user. Therefore, the board type controller 9 and the game apparatus body 5 can find out a direction to which each detected load value corresponds as viewed from the user, based on the identification information of the load sensors 94 contained in the detected load value data, and arrangement data representing previously set (stored) positions or directions of the load sensors 94 with respect to the user. As a result, it is possible to understand the intention of a game operation performed by the user, such as an operating direction, for example, forward, backward, rightward, or leftward direction, or a user's foot being lifted.

Figure 14:
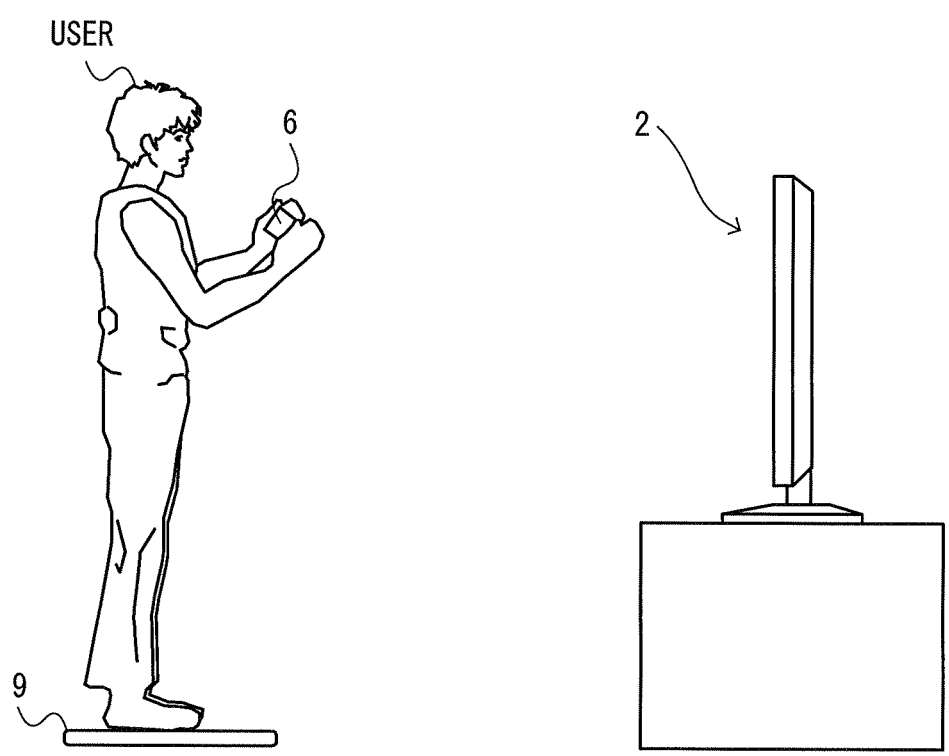
FIG. 14 is a diagram showing a non-limiting example of a user who plays a first exemplary game by using the terminal device 6 and the board type controller 9.
Figure 15A:
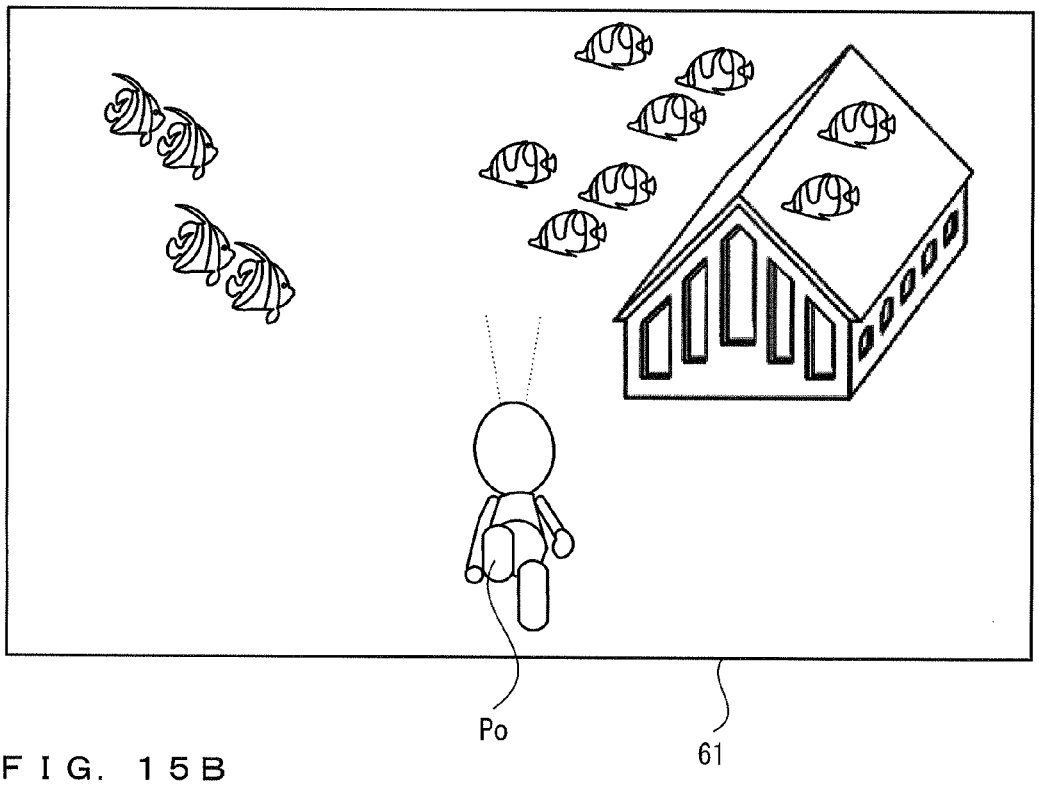
FIG. 15A is a diagram showing a non-limiting example of an image displayed on a LCD 61 of the terminal device 6 in the first exemplary game.
Figure 15B:
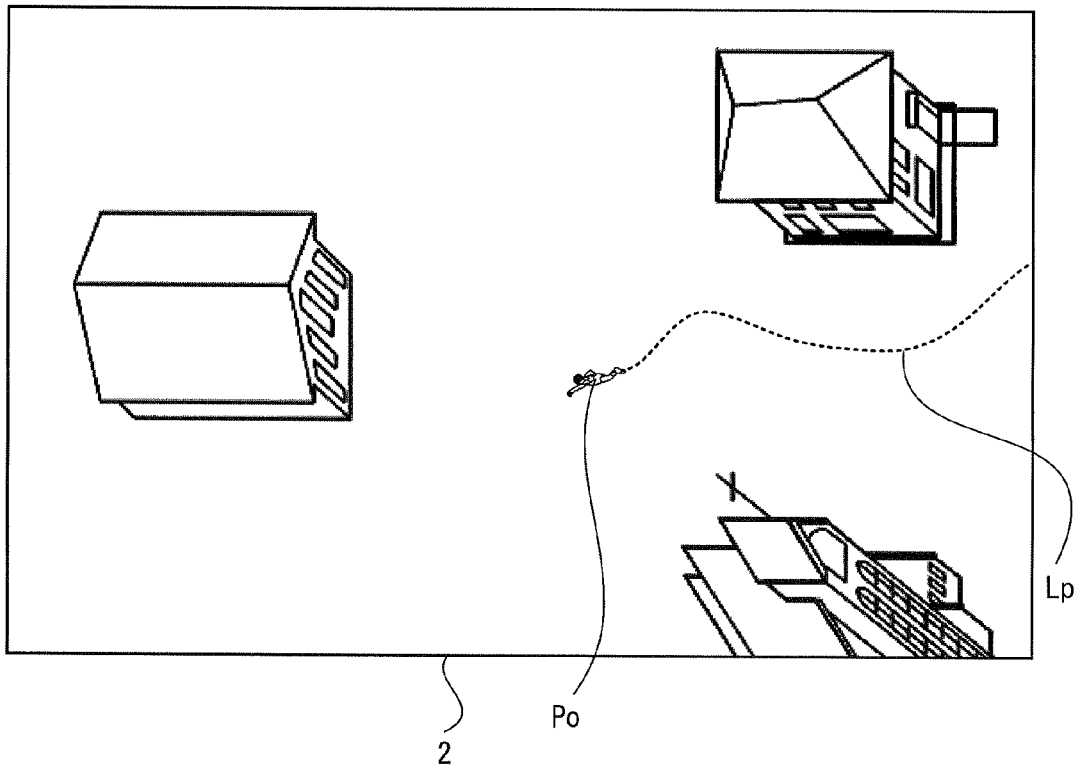
FIG. 15B is a diagram showing a non-limiting example of an image displayed on a monitor 2 in the first exemplary game.

Next, an outline of information processing performed on the game apparatus body 5 will be described with reference to FIGS. 14, 15A, and 15B before a specific description of processes performed by the game apparatus body 5 is given. In the following description of the outline of information processing, a first exemplary game is used as an example of information processing. FIG. 14 is a diagram showing an example of a user who plays the first exemplary game by using the terminal device 6 and the board type controller 9. FIG. 15A is a diagram showing an example of an image of the first exemplary game, which is displayed on the LCD 61 of the terminal device 6. FIG. 15B is a diagram illustrating an example of an image of the first exemplary game, which is displayed on the monitor 2.

As shown in FIG. 14, in the first exemplary game, the user performs an operation by using the terminal device 6 and the board type controller 9. Specifically, the user holding the terminal device 6 stands on the board type controller 9, and performs an operation. Then, the user performs an action (e.g., stepping or knee bending) on the board type controller 9 and simultaneously performs an operation to move the terminal device 6, while viewing the image displayed on the monitor 2 and the image displayed on the LCD 61 of the terminal device 6, thereby playing the game. On the LCD 61 of the terminal device 6 and on the monitor 2, a player object Po performs an action in a virtual space, in accordance with the direction or the attitude of the terminal device 6 held by the user as well as the user's action on the board type controller 9.

As shown in FIG. 15A, on the LCD 61 of the terminal device 6, the player object Po moving in the virtual space is displayed. In the example shown in FIG. 15A, a state of the virtual space viewed at close range from behind the player object Po swimming in the sea is displayed together with player object Po. Displaying, on the LCD 61, the virtual space viewed at close range from behind the player object Po allows the user holding the terminal device 6 to have a sense of presence in the virtual space, and allows the user to intuitively know the movement direction and the movement speed of the player object Po.

Further, as shown in FIG. 15B, the same virtual space as that displayed on the LCD 61 is displayed on the monitor 2. In the example shown in FIG. 15B, a state of the virtual space in which the player object Po swimming in the sea is viewed from a distance in a manner of bird's eye viewing is displayed together with the player object Po. In the example shown in FIG. 15B, a movement trajectory Lp of the player object Po in the sea is displayed in the virtual space. Displaying, on the monitor 2, the virtual space in which the player object Po is viewed from a distance in a manner of bird's eye viewing allows the user to easily know the surroundings of the player object Po, and allows another person who watches the user's playing the first exemplary game to enjoy a view in which the player object Po moves in the virtual space.

For example, when the user performs stepping on the board type controller 9, the player object Po swims in the sea with flutter kicks at a speed based on the user's stepping. When the user performs knee bending on the board type controller 9, the player object Po swims in the sea with dolphin kicks at a speed based on the user's knee bending. In this way, the user is allowed to change the swimming style or the movement speed of the player object Po in accordance with his/her action on the board type controller.

For example, as described above, detected load values based on the user's action on the board type controller 9 are output from the board type controller 9. Using the detected load values allows calculation of a total load applied to the board type controller 9, and a center-of-gravity position of the load applied to the board type controller 9. Further, using a change in the total load or a change in the center-of-gravity position allows estimation of the action of the user on the board type controller 9. Based on the estimated user's action on the board type controller 9, the swimming style and the movement speed of the player object Po are set.

Further, the direction in which the player object Po swims in the sea changes in accordance with the direction or the attitude of the terminal device 6 held by the user. For example, when the user turns the terminal device 6 in the upward, downward, leftward, or rightward direction, the direction in which the player object Po swims changes with the change in the direction of the terminal device 6. Specifically, when the user changes the direction of the terminal device 6 such that the back surface of the terminal device 6 faces upward, the swimming direction of the player object Po changes such that the player object Po swims upward to the surface of the sea. When the user changes the direction of the terminal device 6 such that the back surface of the terminal device 6 faces leftward, the swimming direction of the player object Po changes to the left as viewed from the player object Po. In this way, the user is allowed to change the movement direction of the player object Po in accordance with the direction or the attitude of the terminal device 6 held by the user.

For example, acceleration data or angular velocity data based on a change in the attitude of the terminal device 6 is output from the terminal device 6. Since the direction of the gravitational acceleration applied to the terminal device 6 can be calculated by using the acceleration represented by the acceleration data, it is possible to estimate the attitude of the terminal device 6 with respect to the vertical direction in the real space. Further, since the angular velocity and/or the dynamic acceleration applied to the terminal device 6 are known by using the angular velocity represented by the angular velocity data and/or the acceleration represented by the acceleration data, it is possible to estimate a change in the attitude (a change in the direction) of the terminal device from its initial attitude in the real space by using the angular velocity and/or the dynamic acceleration. Based on the estimated attitude change (direction change) of the terminal device, the movement direction of the player object Po is set.

Next, a process performed by the game system 1 will be described in detail. First, main data used in the process will be described with reference to FIG. 16. FIG. 16 is a diagram illustrating an example of main data and programs stored in the external main memory 12 and/or the internal main memory 35 (hereinafter, these two main memories are collectively referred to as a main memory) of the game apparatus body 5.

As shown in FIG. 16, in a data storage area of the main memory, board operation data Da, terminal operation data Db, load value data Dc, center-of-gravity position data Dd, terminal device direction/attitude data De, action data Df, movement vector data Dg, position data Dh, movement trajectory data Di, virtual camera data Dj, image data Dk, and the like are stored. In addition to the data shown in FIG. 16, data required for a game process, such as image data of various objects displayed on the monitor 2 and the LCD 61, and sound data used for a game, are optionally stored in the main memory. In a program storage area of the main memory, various programs Pa constituting an information processing program are stored.

As the board operation data Da, a series of operation information (board operation data) transmitted as transmission data from the board type controller 9 is stored, and updated to the latest board operation data. For example, the board operation data Da includes load data Da1 and the like. The load data Da1 is data representing load values detected by the load sensors 94a to 94d of the board type controller 9.

As the terminal operation data Db, a series of operation information (terminal operation data) transmitted as transmission data from the terminal device 6 is stored, and updated to the latest terminal operation data. For example, the terminal operation data Db includes acceleration data Db1, angular velocity data Db2, and the like. The acceleration data Db1 is data representing an acceleration (an acceleration vector) detected by the acceleration sensor 603. For example, the acceleration data Db1 represents a three-dimensional acceleration vector whose components are accelerations in the three-axis (x-axis, y-axis, and z-axis) directions shown in FIG. 8. In another embodiment, the acceleration data Db1 may represent an acceleration in any one or more directions. The angular velocity data Db2 is data representing an angular velocity detected by the gyro sensor 604. For example, the angular velocity data Db2 represents angular velocities around the three axes (x-axis, y-axis, and z-axis) shown in FIG. 8. In another example, the angular velocity data Db2 may represent an angular velocity around any one or more axes.

The game apparatus body 5 sequentially receives the data (e.g., the data representing the detected load value, the acceleration, and the angular velocity) included in the operation information transmitted from the controller 7, the board type controller 9, and the terminal device 6 at predetermined intervals (e.g., at intervals of 1/200 sec.). For example, the received data is successively stored in the main memory by the I/O processor 31. In a process flow described later, the CPU 10 reads, every frame period (e.g., 1/60 sec.), the latest board operation data and the latest terminal operation data from the main memory, to update the board operation data Da and the terminal operation data Db, respectively.

The operation information transmitted at predetermined intervals from the controller 7, the board type controller 9, and the terminal device 6 may be temporarily stored in the buffer (not shown) included in the controller communication module 19 or the terminal communication module 28. In this case, the data stored in the buffer is read every frame period, and thus the board operation data Da (e.g., the load data Da1) or the terminal operation data Db (e.g., the acceleration data Db1 and the angular velocity data Db2) in the main memory is updated to be used. At this time, since the cycle of receiving the operation information is different from the processing cycle, a plurality of pieces of information received at a plurality of timings are stored in the buffer. The process is executed by using only the latest operation information among the plurality of pieces of operation information received at the plurality of timings.

The load value data Dc is an aggregate of data each representing a load value detected by the board type controller 9. For example, the load value data Dc is an aggregate of data each representing a sum of load values (total load value) detected by the load sensors 94a to 94d. Specifically, the load value data Dc is an array of data each representing the above-mentioned total load value within a predetermined period, which is calculated time-sequentially, and the data representing the total load value is time-sequentially stored in each element of the array.

The center-of-gravity position data Dd is an aggregate of data each representing a center-of-gravity position of a load applied to the board type controller 9. For example, the center-of-gravity position data Dd is an aggregate of data each representing a position of center of gravity which is calculated based on the load values detected by the respective load sensors 94a to 94d by using a predetermined numerical formula. Specifically, the center-of-gravity position data Dd is an array of data each representing the above-mentioned center-of-gravity position within a predetermined period, which is calculated time-sequentially, and the data representing the center-of-gravity position is time-sequentially stored in each element of the array.

The terminal device direction/attitude data De is data representing a direction and an attitude of the terminal device 6 in the real space. For example, the terminal device direction/attitude data De is calculated based on the acceleration data Db1 and the angular velocity data Db2 included in the terminal operation data Db. A method for calculating the terminal device direction/attitude data De will be described later.

The action data Df is data representing an action and an attitude of the player object Po in the virtual world. The movement vector data Df is data representing a movement speed and a movement direction of the player object Po in the virtual world. For example, the movement vector data Df represents a movement vector in the virtual world. The position data Dh is data representing a position of the player object Po in the virtual world. The movement trajectory data is data representing a trajectory along which the player object Po has moved in the virtual world. The virtual camera data Dj is data relating to a virtual camera set in the virtual world. For example, the virtual camera data Dj includes data relating to a first virtual camera for generating a game image to be displayed on the LCD 61 of the terminal device 6, and data relating to a second virtual camera for generating a game image to be displayed on the monitor 2.

The image data Dk includes player object data Dk1, background image data Dk2, and the like. The player object data Dk1 is data for arranging the player object Po in the virtual world to generate a game image. The background image data Dk2 is data for arranging a background in the virtual world to generate a game image.

Figure 17:
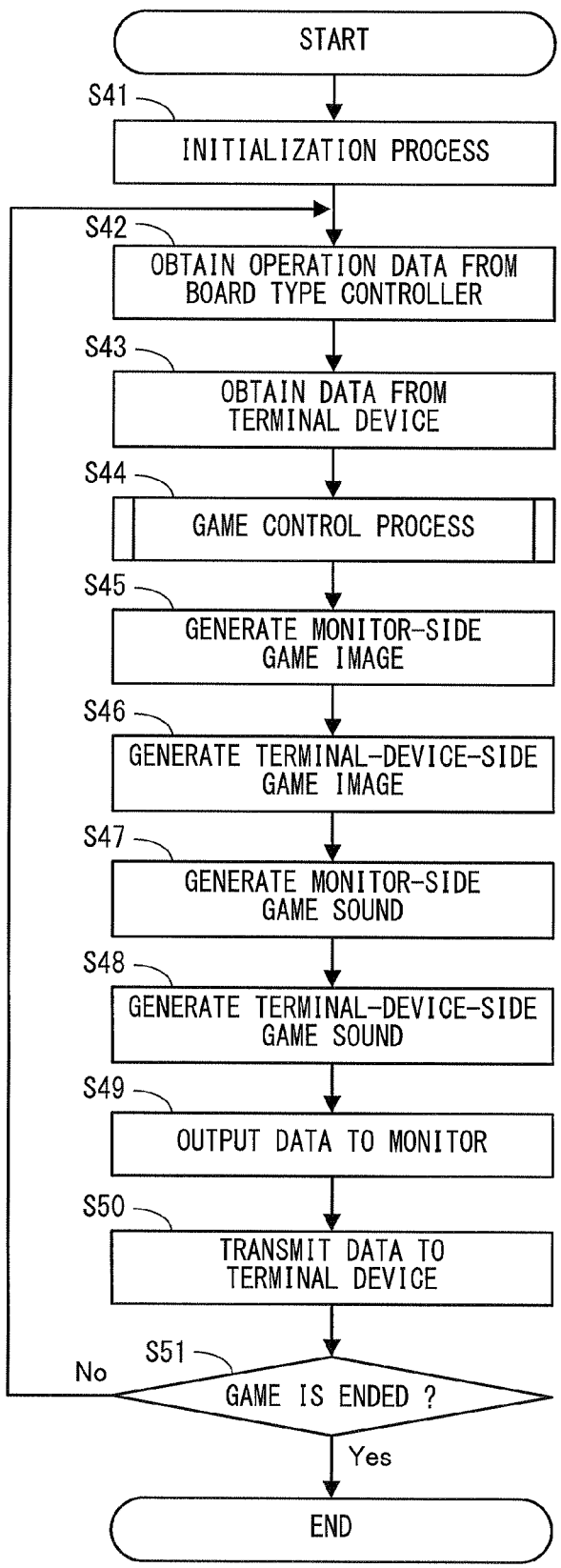
FIG. 17 is a flowchart showing a non-limiting example of a process executed by the game apparatus body 5 shown in FIG. 1.
Figure 18:
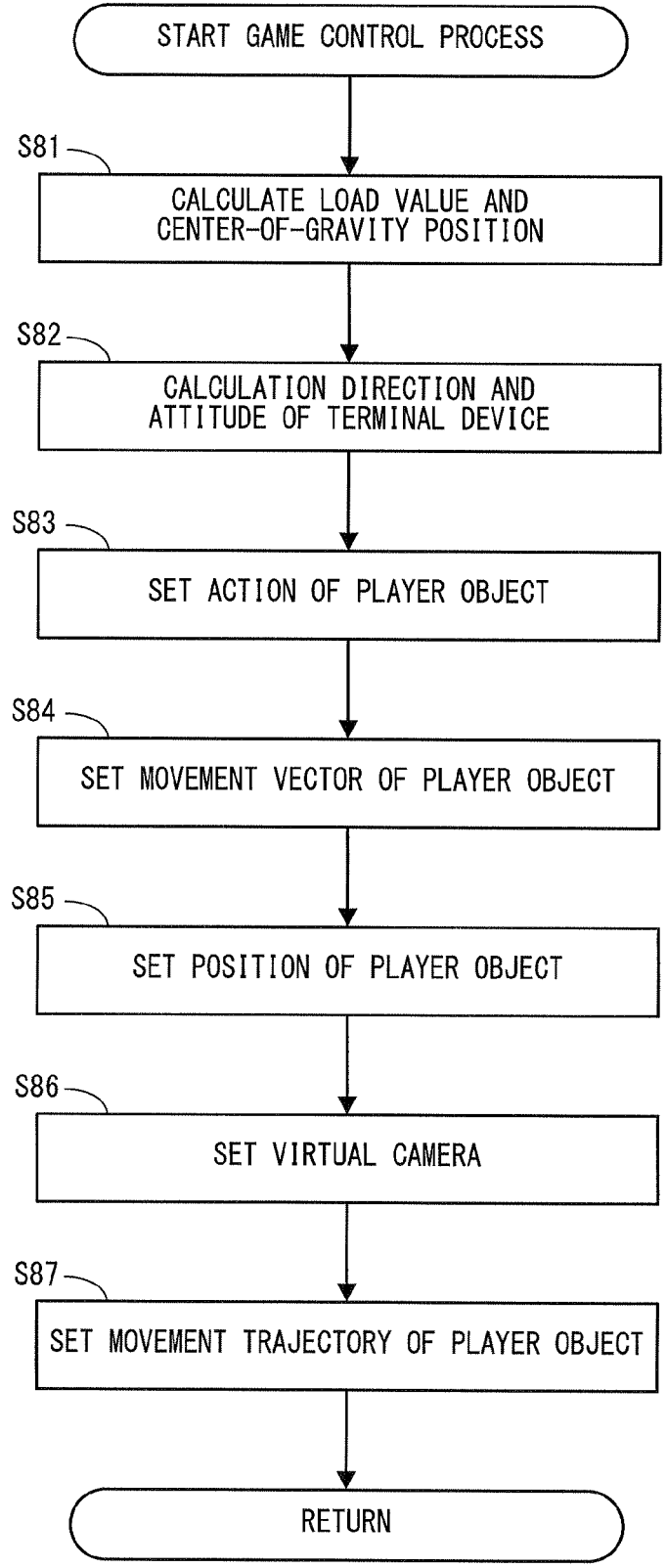
FIG. 18 is a sub-routine showing a non-limiting example of a game control process in step 44 in FIG. 17.

Next, a process performed by the game apparatus body 5 will be described in detail with reference to FIGS. 17 and 18. FIG. 17 is a flowchart illustrating an example of a process executed by the game apparatus body 5. FIG. 18 is a subroutine illustrating an example of a game control process in step 44 in FIG. 17. In the flowcharts shown in FIGS. 17 and 18, process steps for causing the player object Po to move and displaying the same, in accordance with an operation performed by a user using the terminal device 6 and the board type controller 9 will be mainly described among the whole process, while detailed description of other process steps is not given. Further, in FIGS. 17 and 18, each of the steps executed by the CPU 10 is abbreviated as "S".

When the game apparatus body 5 is powered on, the CPU 10 of the game apparatus body 5 executes a boot program stored in the ROM/RTC 13 to initialize each unit such as the main memory. Then, the information processing program stored in the optical disc 4 is loaded to the main memory, and the CPU 10 starts to execute the program. The flowcharts shown in FIGS. 17 and 18 show process steps to be performed after the above-mentioned process steps are completed.

As shown in FIG. 17, the CPU 10 performs an initialization process (step 41), and proceeds to the next step. For example, in the initialization process at step 41, the CPU 10 constructs a virtual space, arranges a player object Po and other objects, which appear in a game space, in their initial positions, and sets the initial values of various parameters used for the game process.

The above-mentioned step 41 is followed by a process at step 42. Thereafter, a process loop of a series of process steps 42 to 51 is repeatedly executed every predetermined period (one frame period).

In step 42, the CPU 10 obtains board operation data transmitted from the board type controller 9, and proceeds to the next step. The board type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board type controller 9 may be shorter than the game processing period (one frame period), and for example, it is 1/200 sec. In step 42, the CPU 10 reads the latest board operation data from the main memory to update the board operation data Da. The board operation data includes data representing identification information of the load sensors 94a to 94d, and data representing the load values detected by the load sensors 94a to 94d. The load data Da1 is updated by using each of the data identified by the identification information.

Next, the CPU 10 obtains various data transmitted from the terminal device 6 (step 43), and proceeds to the next step. The terminal device 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 43, the CPU 10 reads the latest terminal operation data from the main memory to update the acceleration data Db1 and the angular velocity data Db2.

Next, the CPU 10 performs a game control process (step 44), and proceeds to the next step. The game control process is a process in which, for example, the player object Po in the virtual space is caused to move in accordance with a game operation by the user, thereby progressing the game. In the first exemplary game, the user is allowed to play various games by using the terminal device 6 and the board type controller 9. Hereinafter, the game control process will be described with reference to FIG. 18.

In FIG. 18, the CPU 10 calculates a load value and a center-of-gravity position (step 81), and proceeds to the next step. For example, the CPU 10 calculates a total load value by summing up the detected load values represented by the load data Da1, and updates the latest data in the time-sequence data array of the load value data Dc by using the data representing the total load value. Specifically, since the load data Da1 represents the latest load values detected by the load sensors 94a to 94d, the total load value is obtained by summing up the detected load values. Further, the CPU 10 calculates a center-of-gravity position by using the detected load values represented by the load data Da1, and updates the latest data in the time-sequence data array of the center-of-gravity position data Dd by using the data representing the center-of-gravity position. Hereinafter, an example of a center-of-gravity position calculation method will be described.

The center-of-gravity position is a position of the center of gravity of a load applied to the platform 9a of the board type controller 9, and is determined based on the load values detected by the load sensors 94a to 94d (see FIG. 11). For example, the center-of-gravity position is represented by coordinate values based on a predetermined coordinate system (e.g., a X1Y1 coordinate system in which the center of the platform 9a corresponds to an origin thereof, the long side direction of the platform 9a corresponds to the X1 axis direction, and the short side direction corresponds to the Y1 axis direction) corresponding to a position on the platform 9a of the board type controller 9. Assuming that a load value detected by the load sensor 94a is defined as "a", a load value detected by the load sensor 94b is defined as "b", a load value detected by the load sensor 94c is defined as "c", and a load value detected by the load sensor 94d is defined as "d", an X1-axis coordinate value (X1) and a Y-axis coordinate value (Y1) of the center of gravity is calculated based on the following equations.

$$X1 = ((a+c) - (b+d)) \times m$$

$$Y1 = ((c+d) - (a+b)) \times n$$

where m and n are predetermined constants.

The total load value and the center-of-gravity position, which are thus calculated, vary in accordance with an action or a weight shift (posture) of the user on the board type controller 9. For example, when the user repeats stepping on the board type controller 9, the total load value varies in accordance with the stepping cycle, and the center-of-gravity position shifts as if reciprocating, according to the stepping cycle, between the position on which the user puts his/her left foot and the position on which the user puts his/her right foot.

In another example, when the user repeats knee bending on the board type controller 9, the total load value varies in accordance with the cycle of the knee bending, but the variation of the center-of-gravity position is relatively small.

Next, the CPU 10 calculates a direction change and an attitude of the terminal device 6 (step 82), and proceeds to the next step. For example, the CPU 10 calculates a direction change and an attitude of the terminal device 6, based on the acceleration represented by the acceleration data Db1 and the angular velocity represented by the angular velocity data Db2, and updates the terminal device direction/attitude data De by using data representing the calculated direction change and attitude of the terminal device 6. The CPU 10 is capable of calculating an amount of rotation (an amount of direction change) of the terminal device 6 in the real space, per unit time, based on the angular velocity represented by the angular velocity data Db2. Further, in a state where the terminal device 6 is substantially stationary (in a static state) in the real space, the acceleration applied to the terminal device 6 is the gravitational acceleration. Therefore, it is possible to calculate a direction of gravity applied to the terminal device 6 (i.e., the attitude of the terminal device 6 with respect to the vertical direction in the real space), based on the acceleration represented by the acceleration data Db1. Accordingly, the CPU 10 is capable of calculating a direction change and an attitude of the terminal device 6, based on the acceleration represented by the acceleration data Db1 and the angular velocity represented by the angular velocity data Db2.

In the exemplary embodiment, a direction change and an attitude of the terminal device 6 are calculated based on the data representing the acceleration and the angular velocity detected by the terminal device 6. In another embodiment, however, a direction change and an attitude of the terminal device 6 may be calculated by using any one piece data or three or more pieces of data. For example, the magnetic sensor 602 included in the terminal device 6 detects a geomagnetism applied to the terminal device 6. Therefore, based on the direction of the geomagnetism applied to the terminal device 6, a predetermined orientation with respect to the terminal device 6 (i.e., the attitude of the terminal device 6 with respect to the predetermined orientation) can be calculated. Even when a magnetic field is generated in addition to the geomagnetism in the real space where the terminal device 6 is located, an amount of rotation of the terminal device 6 can be calculated. Accordingly, the CPU 10 is capable of calculating a direction change and an attitude of the terminal device 6 by using at least one of the data representing the acceleration, the data representing the angular velocity, and the data representing the magnetism, which are detected by the terminal device 6.

Any calculation method may be used for calculating an attitude of the terminal device 6. For example, a calculation method is considered, in which the attitude of the terminal device 6, which is calculated based on the angular velocity represented by the angular velocity data Db2, is corrected by using the acceleration represented by the acceleration data Db1 and the direction of the magnetism detected by the magnetic sensor 602.

Specifically, the CPU 10 firstly calculates an attitude of the terminal device 6 based on the angular velocity represented by the angular velocity data Db2. Any method may be used for calculating an attitude of the terminal device 6 based on the angular velocity. For example, an attitude of the terminal device 6 may be calculated by using the immediately preceding attitude (most-recently calculated attitude) and the current angular velocity (the angular velocity currently obtained at step 42 in the process loop). The CPU 10 causes the immediately preceding attitude to rotate at the current angular velocity for a unit time to obtain a new attitude. The immediately preceding attitude is represented by the terminal device direction/attitude data De, and the current angular velocity is represented by the angular velocity data Db2. Accordingly, the CPU 10 reads the terminal device direction/attitude data De and the angular velocity data Db2, and calculates an attitude of the terminal device 6.

When calculating an attitude of the terminal device 6 based on the angular velocity, an initial attitude may be previously set. That is, when calculating an attitude of the terminal device 6 based on the angular velocity, the CPU 10 firstly calculates an initial attitude of the terminal device 6. The initial attitude of the terminal device 6 may be calculated based on the acceleration represented by the acceleration data Db1, or on the direction of the magnetism detected by the magnetic sensor 602. Alternatively, the user is caused to perform a predetermined operation with the terminal device 6 being set in a specific attitude, and the specific attitude at the time when the predetermined operation is performed may be used as an initial attitude. When calculating an attitude of the terminal device 6 as a relative attitude with respect to the attitude of the terminal device 6 at the time when the game is started, the initial attitude need not be calculated.

Next, the CPU 10 corrects the attitude of the terminal device 6 calculated based on the angular velocity, by using the acceleration represented by the acceleration data Db1. Specifically, the CPU 10 calculates an attitude of the terminal device 6 based on the acceleration represented by the acceleration data Db1. In a state where the terminal device 6 is substantially stationary, the acceleration applied to the terminal device 6 is the gravitational acceleration. Accordingly, in this state, the direction of the gravitational acceleration (direction of gravity) can be calculated by using the direction of the acceleration represented by the acceleration data Db1, and therefore, a direction (attitude) of the terminal device 6 with respect to the direction of gravity can be calculated.

When the attitude of the terminal device 6 based on the acceleration is calculated, the CPU 10 corrects the attitude based on the angular velocity, by using the attitude based on the acceleration. Specifically, the CPU 10 performs a correction to approximate, at a predetermined rate, the attitude of the terminal device 6 calculated based on the angular velocity to the attitude of the terminal device 6 calculated based on the acceleration. The predetermined rate may be a preset fixed value, or may be set according to, for example, the acceleration represented by the acceleration data Db1. Regarding the attitude of the terminal device 6 calculated based on the acceleration, since an attitude cannot be calculated in the direction of rotation around the direction of gravity, the CPU 10 may not perform correlation of the attitude in this rotation direction. When correcting the attitude of the terminal device 6 calculated based on the angular velocity, based on the direction of magnetism detected by the magnetic sensor 602, the CPU 10 approximates, at a predetermined rate, the attitude of the terminal device 6 calculated based on the angular velocity to the attitude of the terminal device 6 calculated based on the direction of magnetism. Thus, the CPU 10 is capable of accurately calculating an attitude of the terminal device 6.

Next, the CPU 10 sets an action of the player object Po (step 83), and proceeds to the next step. For example, the CPU 10 sets an action of the player object Po, based on the time-sequential array of the total load values (the history of variation of the total load value) represented by the load value data Dc, and the time-sequential array of the center-of-gravity positions (the history of variation of the center-of-gravity position) represented by the center-of-gravity position data Dd, and then updates the action data Df by using the set action. For example, the CPU 10 determines that the user performs knee bending on the board type controller 9, when the width of variation of the total load value is equal to or greater than a predetermined threshold in the history of variation of the total load value, and the movement distance of the center-of-gravity position is smaller than a predetermined threshold in the history of variation of the center-of-gravity position. In this case, the CPU 10 sets the action of the player object Po to swimming with dolphin kicks. In another example, the CPU 10 determines that the user performs stepping on the board type controller 9, when the width of variation of the total load value is equal to or greater than the predetermined threshold in the history of variation in the total load value, and the movement distance of the center-of-gravity position is equal to or greater than the predetermined threshold in the history of variation of the center-of-gravity position and the center-of-gravity position reciprocates. In this case, the CPU 10 sets the action of the player object Po to swimming with flutter kicks.

Next, the CPU 10 sets a movement vector of the player object Po (step 84), and proceeds to the next step. For example, the CPU 10 calculates a movement speed of the player object Po, based on the time-sequential array of the total load values (the history of variation of the total load value) represented by the load value data Dc, and the action (swimming style) of the player object Po, which is set in step 83. For example, the shorter the cycle of variation of the total load value is, the higher the movement speed of the player object Po the CPU 10 calculates. The greater the maximum value or the variation width of the total load value is, the higher the movement speed of the player object Po the CPU 10 calculates. That is, the shorter the pitch of the user's stepping or knee bending on the board type controller 9 is, the higher the movement speed of the player object Po is. The greater the force of the user's stepping or knee bending on the board type controller 9 is, the higher the movement speed of the player object Po is. Then, the CPU 10 corrects the calculated movement speed by using a coefficient according to the set swimming style, thereby determining a movement speed of the player object Po.

Further, the CPU 10 calculates a movement direction of the player object Po in the virtual space, based on the direction change and the attitude of the terminal device 6, which are represented by the terminal device direction/attitude data De. For example, the CPU 10 calculates a movement direction of the player object Po in the vertical direction in the virtual space, based on the attitude of the terminal device 6, which is represented by the terminal device direction/attitude data De. Specifically, when the attitude of the terminal device 6 is that the back surface thereof faces upward, the CPU 10 sets a movement direction in the virtual space at an elevation angle corresponding to an angle at which the back surface faces upward with respect to the vertical direction. On the other hand, when the attitude of the terminal device 6 is that the back surface thereof faces downward, the CPU 10 sets a movement direction in the virtual space at a depression angle corresponding to an angle at which the back surface faces downward with respect to the vertical direction. Further, the CPU 10 changes the movement direction of the player object Po, based on the direction change (the amount of rotation (amount of direction change) in the real space) of the terminal device 6, which is represented by the terminal device direction/attitude data De. For example, when the terminal device 6 is rotated in the yaw direction (see FIG. 8) which is a rotation direction around the y axis, the CPU 10 changes the movement direction of the player object Po in accordance with the amount of rotation. Specifically, when the terminal device 6 is rotated to the left around the y axis as viewed from the y-axis negative direction, the CPU 10 changes, in accordance with the amount of rotation, the movement direction of the player object Po to the left as viewed from the player object Po.

Then, the CPU 10 calculates a movement vector in the virtual space by using the movement speed and the movement direction of the player object Po, which are calculated as described above, and updates the movement vector data Df by using the calculated movement vector. For example, the CPU 10 sets the calculated movement speed of the player object Po to be the length of the movement vector, and sets the calculated movement direction of the player object Po to be the direction of the movement vector.

Next, the CPU 10 sets a position of the player object Po (step 85), and proceeds to the next step. For example, the CPU 10 causes the position of the player object Po represented by the position data Dh to shift in the virtual space, based on the movement vector represented by the movement vector data Dg, and updates the position data Dh by using the position after the shifting.

Next, the CPU 10 sets parameters relating to the virtual camera (step 86), and proceeds to the next step. For example, a terminal game image and a monitor game image are each generated as, for example, a three-dimensional CG image which is obtained by calculating a scene of a game space viewed from a virtual camera arranged in a virtual space. Specifically, a first virtual camera for generating a terminal game image is set such that a state of the virtual space viewed at close range from behind the player object Po arranged in the virtual space is included in the terminal game image. A second virtual cameral for generating a monitor game image is set in the same virtual space in which the first virtual camera is set, such that a state of the virtual space in which the player object Po arranged in the virtual space is viewed from a distance in a manner of bird's eye viewing is included in the monitor game image. The CPU 10 sets the positions of the first virtual camera and the second virtual camera in the virtual space (parameters relating to the first virtual camera and the second virtual camera), based on the position of the player object Po represented by the position data Dh, and the direction of the player object Po in accordance with the action data Df and the movement vector data Df. In this way, the terminal game image and the monitor game image are game images of the virtual space viewed from different viewpoints. Therefore, the game images in the virtual space viewed from the different viewpoints are displayed on the LCD 61 and the monitor 2, respectively.

Next, the CPU 10 sets a movement trajectory of the player object Po (step 87), and ends the process of the sub-routine. For example, the CPU 10 adds the current position of the player object Po, which is represented by the position data Dh, to the movement trajectory represented by the movement trajectory data Di, and updates the movement trajectory data Di by using the movement trajectory to which the current position is added.

Referring back to FIG. 17, after the game control process at step 44, the CPU 10 and the GPU 32 generate a monitor game image to be displayed on the monitor 2 (step 45), and proceed to the next step. For example, the CPU 10 and the GPU 32 read, from the main memory, the data representing the result of the game control process performed at step 44, and read, from the VRAM 34, the data required for generating a monitor game image. Then, the CPU 10 and the GPU 32 generate a game image by using the read data, and store the generated monitor game image in the VRAM 34. Any monitor game image may be generated by any method so long as the monitor game image represents the result of the game control process performed at step 44. For example, the monitor game image may be a three-dimensional CG image which is generated through the steps of: arranging the second virtual camera in the virtual space based on the parameters relating to the second virtual camera, which are represented by the virtual camera data Dj; arranging the player object Po in the virtual space based on the action data Df and the position data Dh; arranging the movement trajectory Lp in the virtual space based on the movement trajectory data Di; and calculating the scene of the virtual space viewed from the second virtual camera.

Next, the CPU 10 and the GPU 32 generate a terminal game image to be displayed on the terminal device 6 (step 46), and proceed to the next step. For example, the CPU 10 and the GPU 32 read, from the main memory, the data representing the result of the game control process performed at step 44, and read, from the VRAM 34, the data required for generating a terminal game image. Then, the CPU 10 and the GPU 32 generate a terminal game image by using the read data, and store the generated terminal game image in the VRAM 34. Like the monitor game image, any terminal game image may be generated by any method so long as the terminal game image represents the result of the game control process performed at step 44. The terminal game image may be generated by the same method as, or a different method from, that for the monitor game image. For example, the terminal game image may be a three-dimensional CG image which is generated through the steps of: arranging the first virtual camera in the virtual space based on the parameters relating to the first virtual camera, which are represented by the virtual camera data Dj; arranging the player object Po in the virtual space based on the action data Df and the position data Dh; and calculating the scene of the virtual space viewed from the first virtual camera. Depending on the content of the game, the monitor game image and the terminal game image may be the same game image. In this case, the terminal game image generation process at step 46 need not be performed.

Next, the CPU 10 generates a monitor game sound to be output to the loudspeakers 2a of the monitor 2 (step 47), and proceeds to the next step. For example, the CPU 10 causes the DSP 33 to generate a monitor game sound to be output from the loudspeakers 2a, in accordance with the result of the game control process performed at step 44. In an example, the CPU 10 causes the DSP 33 to generate a monitor game sound in which BGM or the like to be output from the monitor 2 is added to voices and action sounds of the objects, sound effects and the like, which are supposed to be heard on the basis of the position of the second virtual camera in the virtual space which is set based on the result of the game control process at step 44.

Next, the CPU 10 generates a terminal game sound to be output to the loudspeakers 607 of the terminal device 6 (step 48), and proceeds to the next step. For example, the CPU 10 causes the DSP 33 to generate a terminal game sound to be output from the loudspeakers 607, in accordance with the result of the game control process performed at step 44. In an example, the CPU 10 causes the DSP 33 to generate a terminal game sound in which BGM or the like to be output from the terminal device 6 is added to voices and action sounds of the objects, sound effects and the like, which are supposed to be heard on the basis of the position of the first virtual camera in the virtual space which is set based on the result of the game control process at step 44. The terminal game sound may be the same as or different from the monitor game sound. Further, the terminal game sound may be partially different from the monitor game sound. For example, the terminal game sound and the monitor game sound may include the same BGM and different sound effects. When the monitor game sound and the terminal game sound are the same, the terminal game sound generation step at step 48 need not be performed.

Next, the CPU 10 outputs the monitor game image and the monitor game sound to the monitor 2 (step 49), and proceeds to the next step. For example, the CPU 10 transmits, to the AV-IC 15, the data of the monitor game image stored in the VRAM 34 and the data of the monitor game sound generated by the DSP 33. The AV-IC 15 transmits the data of the monitor game image and the data of the monitor game sound through the AV connector 16 to the monitor 2. Thereby, the monitor game image is displayed on the monitor 2, and the monitor game sound is output from the loudspeakers 2a.

Next, the CPU 10 transmits the terminal game image and the terminal game sound to the terminal device 6 (step 50), and proceeds to the next step. For example, the CPU 10 transmits, to the codec LSI 27, the data of the terminal game image stored in the VRAM 34 and the data of the terminal game sound generated by the DSP 33. The codec LSI 27 performs a predetermined compression process on these data. The compressed data of the terminal game image and the compressed data of the terminal game sound are transmitted from the codec LSI 27 to the terminal communication module 28, and then transmitted from the terminal communication module 28 to the terminal device 6 via the antenna 29. The data of the terminal game image and the data of the terminal game sound transmitted from the game apparatus body 5 are received by the wireless module 610 of the terminal device 6, and are subjected to a predetermined decompression process by the codec LSI 606. The decompressed data of the terminal game image is output to the LCD 61, and the decompressed data of the terminal game sound is output to the sound IC 608. Thereby, the terminal game image is displayed on the LCD 61, and the terminal game sound is output from the loudspeakers 607.

Next, the CPU 10 determines whether to end the game (step 51). The game is to be ended, for example, when conditions for game over or game clear are satisfied, or when the user has performed an operation to end the game. When the game is not to be ended, the CPU 10 returns to step 42 and repeats the processing, whereas when the game is to be ended, the CPU 10 ends the processing of the flowchart. Thereafter, the series of process steps 42 to 51 are repeatedly executed until the CPU 10 determines to end the game at step 51.

According to the above-mentioned processing, when the user performs an operation based on his/her action on the board type controller 9 and thereby a process based on the user's action is performed, the user is allowed to view the result of the process on the LCD 61 of the portable terminal device 6. Therefore, the user, who performs an action with the terminal device 6 in his/her hands, is allowed to view the result of the process in a favorable situation.

Figure 19:
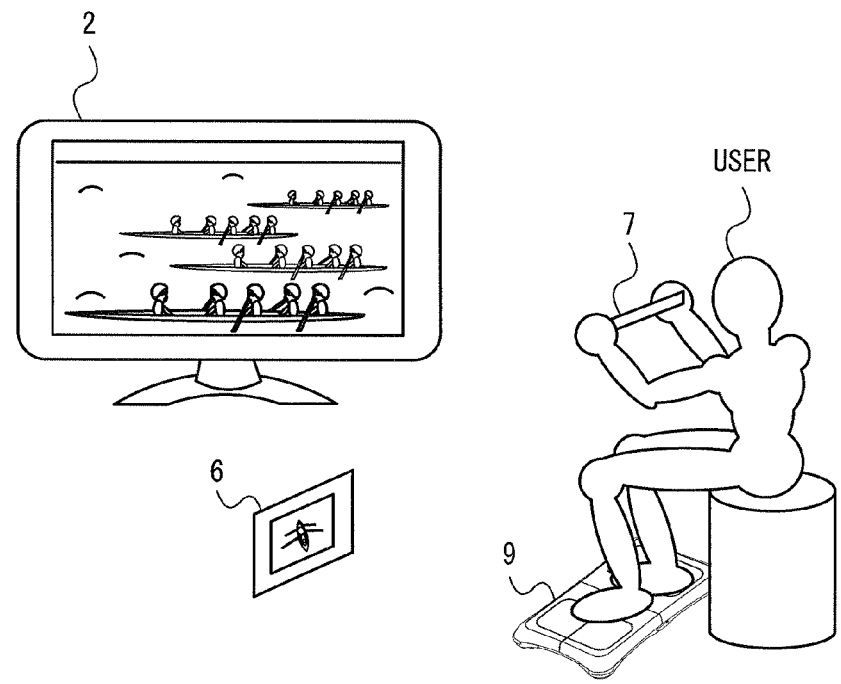
FIG. 19 is a diagram showing a non-limiting example of a user who plays a second exemplary game by using the terminal device 6, the controller 7, and the board type controller 9.
Figure 20A:
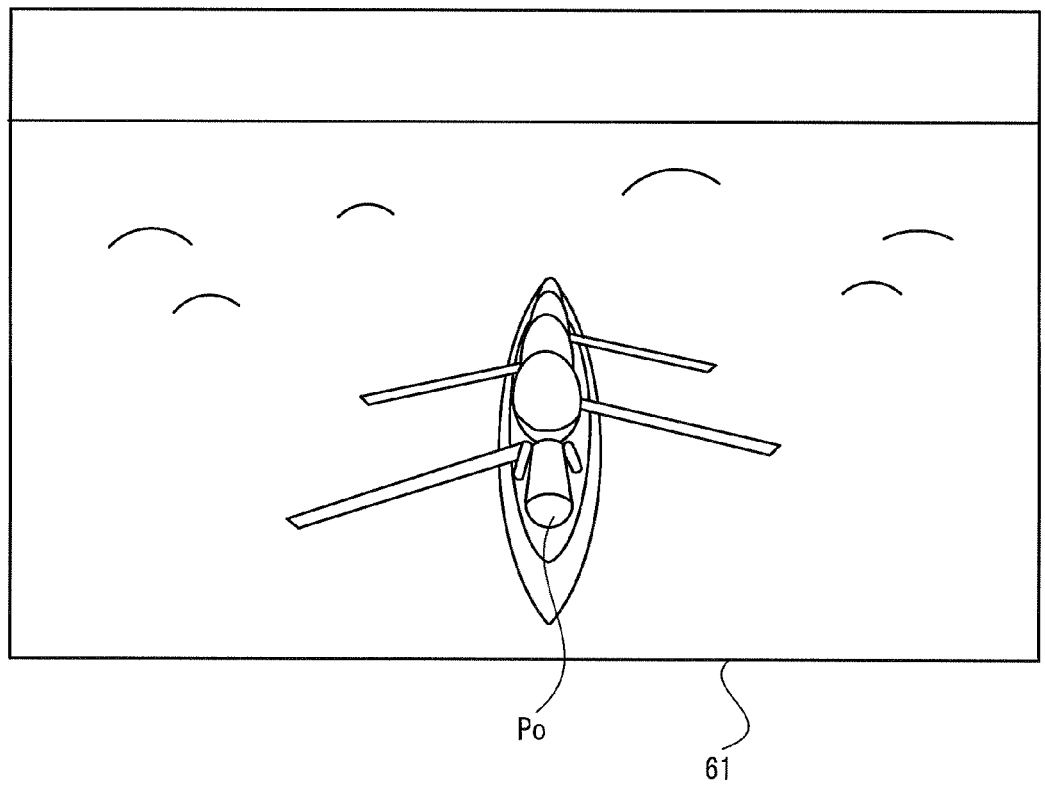
FIG. 20A is a diagram showing a non-limiting example of an image displayed on the LCD 61 of the terminal device 6 in the second exemplary game.
Figure 20B:
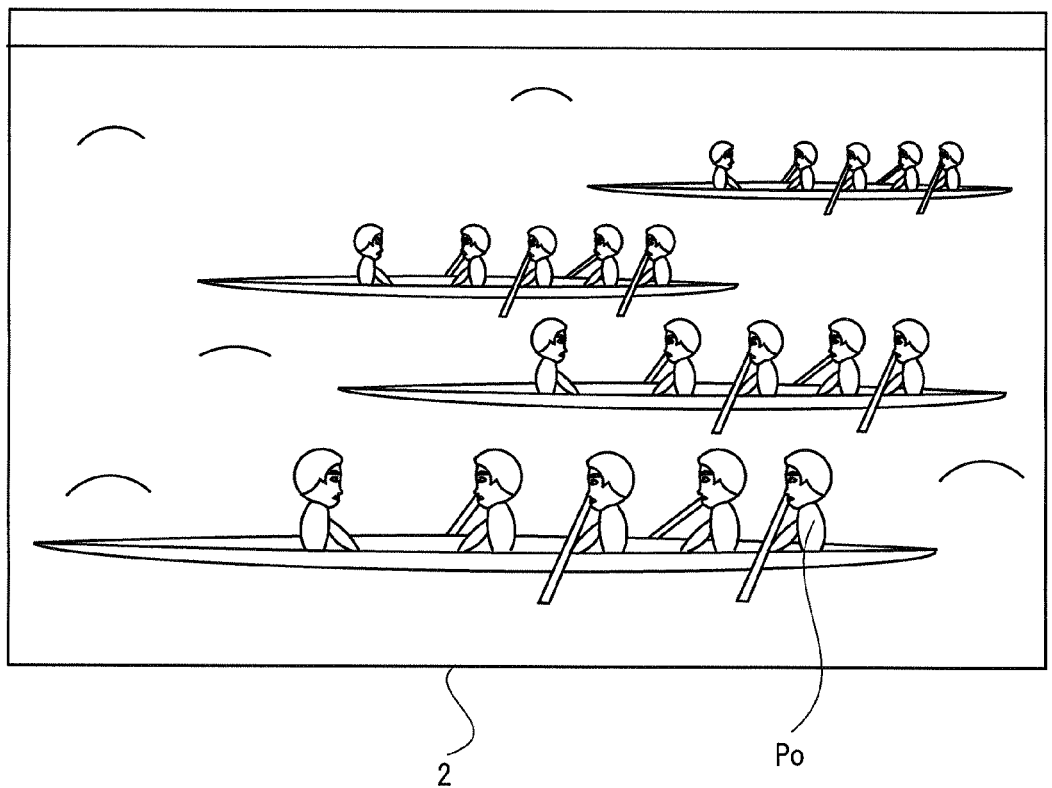
FIG. 20B is a diagram showing a non-limiting example of an image displayed on the monitor 2 in the second exemplary game.

The game played by using the terminal device 6 and the board type controller 9 is not limited to the above-mentioned first exemplary game, and various exemplary games are considered. Hereinafter, a second exemplary game performed by the game apparatus body 5 will be described with reference to FIGS. 19, 20A, and 20B. FIG. 19 is a diagram illustrating an example of a user who plays the second exemplary game by using the terminal device 6, the controller 7, and the board type controller 9. FIG. 20A is a diagram illustrating an example of an image of the second exemplary game, which is displayed on the LCD 61 of the terminal device 6. FIG. 20B is a diagram illustrating an example of an image of the second exemplary game, which is displayed on the monitor 2.

In the second exemplary game, the user performs an operation by using the controller 7 as well as the terminal device 6 and the board type controller 9 to cause a player object Po to move in a virtual world. As shown in FIG. 19, the user performs an operation to change the attitude of the controller 7, and an operation to change the load applied to the board type controller 9. Specifically, the user, sitting on a chair, holds the controller 7 and puts his/her both feet on the board type controller 9. Further, the user places the terminal device 6 in front of the user (e.g., on a floor in front of the user) with the LCD 61 standing up and facing the user so that the user can view an image displayed on the LCD 61. Then, the user performs an action on the board type controller 9 (e.g., the user repeats an action of placing his/her weight heavily and lightly on the board type controller 9), and performs an operation to move the controller 7, while viewing the image displayed on the monitor 2 and the image displayed on the LCD 61 of the terminal device 6, thereby playing the game. Then, on the LCD 61 of the terminal device 6 and on the monitor 2, the player object Po is represented so as to perform an action in the virtual space in accordance with the direction and the attitude of the controller 7 held by the user and the user's motion on the board type controller 9.

As shown in FIG. 20A, on the LCD 61 of the terminal device 6, the player object Po, which rows a boat (in a regatta race, for example) in the virtual space, is displayed. In the example shown in FIG. 20A, a state of the virtual space viewed at close range from behind the player object Po rowing a boat on the water is displayed together with the player object Po. Since the virtual space viewed at close range from behind the player object Po is displayed on the LCD 61, the user, who views the image displayed on the LCD 61 of the terminal device 6 placed in front of the user, is allowed to play the game from the same viewpoint as that of an actual regatta player, and allowed to have a sense of presence in the virtual space. Further, in the second exemplary game, when the user performs an operation based on his/her action with his/her feet on the board type controller 9, the user is allowed to view, on the portable terminal device 6, a game image based on the operation. Therefore, the user is allowed to place the terminal device 6 in any favorable position when the user performs the operation, and thus the user is allowed to view the game image in a favorable situation for the user.

Further, as shown in FIG. 20B, the same virtual space as that displayed on the LCD 61 is displayed on the monitor 2. In the example shown in FIG. 20B, a state of the virtual space, in which the left lateral side of the player object Po rowing the board is viewed from a distance, is displayed together with the player object Po. Since the virtual space in which the player object Po is viewed from the left side at a distance is displayed on the monitor 2, the user is allowed to easily know the surroundings of the player object Po and the positional relation with other boats, and further, another person who watches the user's playing the second exemplary game is allowed to enjoy a view in which the player object Po moves in the virtual space.

For example, when the user performs an action to place his/her weight on the board type controller 9, the player object Po performs an action to bend its body forward and push oars the player object Po holds (i.e., shaft parts of the oars the player object Po holds are pushed forward, and blade parts thereof are pulled backward at the water surface). On the other hand, when the user performs an action to reduce the weight placed on the board type controller 9, the player object Po performs an action to bend its body backward and pull the oars the player object Po holds (i.e., the shaft parts the player object Po holds are pulled backward, and the blade parts are pushed forward in the water). In this way, the user is allowed to cause the player object Po to row the boat in accordance with the action of the user on the board type controller 9, and allowed to change the speed of rowing the boat (the movement speed of the boat) in accordance with the pitch of placing the weight heavily and lightly on the board type controller 9.

For example, as described above, the detected load values according to the user's action on the board type controller 9 are output from the board type controller 9. The detected load values enable calculation of a total load value applied to the board type controller 9. A change in the total load value enables estimation as to whether the user places his/her weight on the board type controller 9 or the user reduces the weight placed on the board type controller 9. In this way, the rowing action of the player object Po is set in accordance with the estimated user's action on the board type controller 9.

Further, the angle of the oar (the angle of the blade) held by the player object Po changes in accordance with the attitude (direction) of the controller 7 held by the user. In a first example, when the user holds the controller 7 in a first attitude (e.g., an initial attitude), the blade of the oar held by the player object Po is in a horizontal position (i.e., in a state where the blade is feathered). Further, when the user holds the controller 7 in an attitude in which the controller 7 is rotated at 90° from the first attitude, around the longitudinal direction (Z-axis direction) of the controller 7, the blade of the oar held by the player object Po is in a vertical position (i.e., in a state where the blade is squared). In a second example, when the user turns the top surface of the controller 7 upward (e.g., in a state where the Y-axis direction of the controller 7 shown in FIG. 5 is in the vertical direction), the blade of the oar held by the player object Po is in a horizontal position. Further, when the user turns the top surface of the controller 7 sideways (e.g., in a state where the Y-axis direction shown in FIG. 5 is in the horizontal direction), the blade of the oar held by the player object Po is in a vertical position. In the second exemplary game, it is possible to adopt a general operation technique (dynamic environment of a boat) used in a boat race, in which the propulsion of a boat changes depending on the angle of a blade of an oar. In this case, it is possible to change the propulsion, i.e., the movement speed, of the boat rowed by the player object Po, in accordance with the attitude (direction) of the controller 7 held by the user.

For example, the controller 7 outputs acceleration data and angular velocity data in accordance with a change in the attitude of the controller 7. Since the angular velocity applied to the controller 7 is obtained based on the angular velocity represented by the angular velocity data, it is possible to estimate, using the angular velocity, a change in the attitude (direction) of the controller 7 from the initial attitude in the real space. Using the attitude change, it is possible to distinguish between the first attitude and the second attitude of the controller 7 in the first example. Further, since the direction of the gravitational acceleration applied to the controller 7 can be calculated based on the acceleration represented by the acceleration data, it is possible to estimate the attitude of the controller 7 with respect to the vertical direction in the real space. Using the attitude with respect to the vertical direction, it is possible to determine the attitude of the controller 7 in the second example. Further, since the angular velocity and the dynamic acceleration applied to the controller 7 are obtained based on the angular velocity represented by the angular velocity data and the acceleration represented by the acceleration data, it is possible to estimate, using the angular velocity and the dynamic acceleration, an attitude change (direction change) of the controller 7 from the initial attitude in the real space, and an attitude of the controller 7 with respect to the vertical direction. An angle of the oar (an angle of the blade) held by the player object Po is set in accordance with thus estimated attitude change (direction change) of the controller 7.

Figure 21:
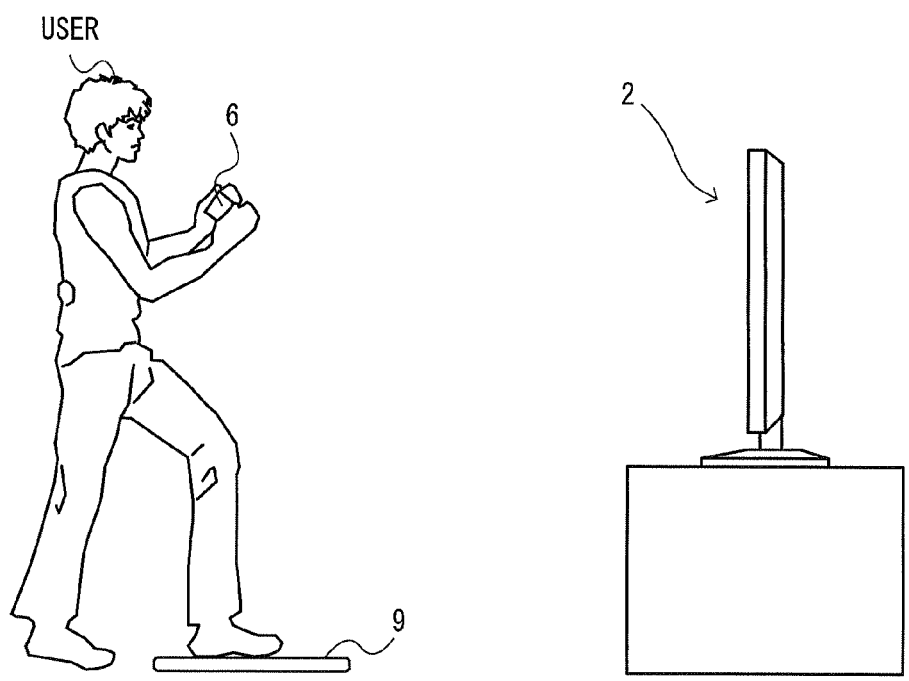
FIG. 21 is a diagram showing a non-limiting example of a user who plays a third exemplary game by using the terminal device 6 and the board type controller 9.
Figure 22A:
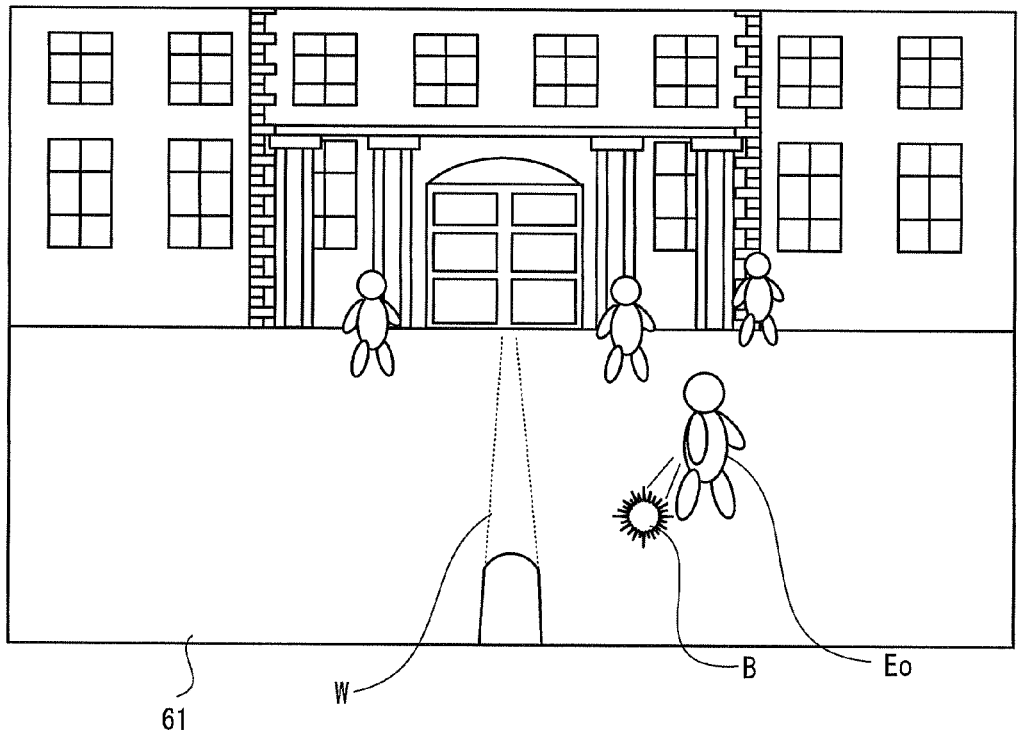
FIG. 22A is a diagram showing a non-limiting example of an image displayed on the LCD 61 of the terminal device 6 in the third exemplary game.
Figure 22B:
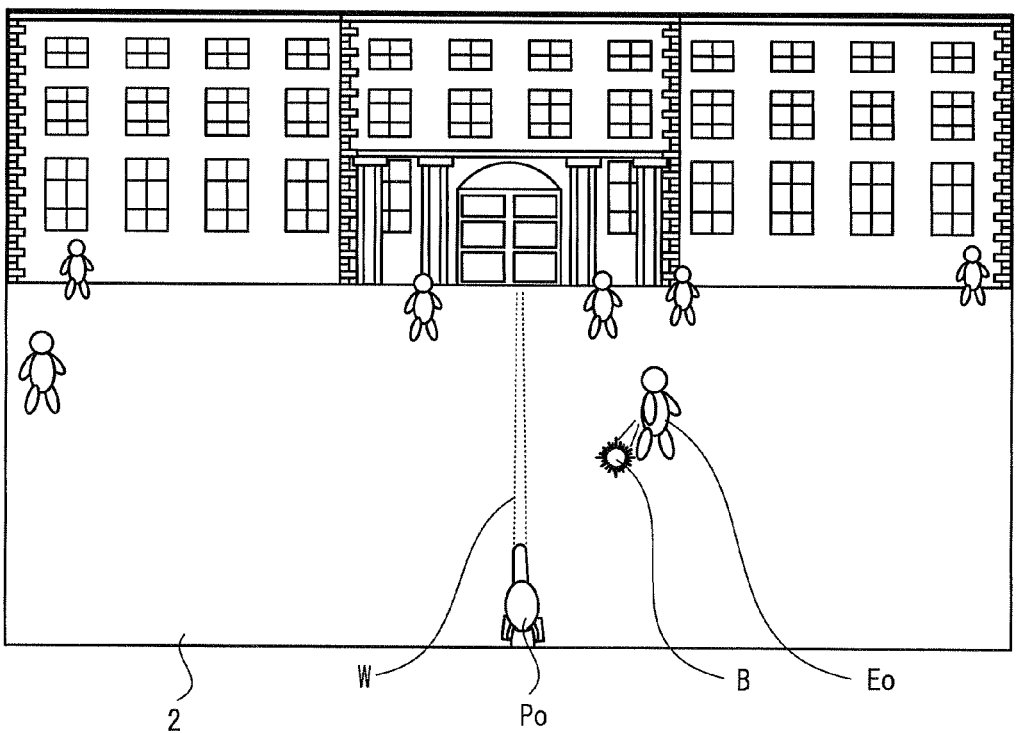
FIG. 22B is a diagram showing a non-limiting example of an image displayed on the monitor 2 in the third exemplary game.
Figure 23A:
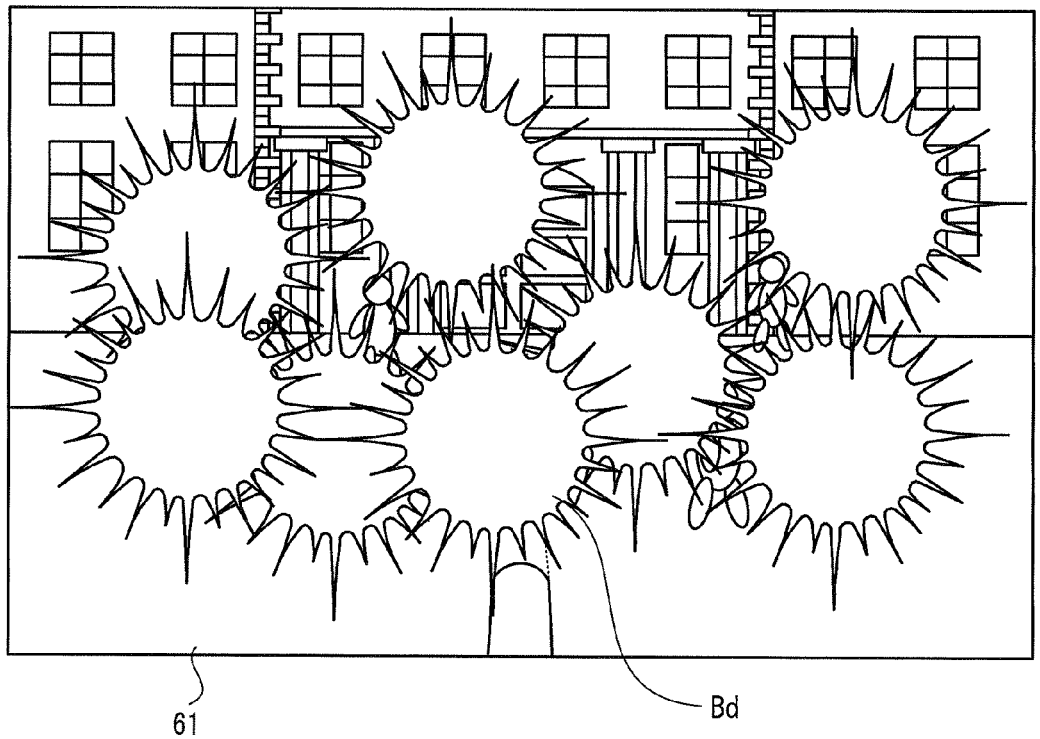
FIG. 23A is a diagram showing a non-limiting example of an image of an object represented as if attached to a player object Po in the third exemplary game.
Figure 23B:
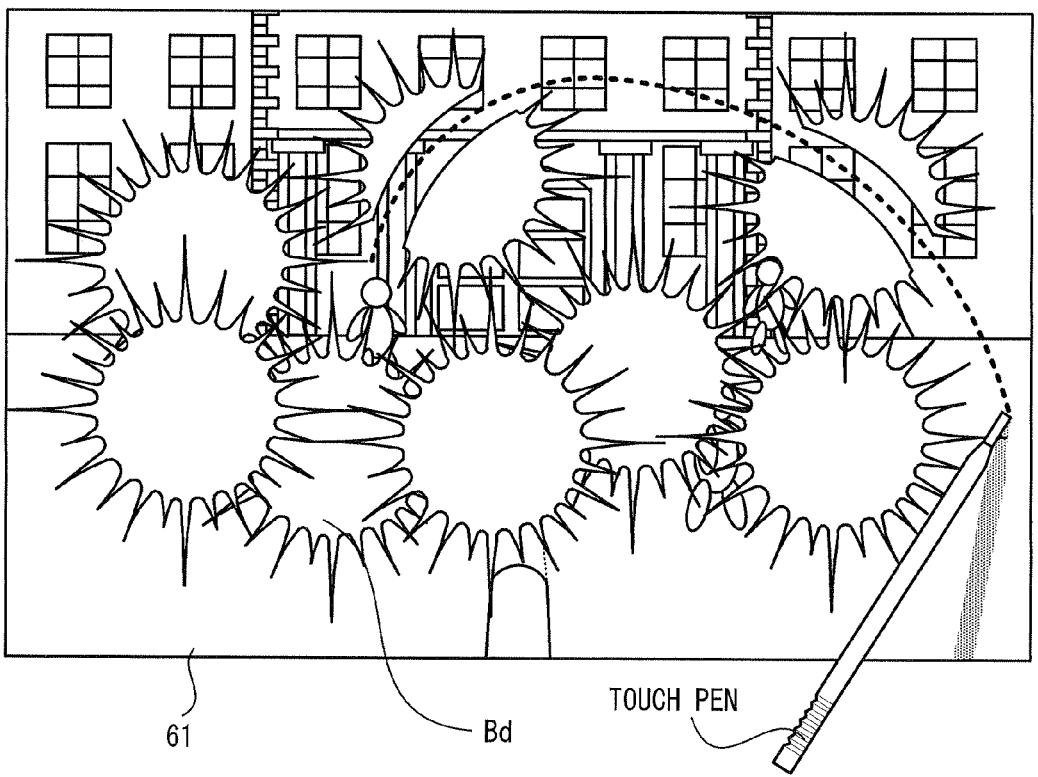
FIG. 23B is a diagram showing a non-limiting example of an image in which the object represented as if attached to the player object Po is removed by a touch operation in the third exemplary game.

Next, a third exemplary game performed by the game apparatus body 5 will be described with reference to FIGS. 21, 22A, 22B, 23A, and 23B. FIG. 21 is a diagram illustrating an example of a user who plays the third exemplary game by using the terminal device 6 and the board type controller 9. FIG. 22A is a diagram illustrating an example of an image of the third exemplary game, which is displayed on the LCD 61 of the terminal device 6. FIG. 22B is a diagram illustrating an example of an image of the third exemplary game, which is displayed on the monitor 2. FIG. 23A is a diagram illustrating an example of an image of an object which is represented as if attached to a player object Po in the third exemplary game. FIG. 23B is a diagram illustrating an example of an image in which the object represented as if attached to the player object Po is removed by a touch operation in the third exemplary game.

In the third exemplary game, as in the first exemplary game, the user performs an operation by using the terminal device 6 and the board type controller 9 to cause a player object Po to move in a virtual world. As shown in FIG. 21, the user performs an operation to change the attitude and the direction of the terminal device 6, and an operation to change the load applied to the board type controller 9. Specifically, the user holding the terminal device 6 puts his/her one foot on the board type controller 9. Then, the user performs an action on the board type controller 9 (e.g., the user pushes the board type controller 9 with his/her one foot, and increases and decreases the weight placed on the foot), and performs a touch operation on the touch panel 62 of the terminal device 6 or performs an operation to move the terminal device 6, while viewing the image displayed on the monitor 2 and the image displayed on the LCD 61 of the terminal device 6, thereby playing the game. On the LCD 61 of the terminal device 6 and on the monitor 2, the player object Po is represented so as to move in the virtual space in accordance with the direction and the attitude of the terminal device 6 held by the user, and the user' action on the board type controller 9. Further, the user is allowed to perform an operation to the object represented as if attached to the player object Po, by performing a touch operation on the touch panel 62 of the terminal device 6.

As shown in FIG. 22A, on the LCD 61 of the terminal device 6, a state in which the player object Po shoots water from a water pistol in the virtual space is displayed based on the viewpoint of the player object Po. In the example shown in FIG. 22A, the virtual space based on the viewpoint of the player object Po includes a front end of the water pistol held by the player object Po, and water W is shot from the water pistol. Further, in the virtual space, a plurality of enemy objects Eo are arranged, and one of the enemy objects Eo throws an enemy bullet B toward the player object Po. Since the virtual space based on the viewpoint of the player object Po is displayed on the LCD 61, the user, who holds the terminal device 6 and views the image displayed on the LCD 61, is allowed to play the game from the same viewpoint as the player object Po, and allowed to have a sense of presence in the virtual space.

As shown in FIG. 22B, the same virtual space as that displayed on the LCD 61 is displayed on the monitor 2. In the example shown in FIG. 22B, a state of the virtual space which is viewed from a distance from above the back of the player object Po having the water pistol, is displayed together with the player object Po. Since the virtual space viewed from a distance from above the back of the player object Po is displayed on the monitor 2, the user is allowed to know the surroundings of the player object Po and the positional relation with the enemy objects Eo, and further, another person who watches the user's playing the third exemplary game is caused to enjoy the shooting action of the player object Po.

For example, when the user performs an action to place his/her weight on his/her one foot on the board type controller 9, the player object Po performs an action to shoot water W from the water pistol. At this time, the greater the load applied to the board type controller 9 by the player, the more the amount of water W. The greater the increment of the load applied to the board type controller 9, the greater the force of water W (the amount of water W per unit time). On the other hand, when the user performs an action to reduce (e.g., to zero) the weight placed on the board type controller 9, the player object Po performs an action to stop the shooting of water W from the water pistol. In this way, the user is allowed, by his/her action on the board type controller 9, to control the action of the player object Po to shoot water W (i.e., whether to shoot water W, the amount of water W, and the force of water W).

For example, as described above, the detected load values according to the user's action on the board type controller 9 are output from the board type controller 9. The detected load values allow calculation of a total load value applied to the board type controller 9. The total load value allows estimation as to whether the user places his/her weight on the board type controller 9 or the user reduces the weight applied to the board type controller 9. Further, the total load value allows calculation of the magnitude of the load applied to the board type controller 9 by the user, and an amount of change in the load applied to the board type controller 9. The action of the player object Po to shoot water W is set in accordance with the estimated user's action on the board type controller 9.

Further, in accordance with the attitude (direction) of the terminal device 6 held by the user, the direction in which the player object Po views the virtual space changes, and the direction (the direction of the water pistol) in which the player object Po shoots water W changes. For example, when the user turns the back surface of the terminal device 6 up, down, to the left, or to the right, the direction in which the water pistol shoots water W changes to the upward, downward, leftward, or rightward direction in the virtual space. Further, the direction of sight of the player object Po in the virtual space also changes to the upward, downward, leftward, or rightward direction when the user turns the back surface of the terminal device 6 up, down, to the left, or to the right. Therefore, the game image on the LCD 61, which is displayed based on the viewpoint of the player object Po, also changes in accordance with the direction change. In this way, the user is allowed to change the action of the player object Po by changing the direction or the attitude of the terminal device 6.

For example, the acceleration data and the angular velocity data according to the change in the attitude of the terminal device 6 are output from the terminal device 6. Since the direction of the gravitational acceleration applied to the terminal device 6 can be calculated based on the acceleration represented by the acceleration data, it is possible to estimate the attitude of the terminal device 6 with respect to the vertical direction in the real space. Further, since the angular velocity and the dynamic acceleration applied to the terminal device 6 are obtained based on the angular velocity represented by the angular velocity data and/or the acceleration represented by the acceleration data, it is possible to estimate, using the angular velocity and/or the dynamic acceleration, an attitude change (direction change) of the terminal device 6 from the initial attitude in the real space. The direction of sight of the player object Po and the direction of shooting of water W are set in accordance with the attitude change (direction change) of the terminal device 6.

Further, as shown in FIG. 23A, when the enemy bullet B thrown by the enemy object Eo hits the player object Po in the third exemplary game, contamination Bd due to the enemy bullet B is represented as if attached to the surface of the LCD 61, in order to represent a state where the player object Po is contaminated by the enemy bullet B. Since the attached contamination Bd blocks the user's view to the virtual space as shown in FIG. 23A, the user is put at a disadvantage in playing the third exemplary game.

The contamination Bd attached to the surface of the LCD 61 can be removed by a touch operation to the touch panel 62 of the terminal device 6. For example, as shown in FIG. 23B, when the user performs a touch operation on the touch panel 62 that covers the surface of the LCD 61, the contamination Bd attached to the surface of the LCD 61 at a position corresponding to the touch position is removed. For example, the contamination Bd in a predetermined range with the user's touch position on the touch panel 62 as a center thereof is removed from the surface of the LCD 61. Accordingly, when the user performs a touch operation so as to drag the touch pen on the touch panel 62 (e.g., a touch operation to trace a broken line shown in FIG. 23B), the contamination Bd on the surface of the LCD 61, corresponding to the traced line and a region of a predetermined line width from the traced line, is removed. The action to remove the contamination Bd attached to the surface of the LCD 61 can be regarded as an action of the player object Po to remove the contamination Bd attached thereto. In this case, the user, operating the touch panel 62 of the terminal device 6, causes the player object Po to perform the action.

Next, other exemplary games performed by the game apparatus body 5 will be described with reference to FIG. 24. FIG. 24 is a table showing examples of display images and examples of operation controls in the first to tenth exemplary games.

In the fourth exemplary game, as in the first exemplary game or the like, the user performs an operation by using the terminal device 6 and the board type controller 9 to cause a tank (player object) to move in a virtual world. In the fourth exemplary game, on the LCD 61 of the terminal device 6, a state of the virtual space viewed at close range from behind the tank is displayed. On the monitor 2, an image of the entire virtual space in which the tank is viewed from a distance is displayed.

In the fourth exemplary game, the user performs an operation to change the attitude and the direction of the terminal device 6, and an operation to change the position of the load applied to the board type controller 9. Specifically, the user holding the terminal device 6 stands on the board type controller 9. Then, the user performs an action on the board type controller 9 (e.g., the user shifts, forward and backward, the center of gravity of his/her weight on the board type controller 9), and performs an operation to move the terminal device 6, while viewing the image displayed on the monitor 2 and the image displayed on the LCD 61 of the terminal device 6, thereby playing the game. When the user shifts the center of gravity of his/her weight on the board type controller 9 forward, the tank moves forward. When the user shifts the center of gravity of his/her weight backward, the tank moves backward. Further, the direction of a turret of the tank is changed in accordance with the attitude (up-down or left-right direction change) of the terminal device 6 held by the user. When the left-right direction change of the terminal device 6 is equal to or greater than a predetermined angle, the direction of the body (direction of movement) of the tank changes in the left-right direction in accordance with the left-right direction change of the terminal device 6. Further, when the user presses an attack button (e.g., the operation button 64E) of the terminal device 6, the tank fires a shell from the turret in the set direction of the turret.

In this way, in the fourth exemplary game, the user is allowed to change the movement of the tank (player object) by changing the attitude of the terminal device 6, operating the operation button 64, or changing the load applied to the board type controller 9. Further, since the virtual space viewed at close range from behind the tank is displayed on the LCD 61, the user holding the terminal device 6 is allowed to have a sense of presence in the virtual space, and allowed to intuitively know the sight of the turret and the movement direction of the tank. Further, since the entire image of the virtual space including the tank is displayed on the monitor 2, the user is allowed to know the surroundings of the tank, and further, another person who watches the user's playing the fourth exemplary game is allowed to enjoy a view in which the tank moves and fires in the virtual space.

In the fifth exemplary game, as in the first exemplary game or the like, the user performs an operation by using the terminal device 6 and the board type controller 9 to complete a puzzle by putting together puzzle pieces (player object). In the fifth exemplary game, a virtual floor is set on the floor beneath the user holding the terminal device 6, and the puzzle pieces are scattered on the virtual floor. When the user turns the back surface of the terminal device 6 downward, the puzzle pieces arranged on the virtual floor are displayed on the LCD 61 of the terminal device 6 in accordance with the position of the user (i.e., the position of the terminal device 6) in the real space. Further, an image representing the entire image of the puzzle is displayed on the monitor 2.

In the fifth exemplary game, the user performs an operation to change the direction and the position of the terminal device 6, a touch operation on the touch panel 62 of the terminal device 6, and an action to get on and off the board type controller 9. Specifically, when the user holding the terminal device 6 gets on the board type controller 9, the position of the user (the position of the terminal device 6) is set in a reference position on the virtual floor. Then, the user gets off the board type controller 9 and moves while viewing the image of the virtual floor displayed on the LCD 61 of the terminal device 6 to search for a desired puzzle piece from among the puzzle pieces on the virtual floor. Then, the user performs a touch operation at a position overlapping the puzzle piece displayed on the LCD 61 to obtain the puzzle piece. Thereafter, when the user again gets on the board type controller 9 while continuing the touch operation and cancels the touch operation (touch-off), the obtained puzzle piece is fitted in the puzzle.

As described above, in the fifth exemplary game, the user is allowed to search for a puzzle piece from among the puzzle pieces on the virtual floor, pick up the puzzle piece, and fit the puzzle piece, by changing the direction and the position of the terminal device 6 held by the user, performing a touch operation on the touch panel 62, and getting on and off the board type controller 9. Further, since the puzzle pieces on the virtual floor viewed from the user are displayed on the LCD 61, the user holding the terminal device 6 is given a game situation as if the puzzle pieces are scattered in the real space, and further, the user is allowed to intuitively know the place where the puzzle pieces are arranged on the virtual floor. Further, since the entire image of the puzzle to which each puzzle piece is to be fitted is displayed on the monitor 2, the user is allowed to know the degree of progress in the puzzle, and required puzzle pieces.

In the sixth exemplary game, as in the first exemplary game or the like, the user performs an operation by using the terminal device 6 and the board type controller 9 to move and stitch a cloth (player object) by using a sewing machine in a virtual world. In the sixth exemplary game, a part of a cloth to be stitched by the sewing machine in the virtual world is displayed on the LCD 61 of the terminal device 6, and an image including the entirety of the cloth is displayed on the monitor 2.

In the sixth exemplary game, the user performs an operation to change the direction of the terminal device 6, a touch operation on the touch panel 62 of the terminal device 6, and an operation to apply a load to the board type controller 9. Specifically, the user sits on a chair with the terminal device 6 being placed on a desk or the like, and puts his/her foot or feet on the board type controller 9. Then, the user performs an action to apply a load to the board type controller 9, and performs an operation to rotate the terminal device 6 on the desk while viewing the image displayed on the monitor 2 and the image displayed on the LCD 61 of the terminal device 6, thereby playing the game. When the user applies a load to the board type controller 9, a part of the cloth displayed on the LCD 61 is represented as if it is stitched with the sewing machine toward the user operating the terminal device 6. Even if the user changes the direction of the terminal device 6 on the desk, the direction of the cloth displayed on the LCD 61 is not changed. However, since the cloth displayed on the LCD 61 is represented as if it is continuously stitched by the sewing machine toward the user operating the terminal device 6, the direction in which the cloth is stitched is changed eventually. That is, the user is allowed to play the game of stitching the cloth by the sewing machine, with the terminal device 6 being treated as the cloth stitched by the sewing machine. Further, when the user applies a load to the board type controller 9, a vibration simulating the situation in which a part of the cloth displayed on the LCD 61 is stitched by the sewing machine is given to the terminal device 6. Specifically, when the user applies a load to the board type controller 9, the game apparatus body 5 transmits, to the terminal device 6, control data for activating the vibrator 619. In the terminal device 6, when the data received from the game apparatus body 5 includes the control data for activating the vibrator 619, the codec LSI 606 and the UI controller 605 issue a control instruction based on the control data to the vibrator 619, and the vibrator 619 is activated in accordance with the control instruction, and thus the terminal device 6 vibrates. Further, the user is allowed to change the part of the cloth displayed on the LCD 61 with respect to the entirety of the cloth by performing a touch operation on the touch panel 62 of the terminal device 6. For example, when the user performs a drag operation in the state where a part of the cloth is displayed on the LCD 61, the range of the cloth displayed on the LCD 61 shifts in the direction of the drag operation. Thereby, the user is allowed to change the part of the cloth the user desires to stitch by using the sewing machine.

As described above, in the sixth exemplary game, the user is allowed to rotate the cloth in the virtual world, move the cloth, and stitch the cloth by using the sewing machine, in accordance with the direction of the terminal device 6 placed on the desk, a touch operation on the touch panel 62, and an action to apply a load to the board type controller 9. Further, a part of the cloth to be stitch is displayed on the LCD 61, and the direction in which the cloth is stitched is always toward the user operating the terminal device 6, and therefore the user is allowed to treat the terminal device 6 as the cloth stitched by the sewing machine. Thus, the user operating the terminal device 6 is given a game situation as if the user drives the sewing machine in the real space, and allowed to intuitively know the position and the direction in which the cloth is stitched. Moreover, since the entire image of the cloth stitched by the sewing machine is displayed on the monitor 2, the user is allowed to make a plan for a part to be stitched with respect to the entire cloth, and know the condition of the stitched part.

In the seventh exemplary game, the user performs an operation by using the board type controller 9 to cause a mole (player object) to move in a virtual world. In the seventh exemplary game, an image of the underground in a virtual world is displayed on the LCD 61 of the terminal device 6, and an image of the ground in the virtual space is displayed on the monitor 2.

In the seventh exemplary game, the user places the terminal device 6 on a floor or the like, and performs an action on the board type controller 9. Specifically, the user performs an action such as scratching the ground with his/her center of gravity being applied in the movement direction on the board type controller 9 (e.g., the user performs an action such as vertically scratching the air with his/her both hands alternately or simultaneously with his/her center of gravity being applied in the direction in which the user desires to move on the board type controller 9) while viewing the image displayed on the monitor 2 and the image displayed on the LCD 61 of the terminal device 6, thereby playing the game. The mole moves in the virtual space in accordance with the user's action of scratching the air on the board type controller 9, and the direction in which the mole moves in the virtual space changes in accordance with the center-of-gravity position of the user's weight placed on the board type controller 9. Further, when the user performs knee bending on the board type controller 9, the mole moves from the underground to the ground, or from the ground to the underground.

As described above, in the seventh exemplary game, user is allowed to change the action of the mole (player object) by changing the load applied to the board type controller 9. Further, the image of the underground in the virtual space is displayed on the LCD 61, and the image of the ground in the virtual space is displayed on the monitor 2. Therefore, it is possible to accurately represent the situation of the player object which does not know the state of the other virtual space because the virtual space is separated into two parts to be displayed on the respective displays.

In the eighth exemplary game, as in the seventh exemplary game, the user performs an operation by using the board type controller 9 to cause a player object riding a unicycle to move in a virtual world. In the eighth exemplary game, on the LCD 61 of the terminal device 6, an image of a virtual space in which a player object riding a unicycle is viewed from a distance in a manner of bird's eye viewing is displayed. On the monitor 2, an image of the virtual space viewed at close range from behind the player object riding the unicycle.

In the eighth exemplary game, the user holds the terminal device 6 or places the terminal device 6 on a floor or the like, and stands on board type controller 9 to play the game. Specifically, the user performs stepping or knee bending while adjusting the center-of-gravity position at which a load is applied on the board type controller 9, and while viewing the image displayed on the monitor 2 and the image displayed on the LCD 61 of the terminal device 6, thereby playing the game. The player object performs an action to pedal the unicycle in accordance with the user's stepping on the board type controller 9. The direction in which the player object balances on the unicycle and moves in the virtual space is changed in accordance with the center-of-gravity position at which the user places his/her weight on the board type controller 9. Further, when the user performs knee bending on the board type controller 9, the player object performs an action to jump on the unicycle in the virtual space.

As described above, in the eighth exemplary game, the user is allowed to change the action of the player object riding the unicycle, by changing the load applied to the board type controller 9. Further, since the virtual space viewed at close range from behind the player object riding the unicycle is displayed on the monitor 2, the user viewing the monitor 2 is given a sense of presence in the virtual space, and allowed to intuitively know the movement direction and the balance of the player object, by the image displayed in the relatively large screen. Further, since the image in which the player object riding the unicycle is viewed at a distance in a manner of bird's eye viewing is displayed on the terminal device 6, the user is allowed to know the surroundings of the player object.

In the ninth exemplary game, as in the second exemplary game, the user performs an operation by using the controller 7 and the board type controller 9 to cause a trampoline player (player object) to move in a virtual world. In the ninth exemplary game, on the LCD 61 of the terminal device 6, an image of a virtual space in which the player is viewed from above in a manner of bird's eye viewing is displayed. On the monitor 2, an image of the virtual space in which the player is viewed from the side at a distance is displayed.

In the ninth exemplary game, the user places the terminal device 6 on a floor with the LCD 61 facing upward, and performs an operation to change the attitude and the direction of the controller 7, and an operation to change the position of a load applied to the board type controller 9. Specifically, the user holding the controller 7 stands on the board type controller 9. Then, the user performs an action (e.g., the user performs knee bending or jumping on the board type controller 9 while adjusting the center-of-gravity position of a load applied to the board type controller 9) on the board type controller 9 with the controller 7 in his/her hand, while viewing the image displayed on the monitor 2 and the image displayed on the LCD 61 of the terminal device 6, thereby playing the game. Then, the player bounces on the trampoline in the virtual space in accordance with the timing when the user stretches or jumps on the board type controller 9. Further, the direction in which the player bounces on the trampoline changes, or the player twists its body or somersaults, in accordance with the center-of-gravity position of the load applied to the board type controller 9 when the user performs knee bending or jumping. Further, the position of arms of the player changes in accordance with the attitude (direction) of the controller 7 held by the user. For example, when the user raises his/her hand holding the controller 7, the player bounces with its arms raised. When the user puts down the arm holding the controller 7, the player bounces with its arms put down.

As described above, in the ninth exemplary game, the user is allowed to change the action of the trampoline player (player object) in accordance with by changing the attitude of the controller 7, and the load applied to the board type controller 9. Further, since the virtual space in which the player is viewed from above in a manner of bird's eye viewing is displayed on the LCD 61, the user is allowed to accurately know the position where the player lands on the trampoline. Further, since the virtual space in which the player is viewed from the side is displayed on the monitor 2, the user is allowed to view the player's bouncing on the trampoline, and the player's acrobatic performance. Moreover, another person, who watches the user's playing the ninth exemplary game, is allowed to enjoy a view in which the player bounces on the trampoline.

In the tenth exemplary game, as in the first exemplary game or the like, the user performs an operation by using the terminal device 6 and the board type controller 9 to cause a player (player object) playing with a pogo stick to move in a virtual world. In the tenth exemplary game, on the LCD 61 of the terminal device 6, an image of a virtual space in which the player is viewed in a direction according to the attitude of the terminal device 6 is displayed. On the monitor 2, an image of the virtual space in which the player is viewed from a distance is displayed.

In the tenth exemplary game, the user performs an operation to change the attitude and the direction of the terminal device 6, and an operation to change the position of a load applied to the board type controller 9. Specifically, the user holding the terminal device 6 stands on the board type controller 9. Then, the user performs an action on the board type controller 9 with the terminal device 6 in his/her hands (e.g., the user performs knee bending or jumping on the board type controller 9 while adjusting the center-of-gravity position of a load applied to the board type controller 9), while viewing the image displayed on the monitor 2 and the image displayed on the LCD 61 of the terminal device 6, thereby playing the game. The player jumps with the pogo stick in the virtual space in accordance with the timing when the user stretches or jumps on the board type controller 9. Further, the direction in which the player moves with the pogo stick changes, and the balance of the player on the pogo stick changes, in accordance with the center-of-gravity position of the load applied to the board type controller 9 during the user's knee bending or jumping. Moreover, the position of the virtual camera for displaying the game image on the LCD 61 changes in accordance with the attitude (direction) of the terminal device 6 held by the user. For example, when the user turns the back surface of the terminal device 6 downward to hold the terminal device 6 substantially horizontally, the virtual camera in the virtual space is moved to a position at which virtual camera views the player from above in a manner of bird's eye viewing. When the user turns the back surface of the terminal device 6 forward to hold the terminal device 6 substantially vertically, the virtual camera in the virtual space is moved to a position in which the virtual camera views the player from behind.

As described above, in the tenth exemplary game, the user is allowed to change the action of the player (player object) playing with the pogo stick and the position of the virtual camera, by changing the attitude of the terminal device 6 held by the user, and the load applied to the board type controller 9. Further, since the virtual space in which the player is viewed from the direction according to the attitude of the terminal device 6 is displayed on the LCD 61, the user is allowed to view, on the LCD 61, an image in which the player is viewed from the user's desired direction. For example, when the user wants to see the landing point of the pogo stick, the user can see the landing point by turning the back surface of the terminal device 6 downward. When the user wants to see the direction in which the player moves with the pogo stick, the user can see the direction by turning the back surface of the terminal device 6 forward. Moreover, since the virtual space in which the player is viewed from a distance is displayed on the monitor 2, the user is allowed to know the surroundings of the player object.

As described above, in the first to tenth exemplary games, when the user performs at least an operation based on the user's action on the board type controller 9 and thereby a process based on the user's action is performed, the user is allowed to view the result of the process on at least the LCD 61 of the portable terminal device 6. Therefore, when the user performs an action on the board type controller 9 with the terminal device 6 being held with his/her hands or being placed in an appropriate position, the user is allowed to view the result of the process in a favorable situation.

Further, in the first to tenth exemplary games, the game image displayed on the LCD 61 of the terminal device 6 and the game image displayed on the monitor 2 are images showing the same virtual world (virtual space), but are images viewed from different viewpoints or viewed in different ranges. Accordingly, the user is allowed to view the virtual world (virtual space) in different views displayed on the two display screens, and thereby allowed to view appropriate game images according to the game situation or the like. Further, when the user holds and operates the terminal device 6 (the first, third to sixth, and tenth exemplary games), the player object or the virtual camera is moved in accordance with the attitude or the position of the terminal device 6 in the real space, and the image displayed on the LCD 61 also changes in accordance with the movement of the player object or the virtual camera. Accordingly, the user, who views the image displayed on the LCD 61 with the terminal device 6 in his/her hands, is given a sense of presence in the virtual world (virtual space). On the other hand, it is difficult for the user, who views only the image displayed on the LCD 61, to know the position of the player object in the entire virtual world (virtual space) and the surroundings of the player object. Such a problem is resolved by displaying, on the monitor 2, the virtual world (virtual space) in a relatively wide range. Further, when the user performs the game operation with the terminal device 6 being placed on a floor or the like (the second and seventh to ninth exemplary games), since the terminal device 6 is portable, the user is allowed to place the terminal device 6 in any position with respect to the stationary monitor 2. Accordingly, the user is allowed to place the terminal device 6 in a suitable position for performing an operation on the board type controller 9. Further, when the direction of the virtual world (virtual space) displayed on the LCD 61 is different from the direction of the virtual world (virtual space) displayed on the monitor 2, if the terminal device 6 is placed in a position (direction) that coincides with the direction of the virtual world displayed on the monitor 2, the user is allowed to view the game image with a positional relation as if the real space becomes the virtual world (virtual space). For example, in the second exemplary game, a position in which the display screen of the monitor 2 is placed at the side of the user is regarded as a user's operation position, and the LCD 61 of the terminal device 6 is placed in front of the user who sits in the operation position. In this case, an image viewed at close range from behind the player object is displayed in front of the user, while an image in which the player object is viewed from the side at a distance is displayed beside the user. Therefore, the user is given a sense of presence in the virtual world (virtual space).

In the first, third to sixth, and tenth exemplary games, the user is allowed to perform an operation by changing a load applied to the board type controller 9 by the user, and further allowed to perform an operation (an operation according to the attitude or the position of the terminal device 6, a touch operation, a button operation, or the like) with holding the terminal device 6 on which a game image including a player object is displayed. The player object displayed on the terminal device 6 is caused to move in the virtual world (virtual space) in accordance with the operation of changing the load applied to the board type controller 9 and/or the operation using the terminal device 6. Accordingly, it is possible to allow the user to feel as if he/she acts as the player object and views the virtual world (virtual space), and as if he/she touches the player object in the real world.

In the above-mentioned operation using the board type controller 9, presence/absence of a load applied to the board type controller 9, a change in a load, and a center-of-gravity position of a load are used for various operation controls for the player objects. For example, in the third, fifth, and sixth exemplary games, presence/absence of a load applied to the board type controller 9 is used for determining whether the user operates the board type controller 9 (the third and sixth exemplary games) or for determining whether the user stands on the board type controller 9 (fifth exemplary game). In the former case, the player object starts to perform a predetermined action with the determination as a trigger. In the latter case, it is determined that the user is present in the reference position in the real space when the result of the determination is positive. In the first to third and seventh to tenth exemplary games, the action and/or the movement speed of the player object are changed in accordance with a change in the load applied to the board type controller 9. Further, in the fourth and seventh to tenth exemplary games, the action and/or the movement direction of the player object are changed in accordance with the center-of-gravity position of the load applied to board type controller 9. Although, in the first to sixth exemplary games, the direction (e.g., the movement direction or the attack direction of the player object) in the virtual world (virtual space) is set in accordance with the user's operation direction, the direction is set based on the attitude (direction) of the terminal device 6. In this case, an appropriate one, between the attitude of the terminal device 6 and the center-of-gravity position of the load applied to the board type controller 9, may be selected according to the game content. Thus, in the case where the terminal device 6 and the board type controller 9 are used as operation means, when setting a direction in the virtual world (virtual space) in accordance with an operation of the user, the user is allowed to select an appropriate operation among a plurality of operations as options.

The game system 1 allows the user to perform actions for playing various games. The terminal device 6 is available as a controller which allows the user to perform an input by an operation based on its motion, a touch operation, a button operation or the like, while it is available as a portable display or a second display. Therefore, the game system 1 realizes a wide range of games. That is, since the terminal device 6 functions as a display device, there may be a game system in which the terminal device 6 is used as display means and the board type controller 9 is used as operation means while the monitor 2 and the controller 7 are not used. Further, since the terminal device 6 functions as an operation device as well as a display device, there may be a game system in which the terminal device 6 is used as display means and the terminal device 6 and the board type controller 9 are used as operation means while the monitor 2 and the controller 7 are not used.

In the exemplary embodiment, the terminal device 6 functions as a so-called thin client terminal which does not execute a game process. However, in the exemplary embodiment, at least a part of the sequential game processes executed by the game apparatus body 5 may be executed by the terminal device 6. For example, the terminal game image generating process may be executed by the terminal device 6. In another example, all the sequential game processes to be executed by the game apparatus body 5 may be executed by the terminal device 6. In this case, since the terminal device 6 functions as a processing device for executing the game processes as well as a display device, there may be a game system in which the terminal device 6 is used as display means, the board type controller 9 is used as operation means, and the terminal device 6 is used as processing means while the monitor 2, the game apparatus body 5, and the controller 7 are not used. In this game system, only the terminal device 6 and the board type controller 9 are connected wirelessly or via a cable, and board operation data is transmitted from the board type controller 9 to the terminal device 6, thereby realizing various kinds of games.

In the above description, the terminal device 6 and the game apparatus body 5 are connected by wireless communication, the controller 7 and the game apparatus body 5 are connected by wireless communication, and the board type controller 9 and the game apparatus body 5 are connected by wireless communication. However, inter-device wireless communication may be achieved in a manner other than mentioned above. In a first example, the terminal device 6 serves as a relay device for another wireless communication. In this case, controller operation data of the controller 7 and/or board operation data of the board type controller 9 are wirelessly transmitted to the terminal device 6, and the terminal device 6 wirelessly transmits, to the game apparatus body 5, terminal operation data of the terminal device 6 together with the received controller operation data and/or board operation data. In this case, while the terminal device 6 and the game apparatus body 5 are directly connected by wireless communication, the controller 7 and/or the board type controller 9 are connected via the terminal device 6 to the game apparatus body 5 by wireless communication. In a second example, the controller 7 serves as a relay device for another wireless communication. In this case, the terminal operation data of the terminal device 6 and/or the board operation data of the board type controller 9 are wirelessly transmitted to the controller 7, and the controller 7 wirelessly transmits, to the game apparatus body 5, the controller operation data of the controller 7 together with the received terminal operation data and/or board operation data. In this case, the controller 7 and the game apparatus body 5 are directly connected by wireless communication, and the terminal device 6 and/or the board type controller 9 are connected via the controller 7 to the game apparatus body 5 by wireless communication. In a third example, the board type controller 9 serves as a relay device for another wireless communication. In this case, the terminal operation data of the terminal device 6 and/or the controller operation data of the controller 7 are wirelessly transmitted to the board type controller 9, and the board type controller 9 wirelessly transmits, to the game apparatus body 5, the board operation data of the board type controller 9 together with the received terminal operation data and/or controller operation data. In this case, the board type controller 9 and the game apparatus body 5 are directly connected by wireless communication, and the terminal device 6 and/or the controller 7 are connected via the board type controller 9 to the game apparatus body 5 by wireless communication. When another device serves as a relay device to transmit operation data to the game apparatus body 5, a device which generates the operation data and the relay device which relays the control data may be electrically connected via a cable.

Further, the terminal device 6, the controller 7, and/or the board type controller 9 may be electrically connected to the game apparatus body 5 via cables. In this case, the cables connected to the terminal device 6, the controller 7, and/or the board type controller 9 are connected to a connection terminal of the game apparatus body 5. In a first example, the terminal device 6 and the game apparatus body 5 are electrically connected via a first cable, the controller 7 and the game apparatus body 5 are electrically connected via a second cable, and the board type controller 9 and the game apparatus body 5 are electrically connected via a third cable. In a second example, the terminal device 6 and/or the controller 7 are electrically connected to the game apparatus body 5 via cables. In this case, the board operation data of the board type controller 9 may be wirelessly transmitted to the terminal device 6 and/or the controller 7 and then transmitted to the game apparatus body 5 via the cables. Alternatively, the board operation data of the board type controller 9 may be wirelessly transmitted from the board type controller 9 directly to the game apparatus body 5. In a third example, the terminal device 6 and/or the board type controller 9 are electrically connected to the game apparatus body 5 via cables. In this case, the controller operation data of the controller 7 may be wirelessly transmitted to the terminal device 6 and/or the board type controller 9 and then transmitted to the game apparatus body 5 via the cables. Alternatively, the controller operation data of the controller 7 may be wirelessly transmitted from the controller 7 directly to the game apparatus body 5. In a fourth example, the controller 7 and/or the board type controller 9 are electrically connected to the game apparatus body 5 via cables. In this case, the terminal operation data of the terminal device 6 may be wirelessly transmitted to the controller 7 and/or the board type controller 9 and then transmitted to the game apparatus body 5 via the cables. Alternatively, the terminal operation data of the terminal device 6 may be wirelessly transmitted from the terminal device 6 directly to the game apparatus body 5.

Further, in the exemplary embodiment, the game system 1 includes one terminal device 6 and one board type controller 9. However, the game system 1 may be configured to include a plurality of terminal devices 6 and a plurality of board type controllers 9. In this case, the game apparatus body 5 may be wirelessly communicable with the respective terminal devices 6 and the respective type controllers 9, and may transmit game image data, game sound data, and control data to the respective terminal devices, and receive terminal operation data, camera image data, microphone sound data, and board operation data from the respective terminal devices 6 and the respective board type controllers 9. When the game apparatus body 5 wirelessly communicates with the plurality of terminal devices 6 and the plurality of board type controllers 9, the game apparatus body 5 may perform the wireless communications in a time division manner or a frequency division manner.

As described above, when the game system 1 includes a plurality of terminal devices 6 and a plurality of board type controllers 9, a plurality of users are allowed to play more games. For example, when the game system 1 includes two pairs of terminal devices 6 and board type controllers 9, two users are allowed to play a game simultaneously. Further, when the game system 1 includes two pairs of terminal devices 6 and board type controllers 9, since the game system 1 includes three display units, game images for three users can be generated to be displayed on the respective display units.

In the above description, the board type controller 9 is provided with a plurality of load sensors 94. However, if information of the center-of-gravity position of a load applied to the board type controller 9 is not required in the above-mentioned processing, the load sensor 94 may be provided with at least one board type controller 9.

The exemplary embodiment has been described by using the stationary game apparatus 3. However, the information processing program of the exemplary embodiment may be executed in an information processing apparatus such as a hand-held game apparatus or a general personal computer.

Further, the exemplary embodiment may be applied to, as well as the game apparatus, any hand-held electronic devices (e.g., a PDA (Personal Digital Assistant) or a mobile telephone), a personal computer, a camera, and the like. Any device may be connected to the terminal device 6 and the board type controller 9 wirelessly or via cables.

In the above description, the information processing is executed by the game apparatus body 5. However, at least a part of the process steps in the information processing may be performed by another apparatus provided outside the game system 1. For example, when the game apparatus body 5 is configured to be communicable with another apparatus (e.g., a server or another game apparatus), the process steps in the information processing may be performed by the game apparatus body 5 in combination with the other apparatus. For example, the other apparatus performs a process of setting a player object, a virtual world and the like, and data relating to an action of the player object is transmitted from the game apparatus body 5 to the other apparatus, and thereby the information processing is performed. Then, image data representing a virtual world generated in the other apparatus is transmitted to the game apparatus body 5, and the virtual world is displayed on the monitor 2 and the LCD 61. Thus, when at least a part of the process steps in the information processing is performed by another apparatus, the same processing as the information processing is achieved. At least a part of the process steps in the information processing may be performed by the board type controller 9 (microcomputer 100). Further, the above-mentioned information processing can be executed by one processor or by a cooperation of a plurality of processors which is/are included in an information processing system constituted by at least one information processing apparatus. Further, in the exemplary embodiment, the processes shown in the above-mentioned flowcharts are performed by the CPU 10 of the game apparatus body 5 executing the predetermined program. However, a part or the entirety of the processes may be performed by a dedicated circuit included in the game apparatus body 5.

Further, the shape of the game apparatus body 5, the shapes of the terminal device 6, the controller 7, and the board type controller 9, and the shapes, numbers, and mounting positions of the operation buttons and the sensors, are merely examples. It should be understood that other shapes, numbers, and mounting positions may be adopted. Further, the processing sequences, set values, display modes, and values used in determination which are used in the above-mentioned game process are merely examples. It is understood that other sequences, display modes, and values may be adopted.

Further, the information processing program (game program) may be supplied to the game apparatus body 5 via a wired or wireless communication circuit, as well as to the game apparatus body 5 via an external storage medium such as the optical disc 4. Further, the information processing program may be previously stored in a nonvolatile storage device inside the game apparatus body 5. Examples of an information storage medium storing the information processing program therein include: a CD-ROM, a DVD, any other optical disc-shaped storage medium similar to these media, a flexible disk, a hard disk, a magnetic optical disk, and a magnetic tape. Further, the information storage medium storing the information processing program therein may be a nonvolatile semiconductor memory or a volatile memory. Such a storage medium is a storage medium readable by a computer or the like. For example, it is possible to provide the above-mentioned various functions by causing a computer or the like to read and execute the programs stored in these storage media.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While the exemplary embodiments have been described in detail, the foregoing description is in all aspects illustrative and not restrictive. It is understood that numerous other modifications and variations can be devised. It is also understood that, from the description of specific embodiments, the one skilled in the art can implement the exemplary embodiments in the equivalent range based on the description and on the common technological knowledge. Further, it should be understood that terms used in the present specification have meanings generally used in the art concerned unless otherwise specified. Therefore, unless otherwise defined, all the jargon and technical terms have the same meanings as those generally understood by one skilled in the art of the exemplary embodiments. In the event of any conflict, the present specification (including meanings defined herein) has priority.

What is claimed is:

1. An information processing system comprising a first input device, a second input device, a portable display device, and an information processing apparatus for processing data supplied from the first input device, wherein
    the first input device configured to:
        sequentially detect a load applied to the first input device; and
        sequentially output load data, based on the load detected by the first input device, to the information processing apparatus,
    the information processing apparatus configured to:
        sequentially obtain the load data outputted from the first input device;
        sequentially generate and render a first display image, using the information processing apparatus, to be displayed on the portable display device, based on at least the obtained load data; and
        sequentially output, to the portable display device, image data representing the generated first display image, and
    the portable display device configured to:
        sequentially obtain the image data rendered by and outputted from the information processing apparatus; and
        sequentially display the first display image represented by the obtained image data, and
    the second input device comprises:
        at least one input portion; and
        at least one motion sensing device for sensing motion of the second input device,
        the second input device being in communication with the information processing apparatus and usable with the portable display device and the first input device.

2. The information processing system according to claim 1, wherein
    the portable display device further configured to:
        sequentially generate first operation data representing a user operation performed by using the portable display device; and
        sequentially output the first operation data to the information processing apparatus,
    the information processing apparatus sequentially obtains the first operation data outputted from the portable display device, and
    the information processing apparatus sequentially generates the first display image based on the obtained load data and the obtained first operation data.

3. The information processing system according to claim 1, wherein
    the information processing apparatus sequentially generates, based on at least the load data, a second display image to be displayed on another display device connected to the information processing apparatus, and
    the information processing apparatus sequentially outputs, to the portable display device, the image data representing the generated first display image, and sequentially outputs, to the other display device, image data representing the generated second display image.

4. The information processing system according to claim 3, wherein the information processing apparatus sequentially generates, as the second display image, an image different from the first display image, based on at least the load data.

5. The information processing system according to claim 4, wherein the information processing apparatus generates, as the first display image, an image showing a first region in a virtual world, and generates, as the second display image, an image showing a second region in the virtual world, which is different from the first region, based on at least the load data.

6. The information processing system according to claim 4, wherein the information processing apparatus generates, as the first display image, an image showing a state of a virtual world viewed from a first viewpoint, and generates, as the second display image, an image showing a state of the virtual world viewed from a second viewpoint different from the first viewpoint, based on at least the load data.

7. The information processing system according to claim 2, wherein the portable display device sequentially generates, as the first operation data, data in accordance with a movement of the portable display device.

8. The information processing system according to claim 2, wherein
the portable display device further includes a touch panel provided on a display screen of the portable display device, and
the portable display device sequentially generates, as the first operation data, data representing a position at which the touch panel is touched.

9. The information processing system according to claim 1, wherein
the second input device configured to:
sequentially generate second operation data representing a user operation performed by using the second input device; and
sequentially output the second operation data to the information processing apparatus,
the information processing apparatus sequentially obtains the second operation data outputted from the second input device, and
the information processing apparatus sequentially generates the first display image, based on the obtained load data and the obtained second operation data.

10. The information processing system according to claim 9, wherein the second input device sequentially generates, as the second operation data, data in accordance with a movement of the second input device.

11. The information processing system according to claim 1, wherein
the information processing apparatus wirelessly transmits the image data representing the first display image to the portable display device, and
the portable display device sequentially obtains the image data by receiving the image data wirelessly transmitted from the information processing apparatus.

12. The information processing system according to claim 1, wherein
the information processing apparatus further configured to sequentially compress the image data representing the generated first display image to generate compressed image data, and
sequentially output the compressed image data to the portable display device,
the portable display device sequentially obtains the compressed image data outputted from the information processing apparatus,
the portable display device further configured to sequentially decompress the compressed image data to obtain image data representing the first display image, and
sequentially display the first display image represented by the obtained and decompressed image data.

13. The information processing system according to claim 1, wherein
a plurality of load detection devices are provided at different positions on the first input device, and
the first input device sequentially outputs, to the information processing apparatus, a plurality of load data based on loads detected by the respective load detection devices.

14. The information processing system according to claim 13, wherein
the information processing apparatus sequentially obtains the plurality of load data outputted from the first input device,
the information processing apparatus further configured to calculate a center-of-graving position of a load applied to the first input device, based on the loads represented by the plurality of load data, and
sequentially generate the first display image based on the calculated center-of-gravity position.

15. The information processing system according to claim 1, wherein
the information processing apparatus further configured to perform a predetermined game process based on at least the obtained load data, and
sequentially generate the first display image based on the predetermined game process.

16. The information processing system according to claim 2, wherein
the information processing apparatus further configured to set an action of a player object arranged in a virtual world based on the load data and the first operation data,
sequentially generate, as the first display image, an image of a region of the virtual world, which region includes at least the player object, or an image of the virtual world based on the viewpoint of the player object.

17. A non-transitory computer-readable storage medium comprising an information processing program executed on a computer of an information processing apparatus which is capable of using data outputted from a first input device and a second input device, and processes the data obtained from the first input device, wherein the information processing program causes the computer to:
sequentially obtain, from the first input device, load data based on a load applied to the first input device;
sequentially generate and render, using the information processing apparatus, and based on at least the obtained load data, a first display image to be displayed on a portable display device and a second display image to be displayed on another display device connected to the information processing apparatus; and
sequentially output, to the portable display device, image data representing the generated and rendered first display image, and sequentially output, to the other display device, image data of the generated second display image,
the second input device having at least one input portion and at least one motion sensing device for sensing motion of the second input device, the second input device being in communication with the information processing apparatus and usable with the portable display device and the first input device.

18. The non-transitory computer-readable storage medium according to claim 17, wherein an image different from the first display image is sequentially generated as the second display image, based on at least the load data.

19. The non-transitory computer-readable storage medium according to claim 18 wherein an image showing a first region in a virtual world is generated as the first display image, and an image showing a second region in the virtual world, which is different from the first region, is generated as the second display image, based on at least the load data.

20. The non-transitory computer-readable storage medium according to claim 18, wherein an image showing a state of a virtual world viewed from a first viewpoint is generated as the first display image, and an image showing a state of the virtual world viewed from a second viewpoint different from the first viewpoint is generated as the second display image, based on at least the load data.

21. The non-transitory computer-readable storage medium according to claim 18, wherein
the information processing apparatus is capable of using data outputted from the portable display device, first operation data representing a user operation performed by using the portable display device is sequentially obtained from the portable display device, and the first display image and the second display image are sequentially generated, based on the obtained load data and the obtained first operation data.

22. The non-transitory computer-readable storage medium according to claim 18, wherein the information processing program further causes the computer to sequentially compress the image data representing the generated first display image to generate compressed image data, and sequentially output, to the portable display device, the generated compressed image data, as image data representing the first display image, and sequentially output, to the other display device, the image data representing the generated second display image.

23. The non-transitory computer-readable storage medium according to claim 18, wherein a plurality of load data based on loads applied to the first input device at a plurality of positions are sequentially obtained from the first input device, the information processing program further causes the computer to calculate a center-of-gravity position of a load applied to the first input device, based on the loads represented by the plurality of load data, and sequentially generate the first display image and the second display image, based on the calculated center-of-gravity position.

24. The non-transitory computer-readable storage medium according to claim 18 further causes the computer to perform a predetermined game process, based on at least the obtained load data, and sequentially generate the first display image and the second display image, based on the predetermined game process.

25. The non-transitory computer-readable storage medium according to claim 21, wherein the information processing program further causes the computer to set an action of a player object arranged in a virtual world, based on the load data and the first operation data, and sequentially generate, as the first display image and the second display image, an image of a region of the virtual world, which region includes at least the player object, or an image of the virtual world based on the viewpoint of the player object.

26. An information processing method for processing data outputted from a first input device and a second input device, the method comprising:

sequentially detecting a load applied to the first input device;

sequentially generating and rendering a first display image, using an information processing apparatus, to be displayed on a portable display device, based on the detected load; and sequentially displaying, on the portable display device, the generated first display image rendered by the information processing apparatus, the second input device having at least one input portion and at least one motion sensing device for sensing motion of the second input device, the second input device being in communication with the information processing apparatus and usable with the portable display device and the first input device.

* * * * *